United States Patent
Lee et al.

(10) Patent No.: US 10,019,052 B2
(45) Date of Patent: Jul. 10, 2018

(54) FLEXIBLE DISPLAY APPARATUS AND METHOD FOR PROVIDING UI THEREOF

(71) Applicant: SAMSUNG ELECTRONICS CO., LTD., Suwon-si (KR)

(72) Inventors: Geun-ho Lee, Seongnam-si (KR); Moon-joo Lee, Suwon-si (KR); Han-sung Lee, Seoul (KR); Chang-soo Lee, Seosan-si (KR); Kyung-a Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 13/858,347

(22) Filed: Apr. 8, 2013

(65) Prior Publication Data
US 2013/0265221 A1  Oct. 10, 2013

(30) Foreign Application Priority Data

Apr. 8, 2012 (KR) ........................ 10-2012-0036467

(51) Int. Cl.
*G06F 3/01*  (2006.01)
*H04N 21/436* (2011.01)
(Continued)

(52) U.S. Cl.
CPC .............. *G06F 3/01* (2013.01); *G06F 1/1652* (2013.01); *G06F 3/038* (2013.01); *G06F 3/0416* (2013.01);
(Continued)

(58) Field of Classification Search
CPC .................. G06F 1/1652; G06F 3/048; G06F 2206/1008; G06F 3/016; G06F 3/011;
(Continued)

(56) References Cited

U.S. PATENT DOCUMENTS 5,410,326 A * 4/1995 Goldstein .............. G08C 23/04
340/12.26
5,956,025 A * 9/1999 Goulden ................. G06F 3/033
345/169
(Continued)

FOREIGN PATENT DOCUMENTS

| CN | 102142207 A | 8/2011 |
| CN | 102239683 A | 11/2011 |

(Continued)

OTHER PUBLICATIONS

Written Opinion dated Jul. 26, 2013 from the International Searching Authority in counterpart Application No. PCT/KR2013/002929.
(Continued)

*Primary Examiner* — Mihir K Rayan
(74) *Attorney, Agent, or Firm* — Sughrue Mion, PLLC

(57) ABSTRACT

A flexible display apparatus and control method thereof is provided. The flexible display apparatus may include a display, a sensor that senses one of a first deformed shape of the flexible display apparatus and a second deformed shape of the flexible display apparatus, and a controller which controls the display to display a first user interface (UI) corresponding to the first sensed shape in response to sensing the first shape and a second user interface corresponding to the second sensed shape in response to sensing the second shape, receives an input on the displayed UI, and transmits a control signal to a controlled apparatus that instructs the controlled apparatus to execute a function of the controlled apparatus corresponding to the input.

26 Claims, 43 Drawing Sheets

(51) Int. Cl.

| | |
|---|---|
| *H04N 21/422* | (2011.01) |
| *H04N 5/445* | (2011.01) |
| *H04N 5/64* | (2006.01) |
| *G06F 3/041* | (2006.01) |
| *G06F 3/038* | (2013.01) |
| *G06F 1/16* | (2006.01) |
| *G06F 3/0488* | (2013.01) |
| *H04N 21/478* | (2011.01) |
| *H04N 21/431* | (2011.01) |
| *H04N 21/41* | (2011.01) |

(52) U.S. Cl.
CPC ....... *G06F 3/0488* (2013.01); *H04N 5/44543* (2013.01); *H04N 5/64* (2013.01); *H04N 21/4222* (2013.01); *H04N 21/42207* (2013.01); *H04N 21/42209* (2013.01); *H04N 21/42222* (2013.01); *H04N 21/42224* (2013.01); *H04N 21/42226* (2013.01); *H04N 21/43615* (2013.01); *G06F 2203/0381* (2013.01); *G06F 2203/0384* (2013.01); *G06F 2203/04102* (2013.01); *H04N 21/4131* (2013.01); *H04N 21/4312* (2013.01); *H04N 21/478* (2013.01)

(58) Field of Classification Search
CPC ............... G06F 3/03543; G06F 3/0338; G06F 2203/04102; G06F 2203/0384; G06F 2203/0381; H04N 5/44543; H04N 5/64
See application file for complete search history.

(56) References Cited

U.S. PATENT DOCUMENTS

| | | | |
|---|---|---|---|
| 6,988,247 B2 | 1/2006 | Janevski | |
| 8,271,047 B2 | 9/2012 | Kim et al. | |
| 8,302,346 B2 | 11/2012 | Hunt et al. | |
| 8,380,327 B2 | 2/2013 | Park | |
| 9,019,696 B2 | 4/2015 | Hamers et al. | |
| 2003/0025737 A1* | 2/2003 | Breinberg | G06F 8/38 715/801 |
| 2003/0141987 A1* | 7/2003 | Hayes | G08C 19/28 340/12.25 |
| 2003/0231197 A1* | 12/2003 | Janevski | G06F 1/1626 715/702 |
| 2008/0089658 A1* | 4/2008 | Grady | H04N 5/225 386/200 |
| 2008/0303782 A1 | 12/2008 | Grant et al. | |
| 2009/0326833 A1 | 12/2009 | Ryhanen et al. | |
| 2010/0011291 A1 | 1/2010 | Nurmi | |
| 2010/0045705 A1* | 2/2010 | Vertegaal | A47G 19/2227 345/661 |
| 2010/0053076 A1 | 3/2010 | Cohen et al. | |
| 2010/0056223 A1 | 3/2010 | Choi et al. | |
| 2010/0120470 A1 | 5/2010 | Kim et al. | |
| 2010/0141605 A1 | 6/2010 | Kang et al. | |
| 2010/0164888 A1 | 7/2010 | Okumura et al. | |
| 2010/0220060 A1 | 9/2010 | Kobayashi | |
| 2010/0225578 A1* | 9/2010 | Ko | 345/156 |
| 2010/0283727 A1 | 11/2010 | Jiang et al. | |
| 2010/0283731 A1 | 11/2010 | Grant et al. | |
| 2010/0302190 A1* | 12/2010 | Yeh | 345/173 |
| 2011/0140995 A1 | 6/2011 | Hamers et al. | |
| 2011/0149173 A1* | 6/2011 | Jang et al. | 348/739 |
| 2011/0179706 A1 | 7/2011 | Hunt et al. | |
| 2011/0188189 A1* | 8/2011 | Park | G05B 11/01 361/679.05 |
| 2011/0193898 A1* | 8/2011 | Kim | G09G 5/003 345/698 |
| 2011/0307726 A1* | 12/2011 | Kikuchi | G08C 17/02 713/323 |
| 2012/0014054 A1 | 1/2012 | Ashcraft et al. | |
| 2012/0139847 A1* | 6/2012 | Hunt | G06F 3/0346 345/173 |
| 2013/0040380 A1 | 2/2013 | Hunt et al. | |
| 2013/0044215 A1 | 2/2013 | Rothkopf et al. | |
| 2013/0093660 A1* | 4/2013 | Hirsch | G06F 1/1652 345/156 |
| 2013/0120302 A1 | 5/2013 | Kang et al. | |
| 2013/0131887 A1 | 5/2013 | Park | |
| 2013/0201093 A1* | 8/2013 | Kim | G06F 3/033 345/156 |
| 2014/0098028 A1* | 4/2014 | Kwak | G09G 5/00 345/173 |
| 2014/0229847 A1* | 8/2014 | Park | G06F 1/1684 715/744 |
| 2015/0304703 A1* | 10/2015 | Liu | H04N 21/42219 725/38 |

FOREIGN PATENT DOCUMENTS

| | | |
|---|---|---|
| JP | 2010-211612 A | 9/2010 |
| KR | 10-2005-0013578 A | 2/2005 |
| KR | 10-2010-0052226 A | 5/2010 |
| KR | 1020100065418 A | 6/2010 |
| WO | 02/47363 A2 | 6/2002 |
| WO | 2007148967 A2 | 12/2007 |

OTHER PUBLICATIONS

International Search Report dated Jul. 26, 2013 from the International Search Authority in counterpart Application No. PCT/KR2013/002929.
Lahey et al., "PaperPhone: Understanding the Use of Bend Gestures in Mobile Devices with Flexible Electronic Paper Displays", Proceedings of CHI 2011, May 7-11 2011, 10 pages total, Vancouver, BC, Canada.
Communication dated Oct. 16, 2014 issued by Australian Intellectual Property Office in counterpart Australian Patent Application No. 2013203011.
Communication dated Jan. 5, 2015 issued by European Patent Office in counterpart European Patent Application No. 13162791.1.
Communication dated Mar. 4, 2015 by the Australian Intellectual Property Office in related Application No. 2013203011.
Communication dated Apr. 16, 2015 by the Australian Intellectual Property Office in related Application No. 2013203011.
Communication dated Jul. 3, 2015, issued by the Australian Patent Office in counterpart Australian Patent Application No. 2013203011.
Communication dated Jul. 26, 2016 issued by the European Patent Office in counterpart European Patent Application No. 13162791.1.
Communication dated Dec. 17, 2015 by the Korean Intellectual Property Office in related Application No. 10-2012-0036467.
Communication dated Nov. 9, 2015 by the European Patent Office in related Application No. 13162791.1.
Communication dated Mar. 28, 2017, issued by the State Intellectual Property Office of P.R. China in counterpart Chinese Application No. 201310119763.3.

* cited by examiner

FIG. 2
(a)
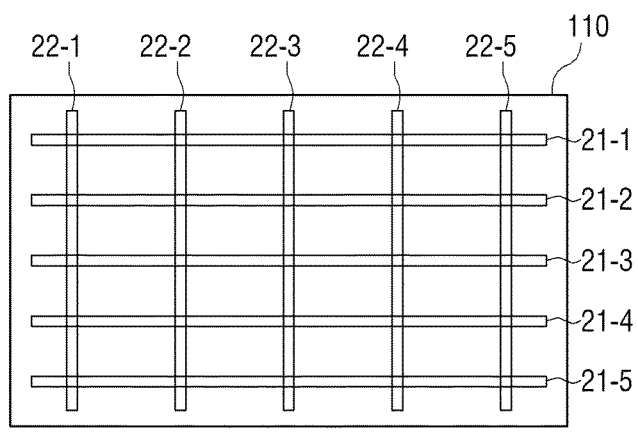
(b)
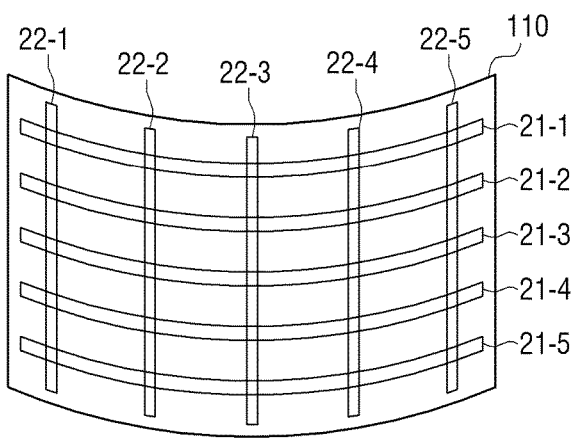
(c)
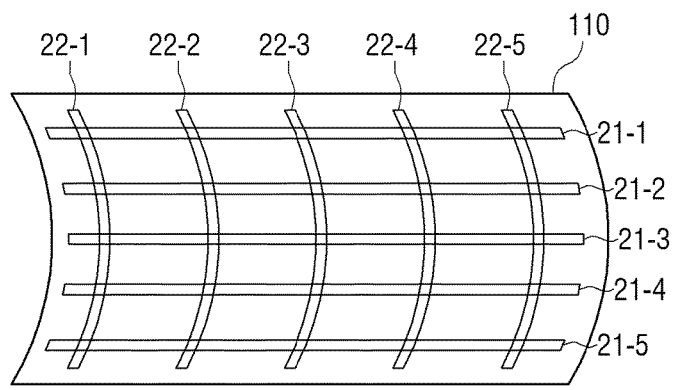

FIG. 3
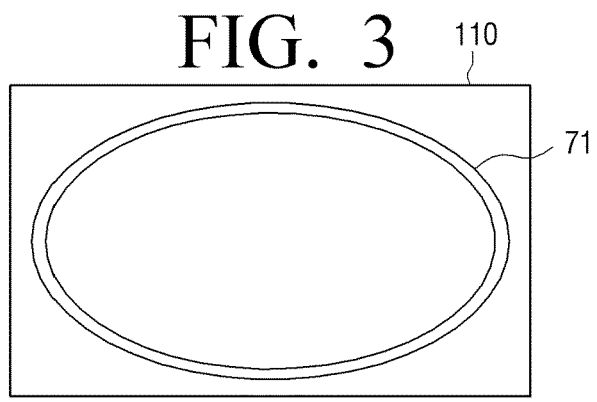
(a)
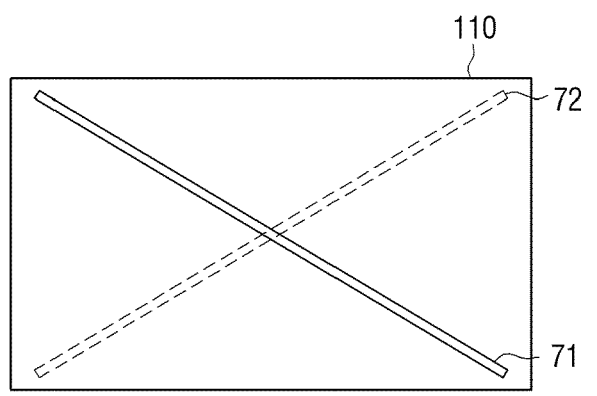
(b)
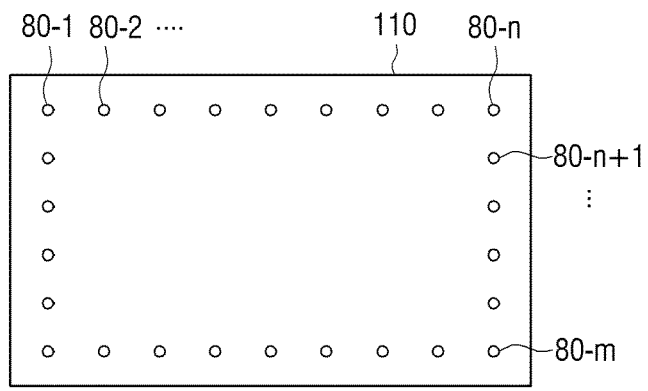
(c)
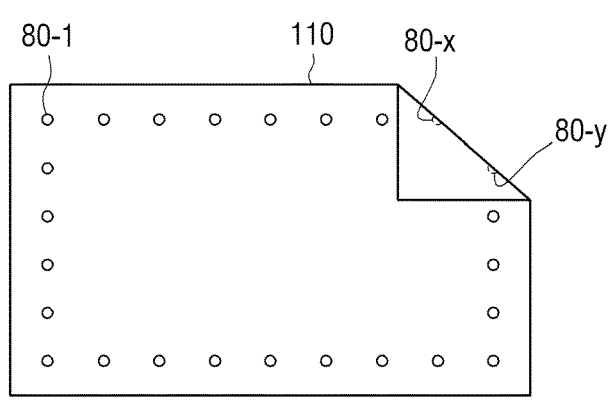
(d)

FIG. 4
(a)
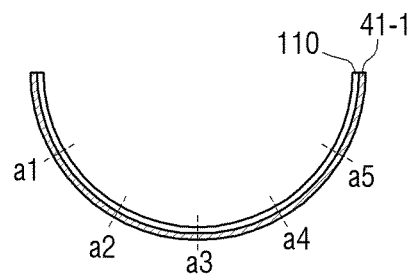
(b)
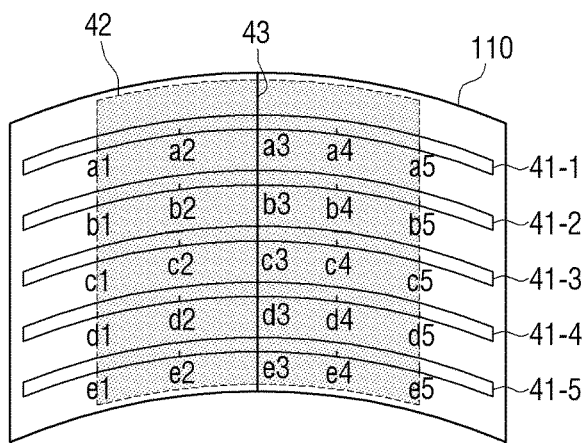
(c)
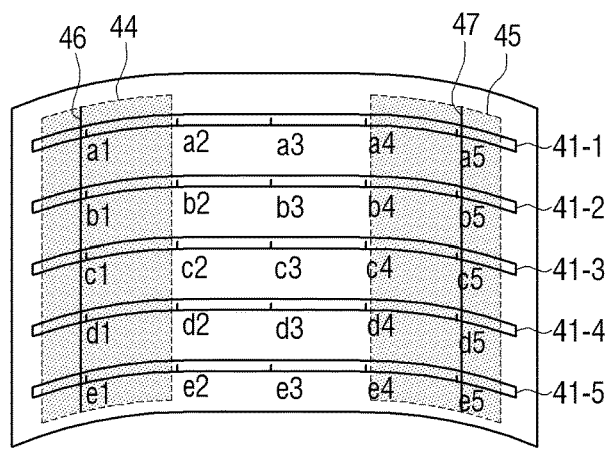

FIG. 5
(a)
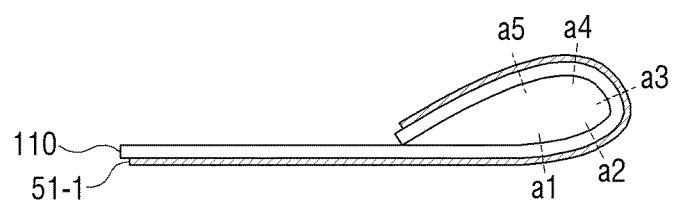
(b)
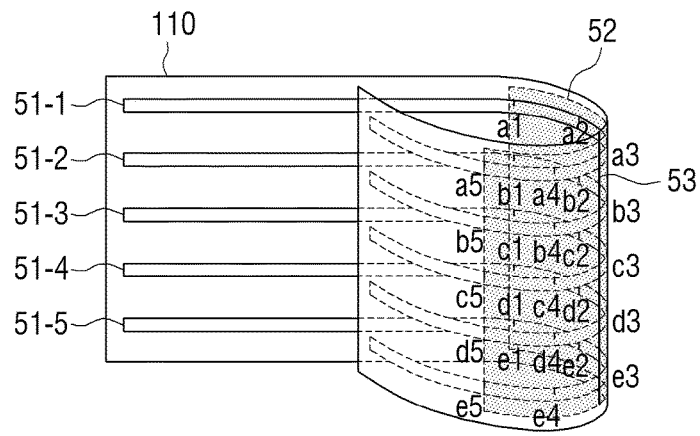

FIG. 6
(a)
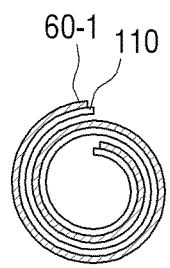
(b)
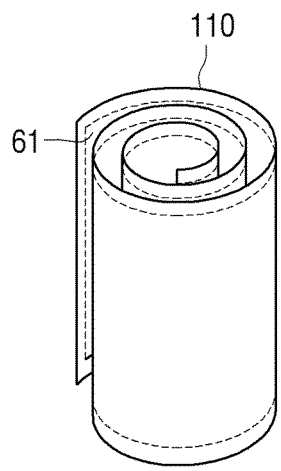
(c)
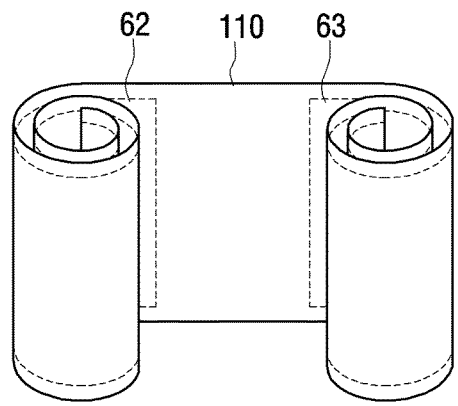

FIG. 7
(a)
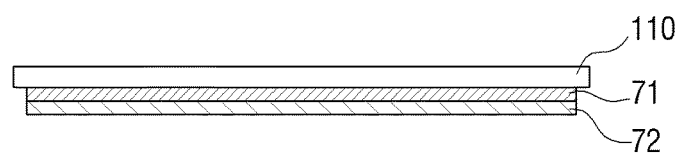
(b)
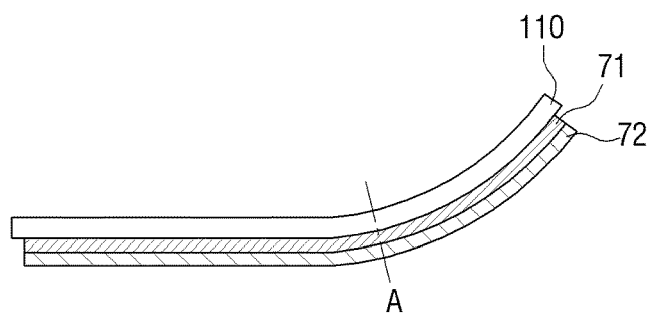
(c)
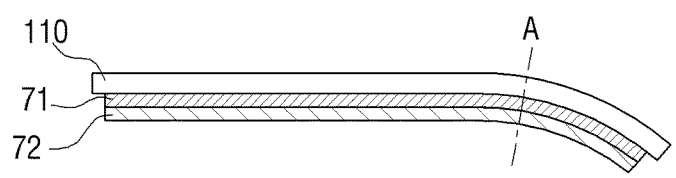
(d)
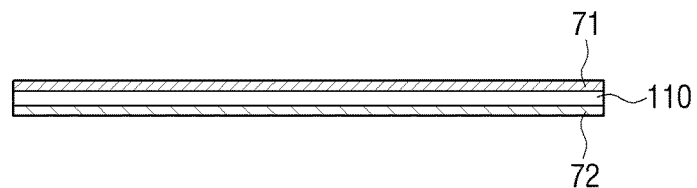

FIG. 9
(a)
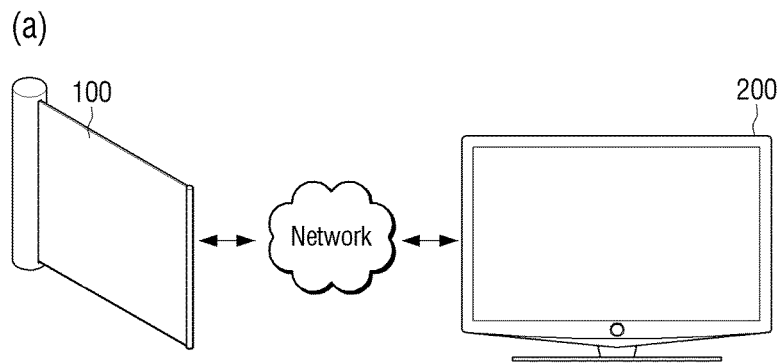
(b)
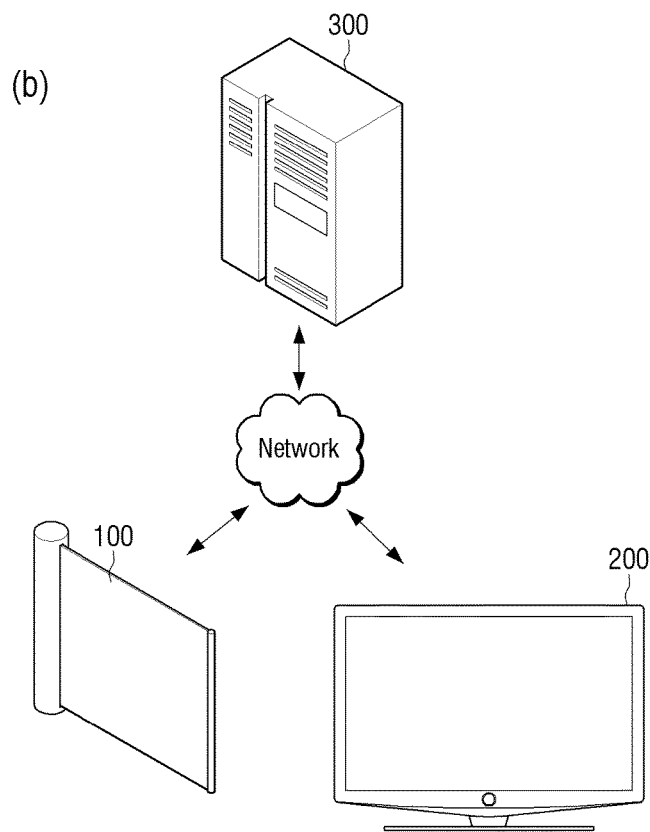

FIG. 21
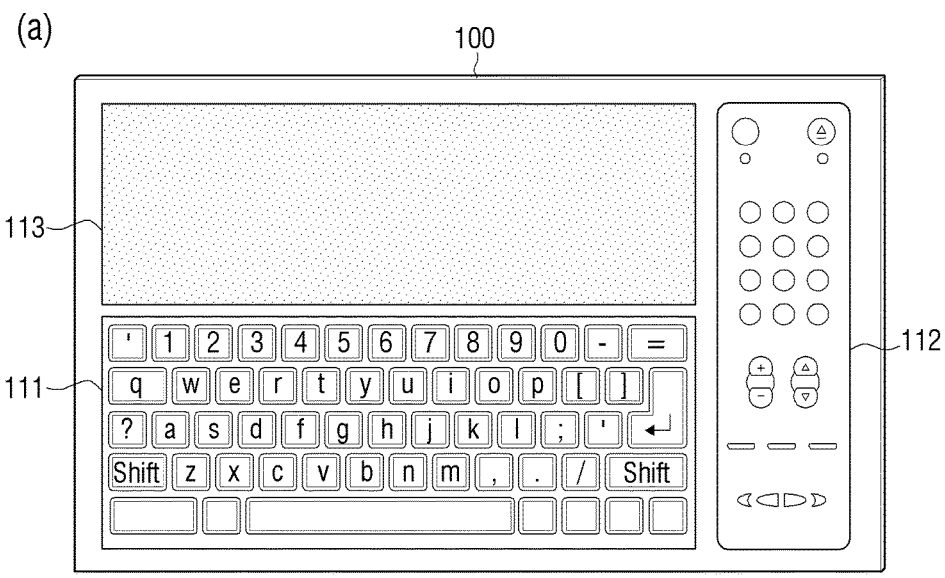
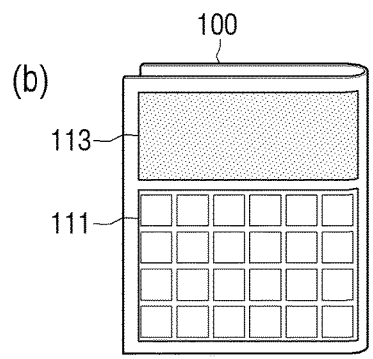
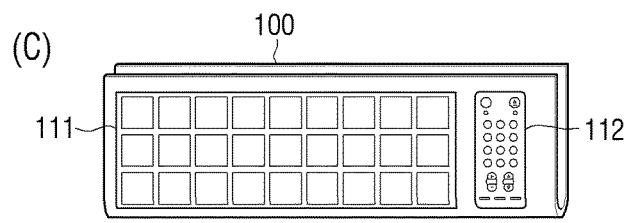

FIG. 22
(a)
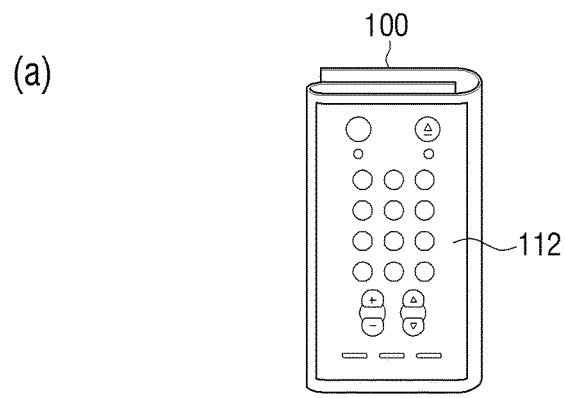
(b)
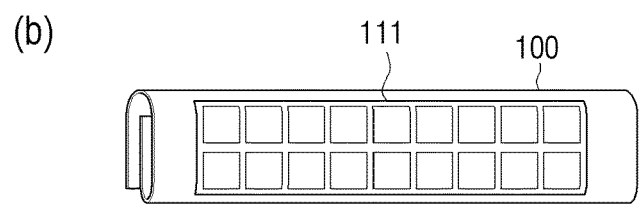
(c)
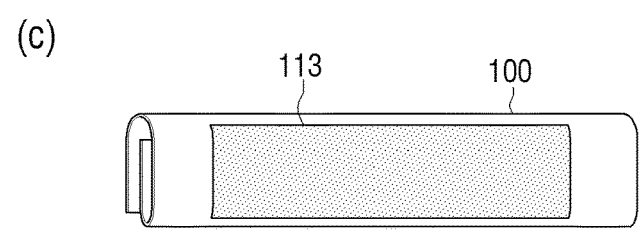
(d)
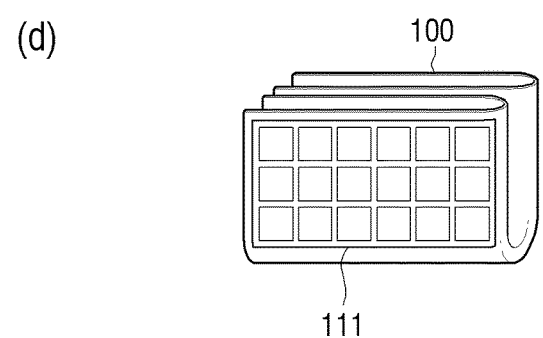

FIG. 25
(a)
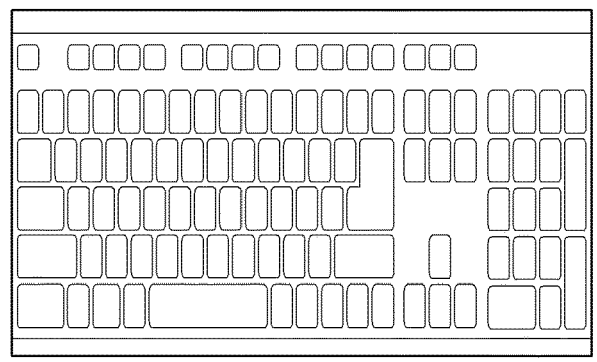
(b)
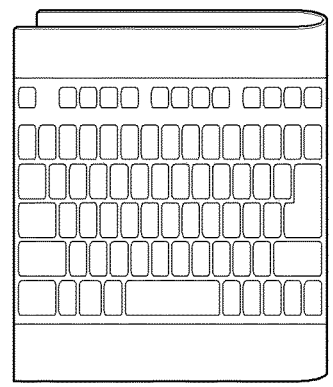
(C)
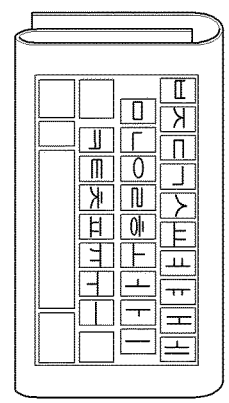

FIG. 28
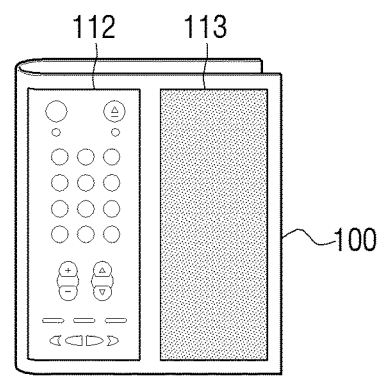
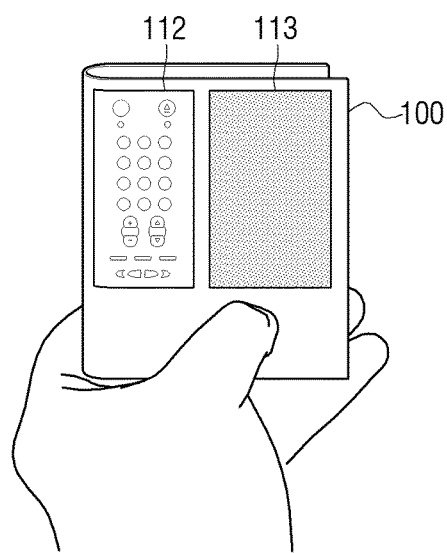

FIG. 34
(a)
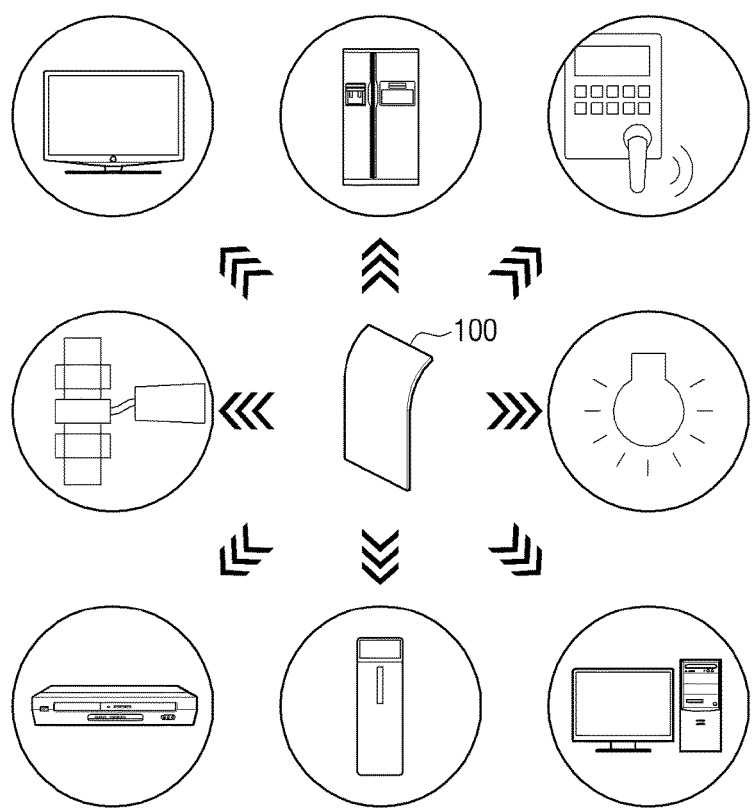
(b)
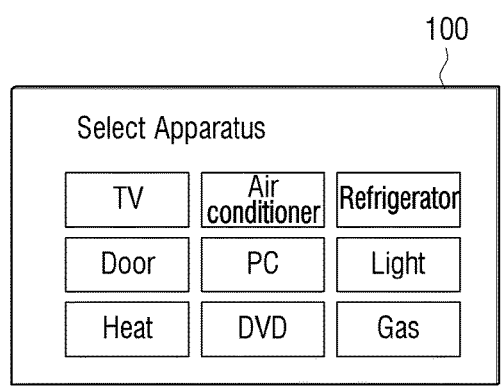

FLEXIBLE DISPLAY APPARATUS AND METHOD FOR PROVIDING UI THEREOF

CROSS-REFERENCE TO RELATED APPLICATION

This application claims priority from Korean Patent Application No. 10-2012-0036467, filed on Apr. 8, 2012 in the Korean Intellectual Property Office, the disclosure of which is incorporated herein by reference in its entirety.

BACKGROUND

1. Field

Methods and apparatuses consistent with exemplary embodiments relate to a flexible display apparatus and a method for providing a user interface (UI) thereof, and more particularly, to a flexible display apparatus that provides a UI according to shape deformation, and a method for providing a UI thereof.

2. Description of the Related Art

With the development of electronic technologies, various kinds of display apparatuses have been developed, such as television (TVs), personal computers (PCs), laptops, tablet PCs, mobile phones, and MP3 players.

To meet users' needs for new functions, an effort to develop the display apparatus in a new form has been made. A so-called next generation display apparatus is a result of such an effort.

The flexible display apparatus is an example of the next-generation display apparatus. The flexible display apparatus refers to a display apparatus that can be deformed so its shape is changed.

Since the shape of the flexible display apparatus can changed, characteristics of the shape deformation may be used in a number of ways.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a flexible display apparatus, which provides a UI corresponding to shape deformation to control another apparatus, and a method for providing a UI thereof.

According to an aspect of an exemplary embodiment, there is provided a flexible display apparatus including: a display; a sensor that senses one of (i) a first deformed shape of the flexible display apparatus and (ii) a second deformed shape of the flexible display apparatus; and a controller that (i) controls the display to display (a) a first user interface (UI) corresponding to the first deformed shape in response to sensing the first deformed shape and (b) a second UI corresponding to the second deformed shape in response to sensing the second deformed shape, (ii) receives an input on one of the first UI and the second UI that is displayed, and (iii) transmits a control signal to a controlled apparatus that instructs the controlled apparatus to execute a function of the controlled apparatus corresponding to the input.

The flexible display apparatus may include a communication unit controlled that is by the controller to transmit the control signal to the controlled apparatus.

The communication unit may transmit the one of the first deformed shape and the second deformed shape sensed by the sensor to the controlled apparatus and receive a response from the controlled apparatus that indicates one of the first UI and the second UI to be displayed on the flexible display apparatus.

The controller may determine a resolution of the one of the first UI and the second UI that is displayed, based on the one of the first deformed shape and the second deformed shape sensed by the sensor, and the communication unit may transmit the resolution and the one of the first deformed shape and the second deformed shape sensed by the sensor to the controlled apparatus.

The response may indicate a configuration of the one of the first UI and the second UI to be displayed on the flexible display apparatus.

The communication unit may transmit the one of the first deformed shape and the second deformed shape sensed by the sensor to the controlled apparatus and receive a response from the controlled apparatus that indicates one of the first UI and the second UI to be displayed on the flexible display apparatus and a type of content reproduced by the controlled apparatus, and the controller may select one of the first UI and the second UI based on the type of content reproduced by the controlled apparatus and control the display to display the selected one of the first UI and the second UI.

The communication unit may receive an event signal that indicates a change in content reproduced by the controlled apparatus, and the controller may control the display to display one of the first UI and the second UI based on the change in content.

The communication unit may receive a signal from the controlled device to deform the flexible display apparatus to one of the first deformed shape and the second deformed shape, and the controller may control the flexible display apparatus to deform the flexible display apparatus to be the one of the first deformed shape and the second deformed shape.

The communication unit may transmit the one of the first deformed shape and the second deformed shape sensed by the sensor to a server and receive a response from the server that indicates one of the first UI and the second UI to be displayed on the flexible display apparatus.

The sensor may sense a change of shape of the flexible display apparatus from the one of the first deformed shape and the second deformed shape to a new shape, and the controller may control the display to change the displayed UI based on the new shape.

The first UI may include a touch interface controlling a cursor displayed on the controlled apparatus and the second UI may include a keyboard interface controlling entry of keyboard data to the controlled apparatus.

The first deformed shape may be one of a rolled shape, a bent shape, and a folded shape and the second deformed shape may be one of the rolled shape, a bent shape, and the folded shape different from the first deformed shape.

The first deformed shape may be the bent shape having a first degree of bending and the second deformed shape may be the bent shape having a second degree of bending.

According to an aspect of another exemplary embodiment, there is provided a method of controlling a flexible display apparatus, the method comprising: sensing one of a first deformed shape of the flexible display apparatus and a second deformed shape of the flexible display apparatus, displaying on the flexible display apparatus a first user interface (UI) corresponding to the first deformed shape in response to sensing the first deformed shape and a second UI corresponding to the second deformed shape in response to sensing the second deformed shape, receiving an input on one of the first UI and the second UI that is displayed, and transmitting a control signal to a controlled apparatus that instructs the controlled apparatus to execute a function of the controlled apparatus corresponding to the input.

According to an aspect of another exemplary embodiment, there is provided a non-transitory computer-readable medium having recorded thereon a program that causes a flexible display apparatus to execute a method of controlling the flexible display apparatus, the method including sensing one of a first deformed shape of the flexible display apparatus and a second deformed shape of the flexible display apparatus, displaying on the flexible display apparatus a first user interface (UI) corresponding to the first deformed shape in response to sensing the first deformed shape and a second UI corresponding to the second deformed shape in response to sensing the second deformed shape, receiving an input on one of the first UI and the second UI that is displayed, and transmitting a control signal to a controlled apparatus that instructs the controlled apparatus to execute a function of the controlled apparatus corresponding to the input.

According to the above-described various exemplary embodiments, the flexible display apparatus can provide a UI for controlling another apparatus according to shape deformation.

BRIEF DESCRIPTION OF THE DRAWINGS

The above and other aspects will be more apparent by describing in detail exemplary embodiments, with reference to the accompanying drawings, in which:

FIG. 2 is a view to explain an arrangement pattern of deformation sensors according to an exemplary embodiment;

FIG. 3 is a view to explain an arrangement pattern of deformation sensors according to an exemplary embodiment;

FIG. 4 is a view to explain a method for sensing bending in a flexible display apparatus using a deformation sensor according to an exemplary embodiment;

FIG. 5 is a view to explain an example of a method for sensing folding of a flexible display apparatus;

FIG. 6 is a view to explain a method for sensing rolling of a flexible display apparatus;

FIG. 7 is a view to explain a method for sensing a bending direction using overlapping deformation sensors according to an exemplary embodiment;

FIG. 9 is a view to explain an example of a control system according to an exemplary embodiment;

FIGS. 21 to 24 are views to explain a UI screen according to an exemplary embodiment;

FIG. 25 is a view to explain a method for providing a UI according to an exemplary embodiment;

FIG. 28 is a view to explain a method for changing a UI according to a user gripping operation according to an exemplary embodiment;

FIG. 34 is a view to explain a method for providing a menu UI according to an exemplary embodiment;

DETAILED DESCRIPTION OF EXEMPLARY EMBODIMENTS

Figure 1:
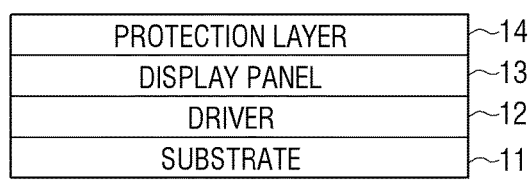
FIG. 1 is a view illustrating a basic structure of a display which constitutes a flexible display apparatus according to an exemplary embodiment.

Hereinafter, exemplary embodiments will be described in greater detail with reference to the accompanying drawings.

In the following description, same reference numerals are used for the same elements depicted in different drawings. The matters defined in the description, such as detailed construction and elements, are provided to assist in a comprehensive understanding of the exemplary embodiments. Thus, it is apparent the exemplary embodiments can be carried out without those specifically defined matters. Also, functions or elements known in the related art are not described in detail since they would obscure the exemplary embodiments with unnecessary detail.

FIG. 1 is a view to explain a basic structure of the display that constitutes a flexible display apparatus according to an exemplary embodiment. Referring to FIG. 1, a display 10 includes a substrate 11, a driver 12, a display panel 13, and a protection layer 14. The flexible display apparatus may be the flexible display apparatus 100 of FIG. 14, which includes display 110, sensor 120, and controller 130. The display 10 may be the display 110.

The flexible display apparatus refers to an apparatus that can be deformed in any number of ways: bent, crooked, folded, twisted, or rolled like paper, while maintaining display characteristics of a flat panel display. Accordingly, the flexible display apparatus should be manufactured on a flexible substrate.

Specifically, the substrate 11 may be implemented using a plastic substrate (for example, a high molecular film) that is deformable by an external pressure.

The plastic substrate has a structure formed by performing barrier coating opposite surfaces of a base film. The base film may be implemented using various resins such as polyimide (PI), polycarbonate (PC), polyethyleneterephtalate (PET), polyethersulfone (PES), polythylenenaphthalate (PEN), and fiber reinforced plastic (FRP). The barrier coating is performed on the opposite surfaces of the base film, and an organic membrane or an inorganic membrane may be used for the purpose of maintaining flexibility.

The substrate 11 may be formed of a flexible material, such as thin glass or metal foil, besides the plastic substrate.

The driver 12 drives the display panel 13. Specifically, the driver 12 applies a driving voltage to a plurality of pixels that constitute the display panel 13, and may be implemented by using a-si TFT, a low temperature poly silicon (LTPS) TFT, or an organic TFT (OTFT). The driver 12 may also be implemented in various forms according to the form of the display panel 13. For instance, the display panel 13 may consist of an organic light emitting substance that includes a plurality of pixel cells, and an electrode layer which covers opposite surfaces of the organic light emitting substance. In this case, the driver 12 may include a plurality of transistors corresponding to the plurality of pixel cells of the display panel 13. An electric signal is applied to a gate of each transistor and the pixel cells connected to the transistors are controlled to emit light. Accordingly, an image is displayed.

The display panel 13 may be implemented by using an electroluminescent display (EL), an electrophoretic display (EPD), an electrochromic display (ECD), a liquid crystal display (LCD), an active matrix LCD (AMLCD), and a plasma display panel (PDP), besides an organic light emitting diode (OLED). However, if the display panel 13 is embodied by the LCD, the display panel cannot emit light by itself and thus requires a separate backlight unit. If the LCD does not use backlight, the LCD uses ambient light. In order to use the LCD display panel 13 without the backlight unit, an environment, such as an outdoor environment, having ambient light may be used to operate the LCD.

The protection layer 14 protects the display panel 13. For example, the protection layer 114 may be made of ZrO, CeO2, or ThO2. The protection layer 14 may be manufactured as a transparent film and may cover the entire surface of the display panel 13.

The display 10 may be implemented using electronic paper (e-paper). The e-paper is a display that applies general ink characteristics to paper, and is different from a general flat panel display in that it uses reflected light. The electronic paper may change a picture or text using electrophoresis, which uses a twist ball or a capsule.

If the display 10 includes elements made of a transparent material, the display 10 may be implemented as a display apparatus that is bendable and transparent. For example, if the substrate 11 is made of a polymer material, such as transparent plastic, if the driver 12 is implemented by using a transparent transistor, and if the display panel 13 is implemented using a transparent organic light emitting layer and a transparent electrode, the display 10 may have transparency.

The transparent transistor refers to a transistor that is manufactured by substituting opaque silicon of an existing thin film transistor with a transparent material, such as zinc oxide or titanium oxide. The transparent electrode may be made of advanced materials, such as indium tin oxide (ITO) or graphene. Graphene refers to a transparent material that has a planar structure of a honeycomb shape in which carbon atoms are connected to one another. The transparent organic light emitting layer may be implemented by using various materials. FIGS. 2 to 5 are views to explain an example of a method for sensing shape deformation in the flexible display apparatus according to an exemplary embodiment.

The flexible display apparatus can be deformed by an external pressure. The term deformation may include "bending", "folding" and "rolling". Normal bending may be a state in which the flexible display apparatus 100 is bent.

Folding refers to a state in which the flexible display apparatus 100 is folded. Folding and bending may be distinguished from each other by a degree of deformation. For example, if deformation is performed by more than a predetermined bending angle, the deformation is defined as folding, and, if deformation is performed by less than the predetermined bending angle, the deformation is defined as bending.

Rolling refers to a state in which the flexible display apparatus is rolled. Rolling is also determined based on a degree of deformation, such as the bending angle. For example, if deformation by more than a predetermined bending angle is sensed over a predetermined area, the deformation is defined as rolling. On the other hand, if deformation by less than the predetermined bending angle is sensed in an area relatively smaller than that of rolling, the deformation is defined as folding. The bending, folding and rolling described above may be determined based on a radius of curvature besides the bending angle.

Also, a state in which the rolled flexible display apparatus 100 has a substantially circular or ovular cross section may be defined as rolling, regardless of a radius of curvature.

The various shape deformation examples described above are merely exemplary and shape deformation may be defined differently according to the type, size, weight, and characteristic of the flexible display apparatus. For example, if the flexible display apparatus 100 can be bent to such an extent that the surfaces are in contact with each other, the state in which the surfaces of the flexible display apparatus 100 are in contact with each other by bending may be defined as folding. On the other hand, a state in which a front surface and a rear surface of the flexible display apparatus are in contact with each other may be defined as rolling.

A flexible display apparatus 100 may sense deformation in various ways.

For example, a sensor (not shown) may include a deformation sensor disposed on one surface such as a front surface or a rear surface of the display 110, or a deformation sensor which is disposed on opposite surfaces of the display 110.

The deformation sensor refers to a sensor that can be deformed and has a resistance value that varies according to a degree of deformation. The deformation sensor may be implemented using devices, such as an optical fiber bending sensor, a pressure sensor, and a strain gauge.

The sensor (not shown) may sense a resistance value of the deformation sensor using a level of a voltage applied to the deformation sensor or an intensity of a current flowing in the sensor, and may sense deformation in a location of the deformation sensor according to the sensed resistance value.

FIG. 2 is a view to explain an arrangement pattern of deformation sensors according to an exemplary embodiment.

In view (a) of FIG. 2, the deformation sensor is embedded in the front surface of the display 110. However, this is merely an example and the deformation sensor may be embedded in the rear surface of the display 110 or may be embedded in opposite surfaces. Also, the shape, number, and location of deformation sensors may be changed. For example, the display 110 may include a single deformation sensor or a plurality of deformation sensors connected to one another. The single deformation sensor may sense deformation data, but may include a plurality of sensing channels to sense a plural deformation data.

View (a) of FIG. 2 illustrates an example of a plurality of bar-shaped deformation sensors arranged in a vertical direction and a horizontal direction in a grid pattern.

Referring to view (a) of FIG. 2, the deformation sensor includes deformation sensors 21-1 to 21-5 arranged in a first direction, and deformation sensors 22-1 to 22-5 arranged in a second direction perpendicular to the first direction. The deformation sensors are disposed away from one another by a predetermined distance.

In view (a) of FIG. 2, five deformation sensors (21-1 to 21-5, 22-1 or 22-5) are arranged in each of the horizontal direction and the vertical direction in a grid formation. However, this is merely an example and the number of deformation sensors may be changed according to a size of the flexible display apparatus 100. The deformation sensors are arranged in the horizontal direction and the vertical direction for sensing deformation over the entire area of the flexible display apparatus. Therefore, if only a part of the flexible display apparatus is flexible or if the flexible display apparatus needs to sense deformation from only a part of the apparatus, the deformation sensor may be arranged in only a corresponding portion of the apparatus.

Each of the deformation sensors 21-1 to 21-5, 22-1 to 22-5 may be implemented by using an electric resistance sensor that uses an electric resistance, or a micro optical fiber sensor that uses a strain of an optical fiber. Hereinafter, the deformation sensor will be explained on the assumption that the deformation sensor is the electric resistance sensor for the convenience of explanation.

Specifically, if the flexible display apparatus 100 is bent so that a center area with reference to left and right edges is oriented downwardly, as shown in view (b) of FIG. 2, tension caused by bending is exerted on the deformation sensors 21-1 to 21-5 arranged in the horizontal direction. Therefore, the resistance value of each of the deformation sensors 21-1 to 21-5 arranged in the horizontal direction is changed. The sensor (not show) senses the change in the output value output from each of the deformation sensors 21-1 to 21-5 and thus determines that bending is performed in the horizontal direction with reference to the center of a display surface. In FIG. 4, the center area is bent in a downward direction (hereinafter, referred to as a Z− direction) perpendicular to the display surface. However, even if the center area is bent in an upward direction (hereinafter, referred to as a Z+ direction) with reference to the display surface, the bending may be sensed based on the change in the output values of the deformation sensors 21-1 to 21-5 arranged in the horizontal direction.

Also, if the flexible display apparatus 100 is bent so that the center area with reference to upper and lower edges is oriented upwardly as shown in view (c) FIG. 2, tension is exerted on the deformation sensors 22-1 to 22-5 arranged in the vertical direction. The sensor (not shown) may sense shape deformation of the vertical direction based on the output values of the deformation sensors 22-1 to 22-5 arranged in the vertical direction. Although the bending in the Z+ direction is illustrated in FIG. 5, bending in the Z− direction may also be sensed using the deformation sensors 22-1 to 22-5 arranged in the vertical direction.

If shape deformation occurs in a diagonal direction, tension is exerted on all of the deformation sensors arranged in the horizontal direction and the vertical direction. Therefore, the shape deformation of the diagonal direction may be sensed based on the output values of the deformation sensors arranged in the horizontal and vertical directions.

FIG. 3 is a view to explain an arrangement pattern of bend sensors according to an exemplary embodiment;

View (a) of FIG. 3 is a view illustrating an example of a single deformation sensor disposed on one surface of the display 110 to sense deformation. Referring to view (a) of FIG. 3, a deformation sensor 71 may be implemented in a form of a looped curve forming a circle, a quadrangle, or other polygons, and may be disposed along an edge of the display 110. The flexible display apparatus may determine a point at which a change in an output value of the looped curve is sensed to be a bending area.

View (b) of FIG. 3 is a view illustrating two intersecting deformation sensors. Referring to view (b) of FIG. 3, a first deformation sensor 71 is disposed on a first surface of the display 110 and a second deformation sensor 72 is disposed on a second surface of the display 110. The first deformation sensor 71 is disposed on the first surface of the display 110 in a first diagonal direction, and the second deformation sensor 72 is disposed on the second surface in a second diagonal direction. Accordingly, output values and output points of the first and second deformation sensors 71 and 72 are changed according to various deformation conditions, such as a case in which each corner is bent, a case in which each edge is bent, a case in which a center is bent, and a case in which folding or rolling is performed. Accordingly, the flexible display apparatus may determine which type of deformation is performed according to a characteristic of the output value.

Although line type deformation sensors are used in the above-described various exemplary embodiments, deformation may be sensed using a plurality of separate strain gages.

Views (c) and (d) of FIG. 3 are views to explain a method for sensing bending using a plurality of strain gages. The strain gage uses metal or a semiconductor in which a resistance is greatly changed according to an applied force, and senses deformation of a surface of an object to be measured according to a change in the resistance value. It is common that a material, such as metal, increases in resistance if the metal is stretched by an external force, and decreases in resistance value if the length is contracted. Accordingly, it is determined whether bending is performed or not by sensing a change in the resistance value.

Referring to view (c) of FIG. 3, a plurality of strain gages are arranged along an edge of the display 110. The number of strain gages may be changed according to a size and a shape of the display 110, or a predetermined deformation sensing resolution.

In the state in which the strain gages are arranged as shown in view (c) of FIG. 3, a user may bend a certain point in a certain direction. Specifically, if a certain corner is bent as shown in (d) of FIG. 3, a force is exerted to a strain gage 80-$x$ among strain gages 80-1 to 80-$n$ arranged in a horizontal direction. Accordingly, an output value of the corresponding strain gage 80-$x$ increases in comparison with output values of the other strain gages. Also, a force is exerted to a strain gage 80-$y$ among strain gages 80-$n$, 80-$n$+1 to 80-$m$ arranged in a vertical direction, and thus an output value is changed. The flexible display apparatus determines a line connecting the two strain gages 80-$x$ and 80-$y$ in which the output values are changed as a bending line. It should be noted that interpolation between multiple sensors may be performed to determine the bending line, and the bending line may be approximated to a straight line by smoothing the values output by the sensors.

Hereinafter, a method for sensing shape deformation, such as bending, folding, and rolling will be explained in detail.

FIG. 4 is a view to explain a method for sensing bending in the flexible display apparatus using the deformation sensors according to an exemplary embodiment.

First, view (a) FIG. 4 is a cross section view of the flexible display apparatus 100 when the flexible display apparatus is bent.

If the flexible display apparatus 100 is bent, the deformation sensors, which are arranged on one surface or opposite surfaces of the flexible display apparatus 100, are also bent and have resistance values corresponding to a magnitude of exerted tension, and output values corresponding to the resistance values.

For instance, if the flexible display apparatus 100 is bent as shown in view (a) of FIG. 4, a deformation sensor 41-1 disposed on a rear surface of the flexible display apparatus 100 is also bent and outputs a resistance value according to a magnitude of exerted tension.

In this case, the magnitude of the tension increases in proportion to a degree of bending. If the bending occurs as shown in view (a) of FIG. 4, the greatest bending occurs in the center area. That is to say, the point of maximum tension may be determined to be the point of greatest bending. Accordingly, the greatest tension is exerted to the deformation sensor 41-1, which is disposed at a point a3 at the center area, and accordingly, the deformation sensor 41-1 has the greatest resistance value. On the other hand, the degree of bending decreases toward the outside, i.e., edges of the flexible display apparatus 100. Accordingly, the deformation sensor 41-1 has smaller resistance values as the distance from the point a3 increases.

If the resistance value output from the deformation sensor has the greatest value at a specific point and gradually decreases in opposite directions, the sensor (not shown) may determine that the area from which the greatest resistance value is sensed is most significantly bent. Also, if an area has no change in the resistance value, the sensor (not shown) determines that the area is a flat area and bending is not performed, and, if an area has the resistance value changed greater than a predetermined value, determines that the area is a bent area in which any degree of bending occurs.

Views (b) and (c) of FIG. 4 are views to explain a method for defining a bending area according to an exemplary embodiment. Views (b) and (c) of FIG. 4 are views to explain the case in which the flexible display apparatus 100 is bent in the horizontal direction with reference to the front surface, and thus do not illustrate the deformation sensors arranged in the vertical direction for the convenience of explanation. Although different reference numerals are used for the deformation sensors in each drawing, the deformation sensors illustrated in view (a) of FIG. 2 may be employed.

A bending area is an area in which the flexible display apparatus is bent. Since the deformation sensor is bent when the flexible display apparatus 100 is bent, all points at which the deformation sensors output different resistance values from original resistance, i.e., resistance values when no deformation exists, values may be defined as a bending area.

The sensor (not shown) may sense a size of a bending line, a direction of the bending line, a location of the bending line, a number of bending lines, a number of times that bending is performed, a bending speed, a size of a bending area, a location of the bending area, and a number of bending areas, based on a relationship between the points at which a change in the resistance value is sensed. The bending line will be described later.

Specifically, if a distance between points, at which the change in the resistance value is sensed, lies within a predetermined distance, the points are sensed as one bending area. On the other hand, if the distance between the points, at which the change in the resistance value is sensed, lies beyond the predetermined distance, different bending areas are defined with reference to these points. This will be explained in detail below with reference to views (b) and (c) of FIG. 4

View (b) of FIG. 4 is a view to explain a method for sensing a bending area. If the flexible display apparatus 100 is bent as shown in (b) of FIG. 4, the resistance values from points a1 to a5 of a deformation sensor 41-1, from points b1 to b5 of a deformation sensor 41-2, from c1 to c5 of a deformation sensor 41-3, from points d1 to d5 of a deformation sensor 41-4, and from points e1 to e5 of a deformation sensor 41-5 are different from those in the original state in which the deformation sensors are not deformed.

In this case, the points at which the change in the resistance value is sensed in each deformation sensor 41-1 to 41-5 are located within a predetermined distance and are continuously arranged, and define a bending area.

Accordingly, the sensor (not shown) senses an area 42 that includes all of the points, from points a1 to a5 of the deformation sensor 41-1, from points b1 to b5 of the deformation sensor 41-2, from points c1 to c5 of the deformation sensor 41-3, from points d1 to d5 of the deformation sensor 41-4, and from points e1 to e5 of the deformation sensor 41-5, as one bending area.

View (c) FIG. 4 is a view to explain a method for sensing a plurality of bending areas.

In view (c) FIG. 4, according to bending of the flexible display apparatus, the resistance values from points a1 to a2 and from points a4 to a5 of the bend sensors 41-1, from points b1 to b2 and from points b4 to b5 of the bend sensor 41-2, from the points c1 to c2 and from points c4 to c5 of the bend sensor 41-3, from the points d1 to d2 and from the points d4 to d5 of the bend sensors 41-4, and from the points e1 to e2 and from the points e4 to e5 of the bend sensor 41-5 are different from those in the original state.

The points from a1 to a2 and the points from a4 to a5 of the deformation sensor 41-1 are continuous with reference to each point. However, since a point a3 exists between the points a2 and a4, the points from a2 to a4 are not continuous. Accordingly, if the points a2 and a4 are regarded as being disposed away from each other by a predetermined distance, the bending area is determined to be a first bending area from the points a1 to a2 and a second bending area from the points a4 to a5. Also, the points in the other deformation sensors 41-2 to 41-5 may be divided in this way.

Accordingly, the flexible display apparatus 100 defines an area 44 including all of the points from a1 to a2 of the deformation sensor 41-1, from b1 to b2 of the deformation sensor 41-2, from c1 to c2 of the deformation sensor 41-3, from d1 to d2 of the deformation sensor 41-4, and from e1 to e2 of the deformation sensor 41-5, as a first bending area, and defines an area 45 including all of the points from a4 to a5 of the deformation sensor 41-1, from b4 to b5 of the deformation sensor 41-2, from c4 to c5 of the deformation sensor 41-3, from d4 to d5 of the deformation sensor 41-4, and from e4 to e5 of the deformation sensor 41-5, as a second bending area.

A bending line may be disposed within the bending area. The bending line refers a line that connects the points, at which the greatest resistance value is sensed, in each bending area. The bending line may be a line points of greatest resistance of each deformation sensor, or may be a line of points of greatest resistance on fewer deformation sensors, such as two consecutive sensors or two outermost sensors.

For instance, in the case of view (b) of FIG. 4, a line 43 in the bending area 42, which connects the point a3 at which the greatest resistance value is output in the deformation sensor 41-1, the point b3 at which the greatest resistance value is output in the deformation sensor 41-2, the point c3 at which the greatest resistance value is output in the deformation sensor 41-3, the point d3 at which the greatest resistance value is output in the deformation sensor 41-4, and the point e3 at which the greatest resistance value is output in the deformation sensor 41-5, is defined as a bending line. View (b) of FIG. 4 illustrates the bending line which is formed in the center area of the display surface in the vertical direction.

In the case of view (c) of FIG. 4, a line 46 in the bending area 44, which connects the point a1 at which the greatest resistance value is output in the deformation sensor 41-1, the point b1 at which the greatest resistance value is output in the deformation sensor 41-2, the point c1 at which the greatest resistance value is output in the deformation sensor 41-3, the point d1 at which the greatest resistance value is output in the deformation sensor 41-4, and the point e1 at which the greatest resistance value is output in the deformation sensor 41-5, is defined as one bending line. Also, a line 47 in the bending area 45, which connects the point a5 at which the greatest resistance value is output in the deformation sensor 41-1, the point b5 at which the greatest resistance value is output in the deformation sensor 41-2, the point c5 at which the greatest resistance value is output in the deformation sensor 41-3, the point d5 at which the greatest resistance value is output in the deformation sensor 41-4, and the point e5 at which the greatest resistance value is output in the deformation sensor 31-5, is defined as another bending line. That is, in (c) of FIG. 4, the two bending lines are formed along the left and right edges of the display surface.

FIG. 5 is a view to explain an example of a method for sensing folding of the flexible display apparatus.

First, view (a) of FIG. 5 is a cross section view of the flexible display apparatus 100 when the flexible display apparatus 100 is folded.

If the flexible display apparatus 100 is folded, a deformation sensor disposed on one surface or opposite surfaces of the flexible display apparatus 100 is also bent and has a resistance value corresponding to a magnitude of exerted tension.

For example, if the right edge of the flexible display apparatus 100 is folded in a direction toward the center as shown in view (a) of FIG. 5, a bend sensor 51-1, which is disposed on the rear surface of the flexible display apparatus 100, is also bent and outputs a resistance value according to a magnitude of exerted tension.

That is, like in the case of bending, the deformation sensor 51-1 has the greatest resistance value at a point a3 at which the magnitude of the exerted tension is greatest, and has smaller resistance values as distance from the point a3 increases. That is, the deformation sensor 51-1 has smaller resistance values distance from the point a3 to points a2 and a1 or points a4 and a5 increases.

If the flexible display apparatus 100 is folded, or bent greater than a predetermined bending angle, a resistance value greater than a predetermined value is sensed at a point corresponding to a bending line. Accordingly, the flexible display apparatus may determine whether the deformation is folding or bending according to a level of the resistance value.

If the flexible display apparatus 100 is bendable to such an extent that to points of a same surface contact each other, the flexible display apparatus may determine whether the deformation is folding, considering the contact as well. That is, if the right edge of the flexible display apparatus 100 is bent in the Z+ direction and is folded toward the front surface as shown in view (a) of FIG. 5, areas spaced apart from each other are brought into contact with each other on the front surface of the flexible display apparatus. In this case, the contact is sensed in one area of the display surface and a change in the resistance value is greater than that in bending. Accordingly, the flexible display apparatus calculates a distance from the edge where bending occurs to the bending line, and, if touch is sensed at a point which is distanced away from the bending line in the opposite direction as much as the calculated distance, determines that folding is performed.

View (b) of FIG. 5 is a view to explain a method for determining a folding area according to an exemplary embodiment. Since view (b) of FIG. 5 is to explain a case in which the flexible display apparatus is folded in the horizontal direction with reference to the front surface, deformation sensors which are the vertical direction are not illustrated for the convenience of explanation.

A folding area is an area formed when the flexible display apparatus is folded, and may be defined as one or more areas including all points of the deformation sensors that output resistance values different from those of the original state when the deformation sensors are bent. The method for defining the folding area is the same as for the bending area and thus a redundant explanation is omitted.

Referring to view (b) of FIG. 5, an area 52, which includes points at which output resistance values are different from those of the original state, that is from points a1 to a5 of a deformation sensor 51-1, from points b1 to b5 of a deformation sensor 51-2, from points c1 to c5 of a deformation sensor 51-3, from points d1 to d5 of a deformation sensor 51-4, and from points e1 to e5 of a deformation sensor 51-5, is defined as one folding area.

The folding area may be divided into two areas with reference to a folding line. The folding line refers to a line that connects points at which the greatest resistance value is output in each folding area.

In view (b) of FIG. 5, a line 53 in the folding area 52, which connects the point a3 at which the deformation sensor 51-2 outputs the greatest resistance value, the point b3 at which the deformation sensor 51-2 outputs the greatest resistance value, the point c3 at which the deformation sensor 51-3 outputs the greatest resistance value, the point d3 at which the deformation sensor 51-4 outputs the greatest resistance value, and the point e3 at which the deformation sensor 51-5 outputs the greatest resistance value, is defined as the folding line.

If folding is sensed, the flexible display apparatus may perform a different operation from that of deformation bending. For example, the flexible display apparatus may display a different content screen on each folding area.

As described above, the flexible display apparatus 100 may be rolled like paper. The flexible display apparatus may determine whether rolling is performed using a result sensing by the sensor 120.

FIG. 6 is view to explain a method for sensing rolling of the flexible display apparatus.

First, view (a) of FIG. 6 illustrates a cross section view when the flexible display apparatus 100 is rolled.

As described above, if the flexible display apparatus 100 is rolled, tension is exerted on deformation sensors arranged on one surface or opposite surfaces of the flexible display apparatus.

In this case, since magnitudes of tension exerted on the deformation sensors are deemed to be similar within a predetermined range, resistance values output from the deformation sensors are also similar within a predetermined range.

When rolling is performed, bending should be performed having a curvature greater than a predetermined curvature. If rolling is performed, a bending area greater than that of bending or folding is formed. Accordingly, if bending of an angle greater than a predetermined bending angle is continuously performed over an area greater than a predetermined size, the flexible display apparatus determines that rolling is performed. Also, in the rolling state, the front surface and the rear surface of the flexible display apparatus are brought into contact with each other. For example, as shown in view (a) of FIG. 6, if one edge of the flexible display apparatus 100 is bent in the Z+ direction and is rolled inward the display surface, the display surfaces, that is, the front surface, and the rear surface on which a bend sensor 60-1 is disposed are brought into contact with each other.

Accordingly, in another example, the flexible display apparatus may determine whether the flexible display apparatus 100 is rolled according to whether the front surface and the rear surface of the flexible display apparatus 100 are brought into contact with each other. In this case, the sensor (not shown) may include a touch sensor. If the resistance values output from the deformation sensors are similar within a predetermined range and touch is sensed by the touch sensors disposed on the front surface and the rear surface of the flexible display apparatus, the flexible display apparatus determines that the flexible display apparatus is rolled. Also, the flexible display apparatus may determine whether the flexible display apparatus 100 is bent and some areas of the flexible display apparatus 100 are brought into contact with each other or close to each other using a magnetic sensor, an optical sensor, or a proximity sensor instead of the touch sensor.

Views (b) and (c) of FIG. 6 are views to explain a method for defining a rolling area according to an exemplary embodiment.

The rolling area refers to an area of the flexible display apparatus that is rolled. Like in bending or folding, the rolling area refers to one or more areas that include all points of deformation sensors at which different resistance values from those of the original state are output. The method for defining the rolling area is the same as that of the bending or folding area, and thus a redundant explanation is omitted.

If the flexible display apparatus 100 is rolled as shown in view (b) of FIG. 6, an entire area 61 of the flexible display apparatus 100 is defined as the rolling area. If the flexible display apparatus 100 is rolled in part and points at which different resistance values from those of the original state are output are distanced from each other by a predetermined distance as shown in (c) of FIG. 6, partial areas 62 and 63 of the flexible display apparatus 100 are defined as different rolling areas. Accordingly, there may be a first rolling area 62 and a second rolling area 63.

As described above, the flexible display apparatus 100 is deformed in various shapes and the flexible display apparatus senses each deformation shape based on a result of sensing by the sensor (not shown). Also, the flexible display apparatus may sense a degree of bending, that is, a bending angle, based on a result of sensing by the sensor (not shown).

Although not shown, the flexible display apparatus 100 determines a degree of bending of the flexible display apparatus 100 using a change in the resistance value output from the deformation sensor at a predetermined interval. Specifically, the flexible display apparatus 100 calculates a difference between a resistance value of a point where the greatest resistance value of a deformation sensor is output and a resistance value output at a point which is disposed away from the point of the greatest resistance value by a predetermined distance.

The flexible display apparatus determines a degree of bending using the calculated difference in the resistance value. Specifically, the flexible display apparatus 100 divides the degree of bending into a plurality of levels, matches each level with a resistance value of a predetermined range, and stores the matched values.

Accordingly, the flexible display apparatus 100 determines the degree of bending according to which level of the plurality of levels corresponds to the calculated resistance value difference.

The flexible display apparatus may perform an appropriate operation according to a degree of bending. For example, if the degree of bending is great while a channel zapping operation is performed, the flexible display apparatus 100 may increase a channel zapping speed or may extend a channel zapping range. On the other hand, if the degree of bending is low, the channel zapping is performed more slowly or within a smaller number of channels. Volume control or content conversion may be performed differently according to the degree of bending.

As described above, the flexible display apparatus 100 may be bent in different directions, a Z+ direction or a Z− direction.

The bending direction may be sensed in various ways. For instance, two deformation sensors may be disposed one on the other and the bending direction is determined based on a difference in change in the resistance value of each bend sensor.

FIG. 7 explains a method for sensing a deformation direction using overlapping deformation sensors according to an exemplary embodiment.

For the convenience of explanation, in views (a) to (c) of FIG. 7, the method is explained on the assumption that bending is performed. However, the same method may be applied to folding or rolling.

Referring to view (a) of FIG. 7, two deformation sensors 71 and 72 may be disposed overlapping each other on one side of the display 110. In this case, if bending is performed in one direction, different resistance values are output from the upper deformation sensor 71 and the lower deformation sensor 72 at a point where the bending is performed. Accordingly, a bending direction may be determined by comparing the resistance values of the two deformation sensors 71 and 72 at the same point.

Specifically, if the flexible display apparatus 100 is bent in the Z+ direction as shown in view (a) of FIG. 7, tension exerted to the lower deformation sensor 72 is greater than that of the upper deformation sensor 71 at a point 'A' corresponding to a bending line.

On the other hand, if the flexible display apparatus 100 is bent toward the rear surface as shown in view (b) of FIG. 7, tension exerted to the upper deformation sensor 71 is greater than that of the lower deformation sensor 72.

Accordingly, the flexible display apparatus 130 senses the bending direction by comparing the resistance values of the two deformation sensors 71 and 72 at the point A.

Although the two deformation sensors are disposed overlapping each other on one side of the display 110 in views (a) to (c) of FIG. 7, the deformation sensors may be disposed on opposite surfaces of the display 110.

View (d) of FIG. 7 illustrates the two deformation sensors 71 and 72 which are disposed on the opposite surfaces of the display 110.

Accordingly, if the flexible display apparatus 100 is bent in a first direction perpendicular to the screen, that is, the Z+ direction, the deformation sensor disposed on a first surface of the opposite surfaces of the display 110 is subject to a compressive force, whereas the deformation sensor disposed on a second surface is subject to tension. On the other hand, if the flexible display apparatus 100 is bent in a second direction opposite to the first direction, that is, the Z− direction, the deformation sensor disposed on the second surface is subject to a compressive force, whereas the deformation sensor disposed on the first surface is subject to tension. As described above, the different values are detected from the two deformation sensors according to the bending direction and the flexible display apparatus determines the deformation direction according to a detection characteristic of the value.

Although the bending direction is sensed using the deformation bend sensors in views (a) to (d) of FIG. 7, the bending direction may be sensed by means of only a strain gage disposed on one surface of the display 110. That is, a compressive force or tension is exerted to the strain gage disposed on one surface according to a bending direction, and thus a bending direction can be determined by identifying a characteristic of the output value.

Figure 8:
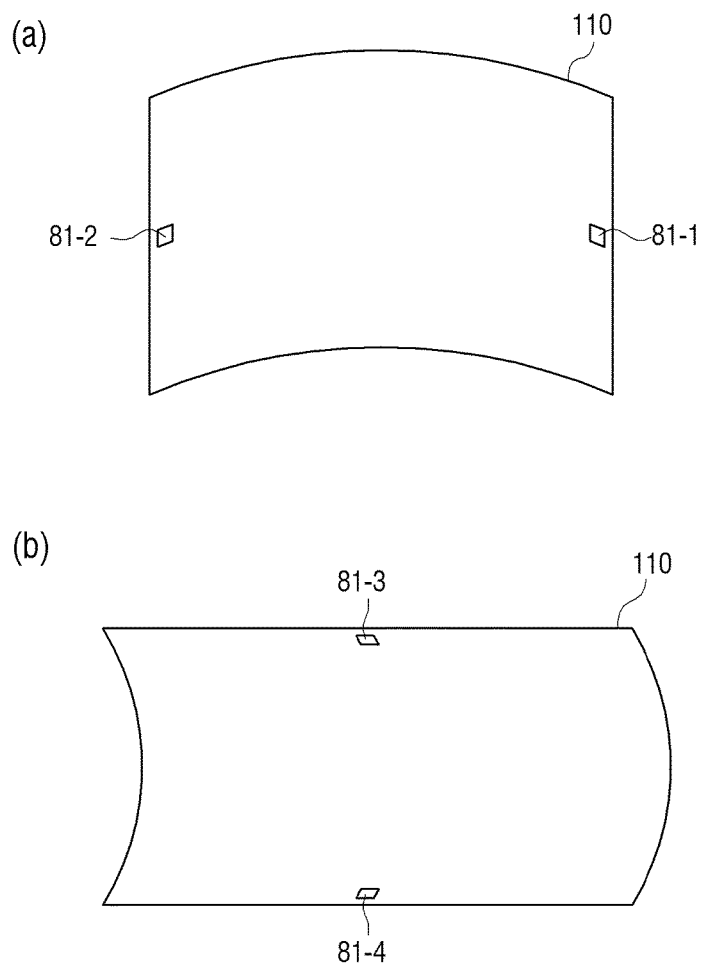
FIG. 8 is a view to explain a method for sensing a bending direction according to an exemplary embodiment.

FIG. 8 is a view to explain a method for sensing a deformation direction according to an exemplary embodiment. Again, the deformation is presumed to be bending.

Views (a) and (b) of FIG. 8 are views to explain a method for sensing a bending direction using, for example, an acceleration sensor. Referring to views (a) and (b) of FIG. 8, the flexible display apparatus 100 includes a plurality of acceleration sensors 81-1 and 81-2.

The acceleration sensors 81-1 and 81-2 measure acceleration of a motion and a direction of the acceleration. Specifically, the acceleration sensors 81-1 and 81-2 output a sensing value corresponding to, for example, acceleration of gravity that changes according to a slope of an apparatus at which those sensors are attached. Accordingly, if the acceleration sensors 81-1 and 81-2 are disposed on opposite edges of the flexible display apparatus, output values sensed by the acceleration sensors 81-1 and 81-2 are changed when the flexible display apparatus 100 is bent. The flexible display apparatus calculates a pitch angle and a roll angle using the output values sensed by the acceleration sensors 81-1 and 81-2. Accordingly, the flexible display apparatus may determine a bending direction based on changes in the pitch angle and the roll angle sensed by the acceleration sensors 81-1 and 81-2.

In view (a) of FIG. 8, the acceleration sensors 81-1 and 81-2 are disposed on opposite edges in the horizontal direction with reference to the front surface of the flexible display apparatus 100. However, the acceleration sensors may be disposed in the vertical direction as shown in view (b) of FIG. 8. In this case, if the flexible display apparatus 100 is bent in the vertical direction, a bending direction is sensed according to measurement values sensed by the acceleration sensors 81-3 and 81-4 in the vertical direction.

In views (a) and (b) of FIG. 8, the acceleration sensors are disposed on the left and right edges or the upper and lower edges of the flexible display apparatus 100. However, the acceleration sensors may be disposed all of the left, right, upper and right edges or may be disposed on corners.

A bending direction may be sensed using a gyro sensor or a geomagnetic sensor instead of the acceleration sensor. The gyro sensor refers to a sensor which, if a rotational motion occurs, detects an angular velocity by measuring Coriolis' force exerted in a velocity direction of the motion. Based on a measurement value of the gyro sensor, a direction of the rotational motion can be sensed and thus a bending direction can also be sensed. The geomagnetic sensor refers to a sensor that senses azimuth using a 2-axis or 3-axis fluxgate. If such a geomagnetic sensor is applied, the geomagnetic sensor disposed on each edge of the flexible display apparatus 100 suffers from location movement when the edge is bent, and outputs an electric signal corresponding to a change in geomagnetism caused by the location movement. The flexible display apparatus may calculate a yaw angle using the value output from the geomagnetic sensor. According to a change in the calculated yaw angle, various bending characteristics such as a bending area and a bending direction can be determined.

As described above, the flexible display apparatus 100 may sense deformation using various kinds of sensors. The above-described methods for arranging the sensors and methods for sensing may be applied to the flexible display apparatus 100 individually or may be applied in combination.

The sensor 120 may sense user's touch manipulation on a screen of the display 110 in addition to sensing the deformation.

For instance, the sensor (not shown) may include a transparent conductive oxide film such as an indium-tin oxide (ITO) deposited on the substrate 11 of the display 110, and a film formed on an upper portion of the transparent conductive oxide film. Accordingly, if the user touches the screen, upper and lower plates at the touched point are brought into contact with each other and an electric signal is transmitted to a controller 130. The controller 130 recognizes the touched point using coordinates of an electrode to which the electric signal is transmitted. The touch sensing method is disclosed in various prior arts and thus a redundant explanation is omitted.

If touch or deformation is sensed, the flexible display apparatus determines whether user manipulation, such as the touch or deformation, is intended. Hereinafter, a method for determining a user manipulation intention according to an exemplary embodiment will be explained.

FIG. 9 is a view to explain an example of a control system according to an exemplary embodiment.

A control system according to an exemplary embodiment may include a flexible display apparatus 100, an electronic apparatus 200, and a server 300. Hereinafter, control systems according to exemplary embodiment swill be explained.

As shown in view (a) FIG. 9, a control system according to an exemplary embodiment may include a flexible display apparatus 100 and an electronic apparatus 200.

If a predetermined event is generated, the flexible display apparatus 100 communicates with the electronic apparatus 100 and controls the electronic apparatus 200. The predetermined event may be an event that is generated on the flexible display apparatus 100 or the electronic apparatus 200. For example, the predetermined event may indicate a case in which the flexible display apparatus 100 receives a user command to select the electronic apparatus 200 as a controlled apparatus that the user desires to control through the flexible display apparatus 100.

The flexible display apparatus 100 may be implemented by using various types of compact and portable apparatuses having a display function, such as a mobile phone, a tablet, a personal digital assistant (PDA), an MP3 player, an e-book, a subcompact PC, a smart card, and an electronic scheduler. However, the flexible display apparatus 100 may be implemented using an apparatus equipped with a larger screen, such as a notebook computer, a monitor, and a TV.

The flexible display apparatus 100 may have its shape changed according to external pressure. For example, the shape of the flexible display apparatus 100 may be deformed by a force exerted by a user's hand. However, according a situation, the shape of the flexible display apparatus 100 may be automatically changed by a voltage applied thereto. Detailed examples of the shape deformation will be explained later.

The flexible display apparatus 100 may provide a UI including a UI corresponding to at least one control mode (hereinafter, referred to as a control mode UI) for remotely controlling the electronic apparatus 200.

Specifically, the flexible display apparatus 100 may provide a control mode UI of a control mode corresponding to shape deformation from among a variety of control modes for controlling the electronic apparatus 200. For example, the control mode UI may be a remote control mode UI and will be explained in detail below.

The electronic apparatus 200 is a controlled apparatus controlled by the flexible display apparatus 100, and may be implemented by a display apparatus, such as a digital TV, a PC, a digital versatile disk (DVD) player, and a navigation apparatus, but is not limited to these. For example, the electronic apparatus 200 may be alternatively implemented by various home appliances, such as an air conditioner, a refrigerator, and a door system. The electronic apparatus may also be a mobile device, another flexible display apparatus, or a server to be controlled.

The flexible display apparatus 100 and the electronic apparatus 200 may communicate with each other using various communication methods. For example, communication may be performed over Wi-Fi (Wireless Fidelity), Bluetooth, LAN, PAN, WAN, Wired I/O, Ethernet, TPC/IP, IPX, FireWire, IEEE 1394, iLink, CDMA, TDMA, high definition multimedia interface (HDMI)-CEC, Wireless HDMI-CEC, radio frequency (RF), and NFC interface.

For example, if the flexible display apparatus 100 is connected to the electronic apparatus 200, the flexible display apparatus 100 searches for the electronic apparatus 200 according to a user command or a predetermined event, accesses the electronic apparatus 200, and remotely controls the electronic apparatus 200.

As shown in view (b) of FIG. 9, a control system according to an exemplary embodiment includes a display apparatus 100, an electronic apparatus 200, and a server 300.

The flexible display apparatus 100 and the electronic apparatus 200 are the same as those in the first exemplary embodiment of view (a) of FIG. 9, and a detailed explanation thereof is omitted.

The server 300 communicates with at least one of the display apparatus 100 and the electronic apparatus 200.

Specifically, the server 300 communicates with at least one of the display apparatus 100 and the electronic apparatus 200 using one or more various communication methods, such as Wi-Fi, Internet, LAN, PAN, WAN, Wired I/O, Ethernet, TPC/IP, IPX, FireWire, IEEE 1394, iLink, CDMA, TDMA, HDMI-CEC, and Wireless HDMI-CEC.

The server 300 may provide UI information for configuring a UI corresponding to shape deformation of the flexible display apparatus 100, and corresponding control information for controlling the electronic apparatus 200 via the flexible display apparatus, according to a request of at least one of the flexible display apparatus 100 and the electronic apparatus 200. The server 300 may be implemented by using a cloud server using cloud computing technology, but is not limited to this. Cloud computing refers to cloud-based computing technology, and, for example, is a web-based software service that places a program in a utility data server on the Internet, and imports the program into a computer or mobile phone.

The server 300 may update a variety of UI information and control information corresponding to the UI information (for example, code information) through a corresponding service provider. For example, in the case of a remote control UI, the control information may be an infrared remote control code in a binary code format. Also, in the case of a keyboard code, the control information may be of a Java script mode format.

The server 300 may be embodied by an external server or an embedded type server included in the flexible display apparatus 100 or the electronic apparatus 200, according to an exemplary embodiment. If the server 300 is embodied by an embedded server in the electronic apparatus 200, the electronic apparatus 200 may provide the above-described UI information and corresponding control information. Additionally, the server 300 may be a mobile device, such as a smart phone, that operations in collaboration with the flexible display apparatus 100 to control the electronic apparatus 200.

Figure 10:
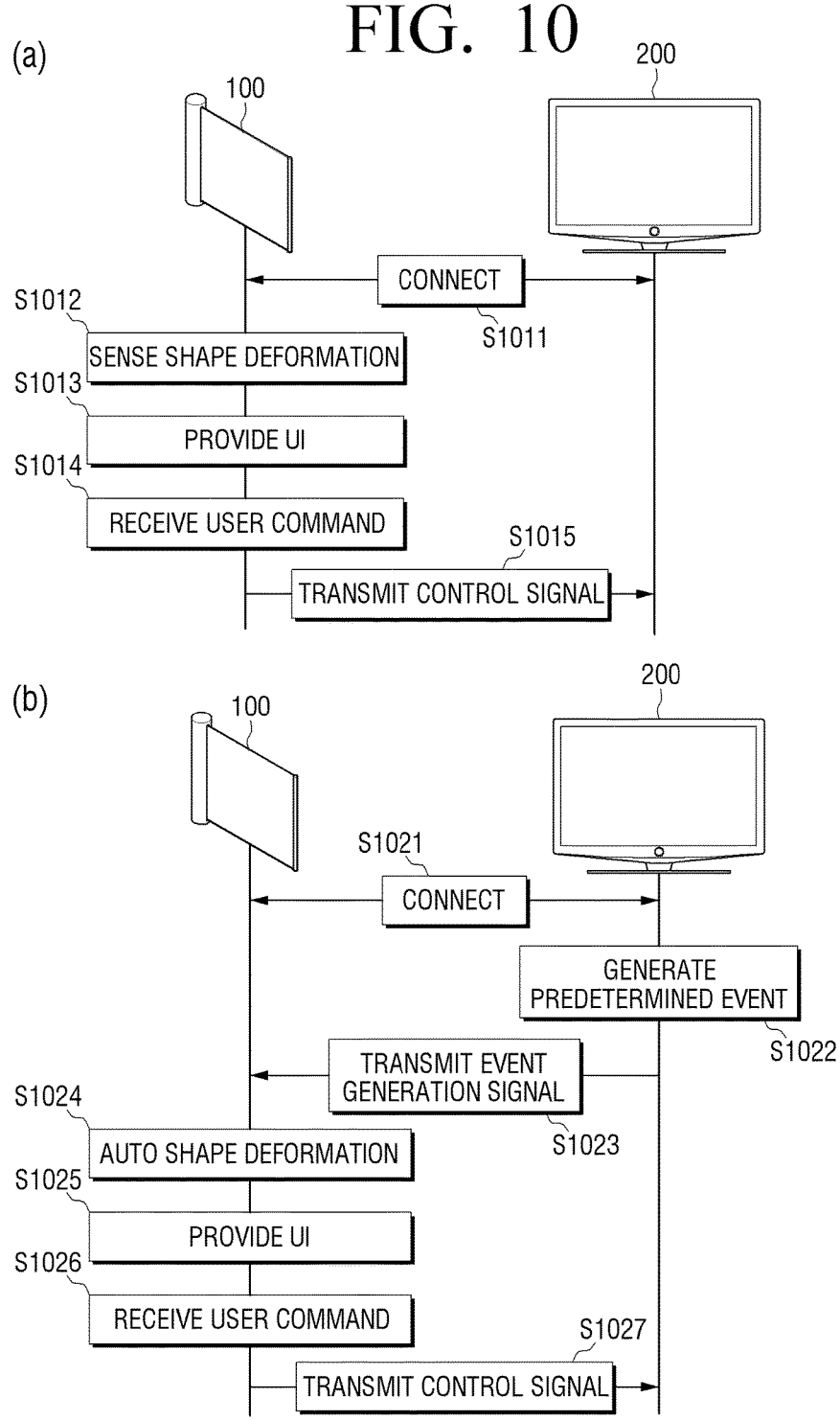
FIGS. 10 to 13 are views to explain an operation of the control system according to exemplary embodiments.
Figure 11:
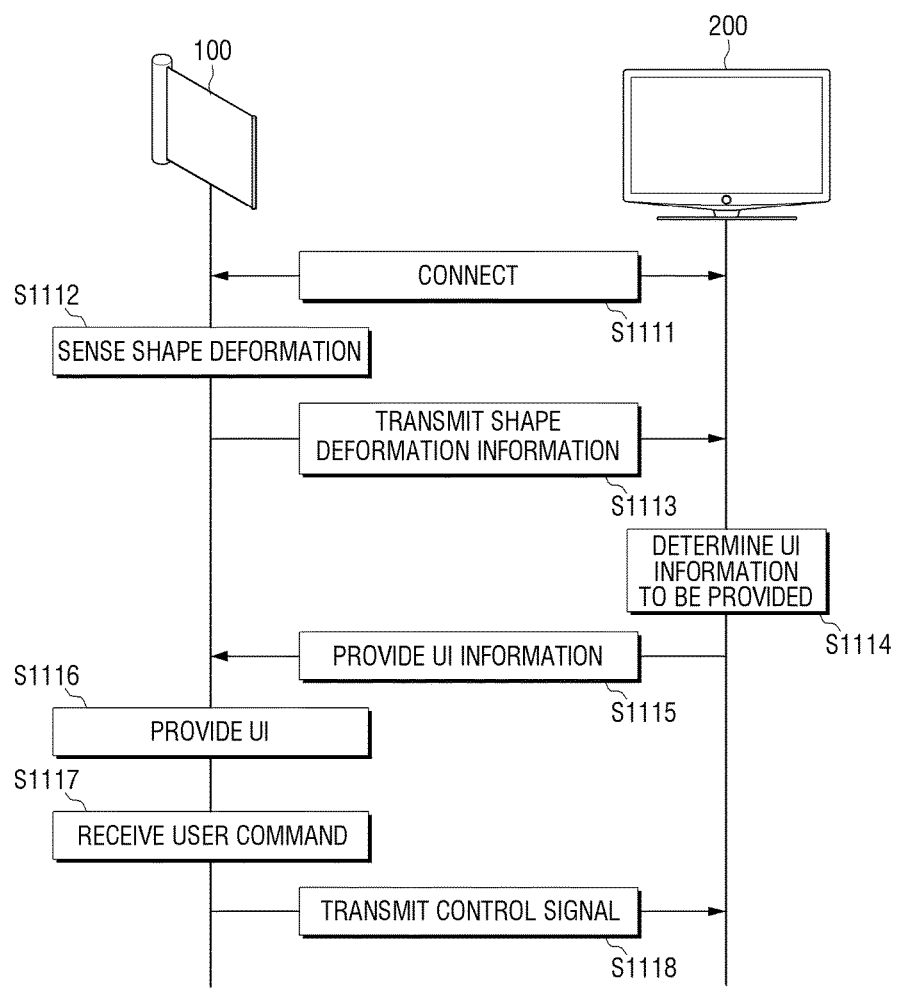
Figure 12:
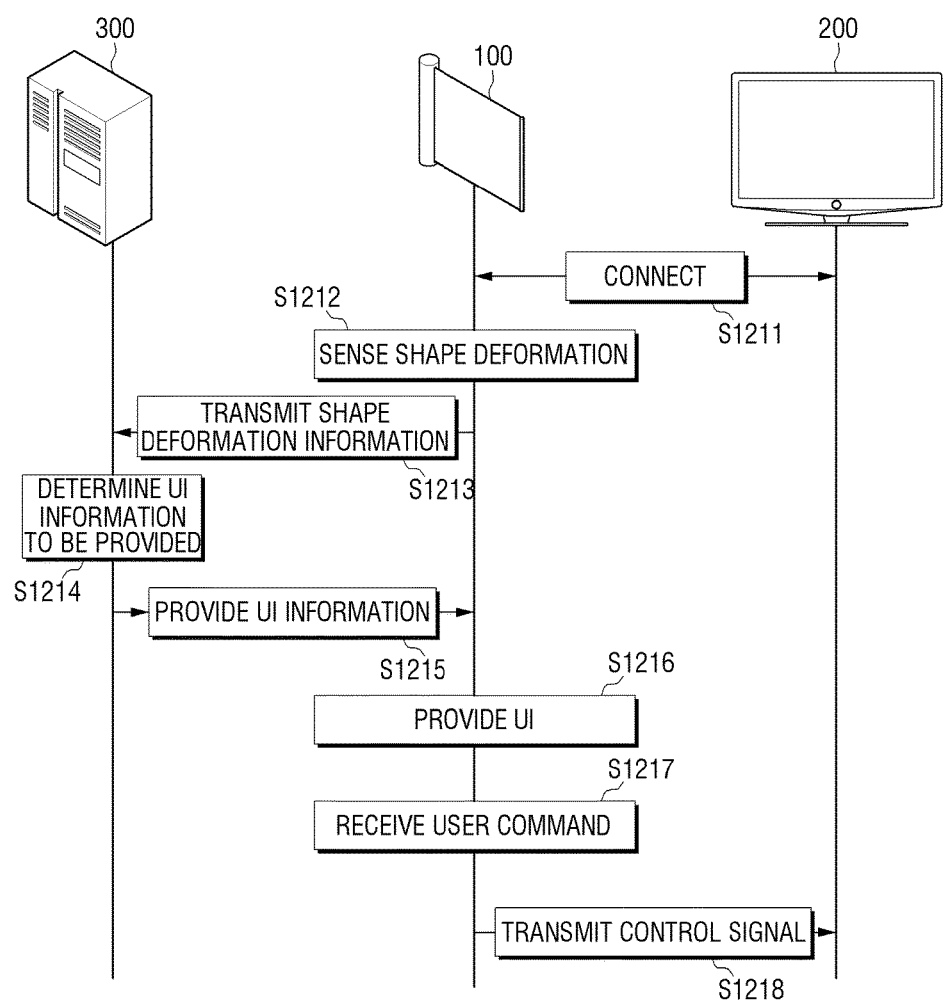

FIGS. 10 to 12 are views to explain operations of the control system according to an exemplary embodiment.

View (a) of FIG. 10 is a timing chart to explain an operation of the control system according to an exemplary embodiment.

As shown in view (a) of FIG. 10, if a predetermined event is generated, the flexible display apparatus 100 and the electronic apparatus 200 establish communication with each other (S1011). The communication establishment may refer to all operations that enable communication, such as an operation of initializing communication between the flexible display apparatus 100 and the electronic apparatus 200, an operation of forming a network, and an operation of performing apparatus pairing. For example, apparatus identification information of the flexible display apparatus 100 is provided to the electronic apparatus 200, and accordingly, a pairing process is performed between both apparatuses. If a predetermined event is generated in the flexible display apparatus 100, the flexible display apparatus 100 may search for a neighboring apparatus using digital living network alliance (DLNA), performs pairing with the discovered neighboring apparatus and connect with the neighboring apparatus.

The predetermined event may be generated in at least one of the flexible display apparatus 100 and the electronic apparatus 200. For example, the predetermined event may be generated if a user command to select the electronic apparatus 200 as a controlled apparatus is input to the flexible display apparatus 100 or if the electronic apparatus 200 is turned on.

Next, if shape deformation is sensed (S1012), the flexible display apparatus 100 provides a UI corresponding to the deformed shape (S1013). The UI is a control mode UI to control the electronic apparatus 200 and may be pre-stored in the flexible display apparatus 100. Specifically, the flexible display apparatus 100 analyzes information on a shape and a size of the flexible display apparatus 100 due to the shape deformation, searches for or generates a UI corresponding to the shape deformation, and provides the UI. For example, the flexible display apparatus 100 searches for UI information from an internal memory, an external memory, or an external data server, and provides a UI corresponding to the deformed shape.

The size of the flexible display apparatus 100 may be determined based on pixel information of the selected surface. For example, if the flexible display apparatus has a first pixel resolution and the flexible display apparatus is folded in half, then the size may be a second resolution half the size of the first resolution in one dimension. The size information may be pixel information in the form of a number of pixels in the height dimension of the flexible display apparatus and a number of pixels in the width dimension of the flexible display apparatus. Alternatively, the size information may be an index corresponding to resolution ranges, and the index may be transmitted and the UI may be selected according to the index.

The control mode may be selected by the user or may be received from the electronic apparatus 200. For example, the user may select a control mode the user wishes to have displayed, for example, a remote control mode, or the flexible display apparatus 100 may receive a control mode requested by the electronic apparatus 200, for example, a remote control mode.

If a user command input through the provided UI is received (S1014), the flexible display apparatus 100 transmits a control signal corresponding to the input user command to the electronic apparatus 200 (S1015). In this case, control information for controlling the electronic apparatus 200 that corresponds to the provided UI (for example, code information) may be pre-stored in the flexible display apparatus 100.

Accordingly, the electronic apparatus 200 is controlled according to the received control signal.

In the present exemplary embodiment, the shape of the flexible display apparatus 100 is deformed after the flexible display apparatus 100 is connected with the electronic apparatus 200. However, the order of operations S1011 and S1012 may be reversed.

View (b) of FIG. 10 is a timing chart to explain an operation of the control system according to an exemplary embodiment. From among the operations illustrated in view (b) of FIG. 10, operations appearing in view (a) of FIG. 10 will not be redundantly described.

Referring to view (b) of FIG. 10, if a predetermined event is generated, the flexible display apparatus 100 and the electronic apparatus 200 establish communication with each other (S1021).

If a predetermined event to change the control mode of the flexible display apparatus 100 is generated in the electronic apparatus 200 (S1022), the electronic apparatus 200 transmits a corresponding event generation signal to the flexible display apparatus 100 (S1023).

The shape of the flexible display apparatus 100 may be automatically deformed according to the event generation signal (S1024), and the flexible display apparatus 100 provides a UI corresponding to the deformed shape (S1025). Alternatively, the flexible display apparatus 100 may output a message instructing the user to deform the flexible display apparatus 100 in S1024. The UI recited herein may be a control mode UI for controlling the electronic apparatus 200. For example, if an event generated in the flexible display apparatus 100 is an event requiring input of characters, the shape of the flexible display apparatus 100 is automatically deformed so as to provide a control mode corresponding to the event, for example, a keyboard mode.

Next, if a user command input through the UI provided in the flexible display apparatus 100 is received (S1026), the flexible display apparatus 100 transmits a control signal corresponding to the received user command to the electronic apparatus 200 (S1027). Accordingly, the electronic apparatus 200 may be controlled according to the received control signal.

In the present exemplary embodiment, a predetermined event to change the control mode of the flexible display apparatus 100 is generated in the electronic apparatus 200 after the flexible display apparatus 100 is connected with the electronic apparatus 200. However, this is merely an example, and the order of operations S1021 and 1022 may be reversed.

FIG. 11 is a timing chart to explain an operation of the control system according to an exemplary embodiment. From among the operations illustrated in FIG. 11, operations appearing in FIG. 10 will not be redundantly explained.

Referring to FIG. 11, if a predetermined event is generated, the flexible display apparatus 100 and the electronic apparatus 200 establish communication with each other (S1111).

Next, if the shape of the flexible display apparatus 100 is deformed (S1112), the flexible display apparatus 100 transmits a signal corresponding to the deformed shape (hereinafter, referred to as shape deformation information) to the electronic apparatus 200 (S1113). Also, according to the deformed shape, apparatus information and control mode information to be used may also be transmitted. The shape deformation information may be information on a shape or a size of a surface upon which information may be displayed.

In this case, the electronic apparatus 200 determines UI information corresponding to the shape deformation information received from the flexible display apparatus 100 (S1114). Specifically, the electronic apparatus 200 may determine a size of a control mode UI to be displayed on a screen of the flexible display apparatus 100 and an arrangement of each element using the apparatus information and screen display information.

The electronic apparatus 200 may determine the UI information corresponding to the received shape deformation information, considering a characteristic of content currently reproduced by the electronic apparatus 200. For example, if the shape deformation information indicates "folding along a vertical axis two times", and if a content provided on a screen of the electronic apparatus 200 is a broadcast content provided through a broadcast channel, the electronic apparatus 200 may search for or generate a remote control mode UI for controlling the broadcast channel, or may reconfigure a UI using pre-stored information.

The electronic apparatus 200 provides the searched UI information to the flexible display apparatus 100 (S1115). In this case, the electronic apparatus 200 may also provide an apparatus driver and control information corresponding to the flexible display apparatus 100. The electronic apparatus 200 may update the apparatus driver and the control information through network communication, such as over the Internet.

Although the UI information is provided by the electronic apparatus 200 in FIG. 11, the electronic apparatus may communicate with a server and request the server to provide the flexible display apparatus 100 with the UI information.

Further, although it is illustrated that the electronic apparatus 200 determines a UI to be provided based on a characteristic of reproduced content, the electronic apparatus 200 may instead transmit generic UI information relevant to all content types, as well as an indication of the type of content being reproduced, to the flexible display apparatus 100. The flexible display apparatus may determine a particular UI to be displayed based on the content type received from the electronic apparatus 200. If the type of content being reproduced by the electronic apparatus 200 changes, this may be detected as an event, and the new type of reproduced content may be transmitted from the electronic apparatus 200 to the flexible display apparatus 100. Accordingly, the UI may be dynamically updated by the flexible display apparatus according to the type of content as the type of content changes at the electronic apparatus 200.

Next, the flexible display apparatus 100 provides a UI corresponding to the deformed shape based on the received UI information (S1116). The UI information may be information on sizes of areas of various input tools included in the UI corresponding to each control mode, and arrangements of the input tools. For example, in the case of a keyboard mode, the UI information may include sizes, arrangements, and locations of alphabet or numeric character keys, and sizes, arrangements, and locations of keys.

The flexible display apparatus 100 may install the apparatus driver to control the electronic apparatus 200, and may display the UI based on the received UI information.

If a user command input through the provided UI is received (S1117), the flexible display apparatus 100 transmits a control signal corresponding to the received user command (or control information) to the electronic apparatus 200 (S1118). Accordingly, the electronic apparatus 200 may be controlled according to the received control signal.

FIG. 12 is a timing chart to explain an operation of the control system according to an exemplary embodiment. From among the operations illustrated in FIG. 12, operations presented in FIGS. 10 and 11 will not be redundantly explained.

Referring to FIG. 12, if a predetermined event is generated, the flexible display apparatus 100 and the electronic apparatus 200 establish communication with each other (S1211).

Next, if the shape of the flexible display apparatus 100 is deformed (S1212), the flexible display apparatus 100 transmits shape deformation information corresponding to the deformed shape to the server 300 (S1213). The flexible display apparatus 100 may also transmit at least one of apparatus information, controlled apparatus information, and control mode information. If the flexible display apparatus 100 transmits the controlled apparatus information, that is, information on the electronic apparatus 200, to the server 300, the flexible display apparatus 100 may receive apparatus information from the electronic apparatus 200 and may provide the same to the server 300. The control mode information to be used may be input by the user through the flexible display apparatus 100. However, the control mode information may be provided through the electronic apparatus 200 according to a characteristic of content currently provided by the electronic apparatus 200.

In this case, the server 300 determines UI information corresponding to the received shape deformation information (S1214), and provides the determined UI information to the flexible display apparatus 100 (S1215). In this case, the server 300 may consider the characteristic of content provided by the electronic apparatus 200 when determining the UI information.

The server 300 may transmit control information between the flexible display apparatus 100 and the electronic apparatus 200 to the flexible display apparatus 100 along with the UI information. The server 300 may update the control information through a corresponding manufacturer server.

Next, the flexible display apparatus 100 provides a UI corresponding to the deformed shape based on the received UI information (S1216). In this case, the flexible display apparatus 100 may install an apparatus driver for controlling the electronic apparatus 200 that is received from the electronic apparatus 200 or the server 300.

Next, if a user command input through the provided UI is received (S1217), the flexible display apparatus 100 transmits a control signal corresponding to the received user command to the electronic apparatus 200 (S1218). Accordingly, the electronic apparatus 200 may be controlled according to the received control signal.

Figure 13:
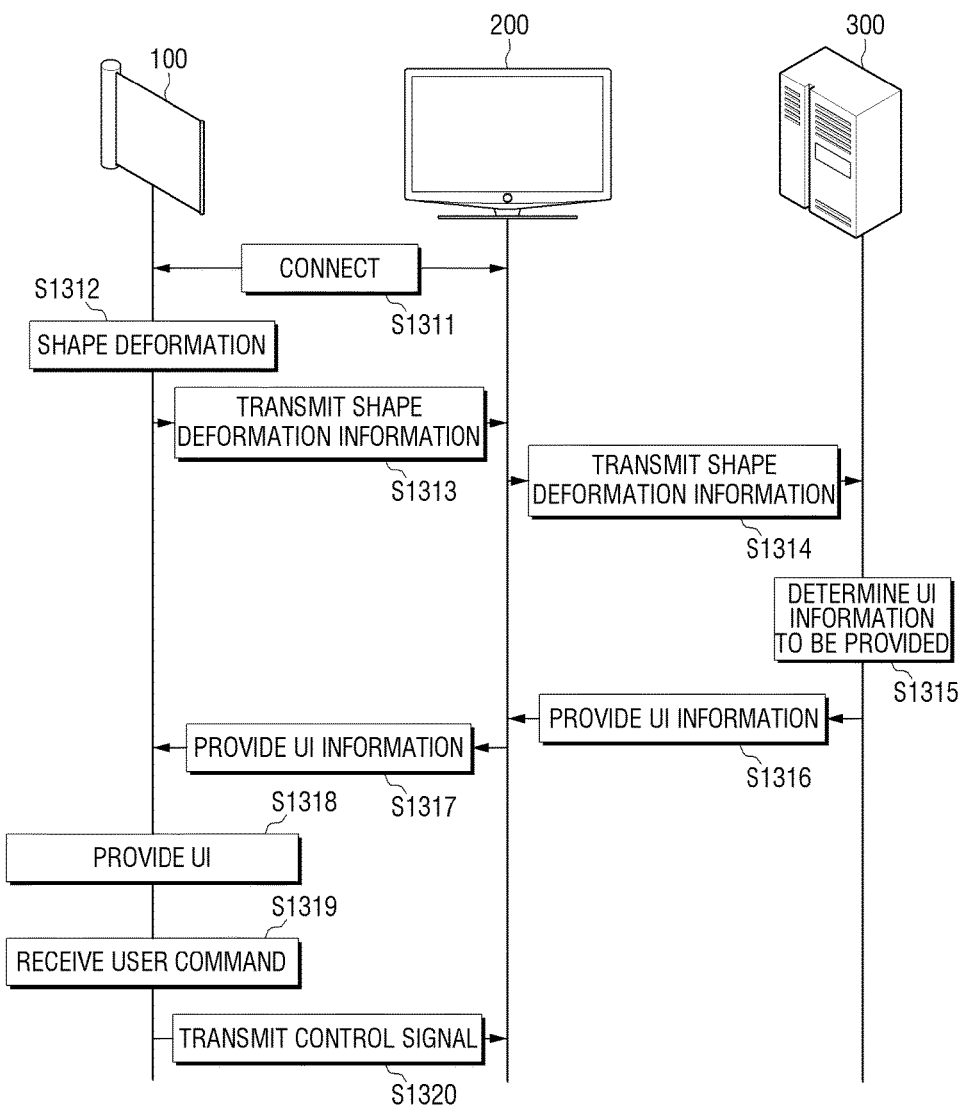

FIG. 13 is a timing chart to explain an operation of the control system according to an exemplary embodiment. From among the operations illustrated in FIG. 13, operations appearing in FIGS. 10 and 11 will not be redundantly explained.

Referring to FIG. 13, if a predetermined event is generated, the flexible display apparatus 100 and the electronic apparatus 200 establish communication with each other (S1311).

Next, if shape deformation of the flexible display apparatus 100 is sensed (S1312), the flexible display apparatus 10 transmits shape deformation information corresponding to the deformed shape to the electronic apparatus 200 (S1313). Besides this, the flexible display apparatus 100 may transmit at least one of apparatus information and control mode information to be used.

The electronic apparatus 200 transmits the received shape deformation information to the server 300 (S1314). The electronic apparatus 200 may transmit its own apparatus information and required control mode information to the server 300 in addition to the information received from the flexible display apparatus 100. The control mode information may be determined according to a characteristic of content reproduced by the electronic apparatus 200.

The server 300 determines UI information corresponding to the received shape deformation information (S1315), and provides the determined UI information to the electronic apparatus 200 (S1316). In this case, the server 300 may also provide control information corresponding to the UI information to the electronic apparatus 200. The server 300 may be connected to the Internet and may update information on the flexible display apparatus 100 and the electronic apparatus 200. For example, the server 300 may update apparatus driver information, control information, and UI information.

The electronic apparatus 200 transmits the UI information and the control information to the flexible display apparatus 100 (S1317). Accordingly, the flexible display apparatus 100 provides a UI corresponding to the deformed shape based on the received UI information (S1318).

Next, if a user command is input through the provided UI (S1319), the flexible display apparatus 100 transmits a control signal corresponding to the input user command to the electronic apparatus 200 (S1320). Accordingly, the electronic apparatus 200 may be controlled according to the received control signal.

Figure 14:
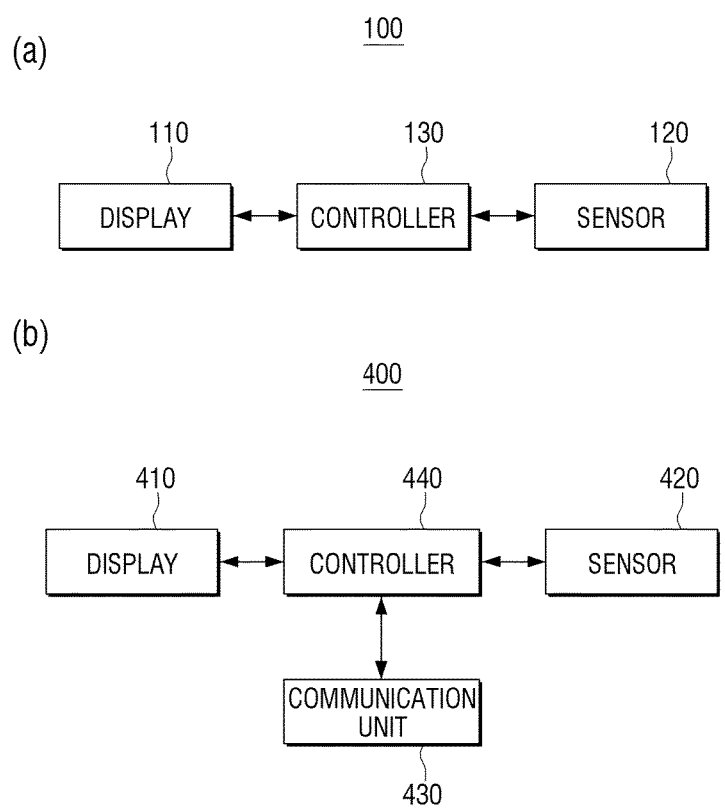
FIG. 14 is a block diagram to explain a flexible display apparatus according to various exemplary embodiments.

FIG. 14 is a block diagram to explain a flexible display apparatus according an exemplary embodiment.

As shown in view (a) of FIG. 14, a flexible display apparatus 100 includes a display 110, a sensor 120, and a controller 130.

The flexible display apparatus 100 can be deformed, as described above. For example, the flexible display apparatus 100 may be folded so that a screen of the display 110 is oriented outward. Also, the flexible display apparatus 100 can be rolled. For example, the flexible display apparatus 100 may be rolled so that the screen of the display 110 has a pillar shape forming an outer wall.

The display 110 may provide user interfaces of various types.

The display 110 may display various objects according to a function of the flexible display apparatus 100. The object may be content, a function menu, an icon, a photo, an image, a text, and a widget area.

The display 110 has been described above in detail with reference to FIG. 1 and thus a redundant explanation is omitted.

The sensor 120 senses shape deformation of the display 110.

Specifically, the sensor 120 may sense deformed state of the flexible display apparatus 100, such as a folding state or a rolling state of the flexible display apparatus 100. Also, the sensor 120 may sense a touch state or a rotation state when the display apparatus 100 is folded or rolled.

The folding state may be a degree of folding, a folding area, a folding direction, and a time the folding is sustained. The rolling state may be a degree of rolling, a rolling area, a rolling direction, and a time the rolling is sustained. The touch state may be a touch operation type (for example, tap, drag, and flick), touch pressure, a touch direction, and a time the touch is sustained when the display 110 is deformed. The rotation state may be a rotation direction, a rotation speed, and a rotation time when the display 110 is folded or rolled. The above operation may be performed by various kinds of sensors. For example, the sensor 120 may include at least one of a deformation sensor, a touch sensor, a pressure sensor, a motion sensor, and a slope sensor.

The sensor 120 may recognize a touch input made by a user's body (for example, finger) or a stylus pen using a touch sensor disposed on a front surface of the display 110, and may transmit the input touch information to the controller 130.

The sensor 120 may sense a bending area, a bending direction, and a degree of bending of the display 110, using various sensors, such as a motion sensor that measures a motion and acceleration when motion is performed, a pressure sensor that senses pressure exerted on the display 110, and a slope sensor that senses a slope with reference to a gravity direction.

The controller 130 may control the display 110 to display a UI corresponding to sensed shape deformation according to a result of the sensing by the sensor 120. In this case, UI information for displaying a UI may be pre-stored or may be received from an external apparatus. This will be explained in detail below.

The shape information may include, but is not limited to, folding and rolling. A different type of folding is performed according to a folding direction or a folding area, and a different type of rolling is performed according to a rolling direction, a rolling area, and a degree of rolling.

The UI corresponding to a deformed shape may include at least one control mode UI that is connected with another apparatus (not shown) and controls the another apparatus. The control mode may be a character input mode, a remote control mode, a touch mode, a pointer mode, and a voice recognition mode, but should not be limited to these. However, hereinafter, it is assumed that the flexible display apparatus provides a control mode including a keyboard mode, a remote control mode, and a touch mode for the convenience of explanation.

The UI type corresponding to each shape deformation type may be defined as in table 1 below. However, this is merely an example and the UI type may be variously embodied.

TABLE 1

| Shape Deformation Type | | UI Type |
|---|---|---|
| Flat Type (if the apparatus is not folded) | | Keyboard mode UI |
| | | Remote control mode UI |
| | | Touch mode UI |
| | | Keyboard partial area UI (area except for an area of direction keys and numbers arranged on the right) + touch mode UI |
| | | Keyboard partial area UI (area except for an area of direction keys and numbers arranged on the right) + remote control mode UI |
| | | Keyboard partial area UI (area except for an area of direction keys and numbers arranged on the right) + touch mode UI + remote control mode UI |
| | | Touch mode UI + remote control mode UI |
| | | Keyboard mode UI + remote control mode UI + touch mode UI |
| Folding once | Folding along an horizontal axis or a vertical axis | Keyboard partial area UI (area except for an area of direction keys and numbers arranged on the right) |
| | | Remote control mode UI |
| | | Touch mode UI |
| | | Keyboard partial area UI (area except for an area of direction keys and numbers arranged on the right) + touch mode UI |
| | | Keyboard partial area UI (area except for an area of direction keys and numbers arranged on the right) + remote control mode UI |
| | | Basic keys keyboard UI (Korean vowels and consonants) + touch mode UI + remote control mode UI |
| Folding two times | Folding in the same direction | Basic keys keyboard UI (Korean vowels and consonants) |
| | | Keyboard partial area UI (area except for an area of direction keys and numbers arranged on the right) |
| | | Remote control mode UI |
| | | Touch mode UI |
| | Folding in different directions | Basic keys keyboard UI (Korean vowels and consonants) |
| | | Remote control mode UI |
| | | Touch mode UI |
| | | Pointer mode (replacing a moue function or indicating an explanation in a presentation) |
| | | Wizard mode (sensing a position in space or sensing rotation or translation) |
| Folding of a specific area | | Folding of a flexible area if a rigid area and a flexible area co-exist. |
| | | Identifying a rigid area, that is, a folding-prohibited area (an edge or a partial liquid crystal screen of a product) using color or signs |
| Partial rolling | Rolling along a horizontal axis or a vertical axis | UI according to area of a rolling area or an area where rolling is not performed |
| | | Adjusting an area by rolling releasing operation (by pulling one side surface) |
| Whole rolling | Rolling along a horizontal axis or a vertical axis | Pointer mode, wizard mode, game tool mode, and microphone mode |

Also, the UI type corresponding to each shape deformation type may be pre-defined as described in table 1, or may be set by the user.

An event required by each control mode UI is as follows:

TABLE 2

| Control mode | Control mode requiring situation | |
|---|---|---|
| Keyboard mode | if a controlled apparatus selects a web browser search window, or if input of characters or numbers is required, for example, if a log in input window requiring an ID and a password is selected if a program for inputting characters or numbers in a controlled apparatus, for example, Word, Hangul Word Processor, JungUm Global, and Notepad is executed | |
| Remote control mode | if a TV watching function such as selecting a broadcast channel is executed in a controlled apparatus | |
| Touch mode | If a screen requiring a selecting operation by pointing such as an application screen of a controlled apparatus is displayed, or if a mouse function is required | |
| Pointer mode | If a presentation screen requiring a pointer function such as a slide show in a controlled apparatus is displayed | |
| Game input mode | If game is executed | |
| Others | Voice recognition mode | A controlled apparatus is controllable through a voice command |
| | Pen mode | If a controlled apparatus is a large size display, the controlled apparatus is controllable by touching through a pen mode, performing an application, or inputting characters |

If various controls are simultaneously implemented on one screen, for example, if a TV screen is displayed on one area of a controlled apparatus and a screen requiring input of characters or numbers is displayed on the other area, a UI of a remote control mode+keyboard mode type is required.

However, the embodiment of table 2 is merely an example and various embodiments are possible.

The controller 130 may determine a shape deformation type of an apparatus according to a sensing result of the sensor 120.

For example, the controller 130 may determine a folding type of an apparatus by recognizing a curved boundary line based on an output value of a deformation sensor and calculating coordinate values of two ends of a line generated when the apparatus is folded. Also, the controller 130 may determine a shape deformation type by calculating vertexes of a polygon enclosing an activated display area. In this case, it may be assumed that an edge of the display 110 may be a straight line when the apparatus is folded.

The controller 130 may determine rolling information using a rotation angle of a roller (not shown).

The controller 130 may determine a screen that receives a user's touch input from among a plurality of screens divided by folding to be a display surface, and may activate the screen. The controller 130 may provide an icon that can be touched by the user on each of the plurality of screens divided by the folding, so that user's touch can be easily performed.

The controller 130 may determine a display screen by recognizing a user's face using a camera (not shown). For example, the controller 130 may recognize a face using cameras (not shown) installed on a plurality of screens divided by folding, and may determine a screen on which a camera is installed to be a display screen. Even if a face is not clearly recognized, the controller 130 may determine a screen viewed by the user by recognizing at least one face characteristic part of the face, such as a face shape, eyebrow, eye, nose, mouth, and hair.

The controller 130 may determine a display surface according to a sensing result of the sensor 120 using a bending line and an accelerometer. In this case, it is assumed that the display surface of the flexible display apparatus 100 faces the opposite direction of the direction of acceleration of gravity, that is, the flexible display apparatus 100 is manipulated by the user viewing it from above.

Specifically, the controller 130 may determine a folding state of the flexible display apparatus 100 based on a bending line sensed by the sensor 120. For example, if bending is performed along a horizontal axis and a vertical axis, the controller 130 may select two screens for displaying information from among four screens divided by folding.

The controller 130 may determine a position of the flexible display apparatus 100 using a sensing result of the accelerometer. For example, the controller 130 may determine a position of a screen on which the accelerometer is installed using the acceleration of gravity sensed by the accelerometer, and may determine a position of the other screens according to a bending type.

The controller 130 may determine a screen that faces a direction opposite of the direction of acceleration of gravity from among the two displayable screens.

If a grip operation by two hands is performed, the controller 130 may determine a screen that is sensed as being touched by a user's two thumbs using a pressure sensor or a touch sensor from among areas touched by the two thumbs and the other four fingers, as a display screen.

If a user grips the screen with one hand, the controller 130 may determine a screen that is sensed as being touched by user's thumb by the pressure sensor or the touch sensor from among areas touched by the thumb and the remaining four fingers, as a display surface. In this case, the controller 130 may determine a display surface based on the number of fingers sensed on finger touch surfaces of a front surface and a rear surface or a shape of the touch surface.

If one surface from among the screens divided by folding is located in proximity of an obstacle or in contact with the obstacle, the controller 130 may exclude the surface from the display surface.

In the above example, folding along the horizontal axis and the vertical axis is performed. However, a similar method may be applied if one folding operation, two folding operations, or rolling in the same direction is performed, and thus a detailed explanation is omitted.

However, in the case of rolling, a display area may be set in advance considering an area that can be gripped by the hand. Accordingly, a guide as to a grip area may be provided to the user.

Although not shown, an input unit (not shown) may be provided to receive user's selection of a surface corresponding to a UI provided through the display 110. For example, if the flexible display apparatus 100 is folded, the user may select one of the two folded surfaces through the input unit (not shown). Also, the user may set an area to display a UI through the input unit (not shown).

If the display 110 is implemented using a touch screen having a mutually layered structure with a touch pad, the input unit (not shown) may be integrally formed with the display 110. In this case, the touch screen may be configured to detect touch input location and area as well as touch input pressure.

The input unit (not shown) may receive a user's command to control the electronic apparatus 200 through a UI provided through the display 110.

A UI processor (not shown) processes and generates various UIs in a 2D or 3D format. The UI may be control mode UIs of various types that correspond to shape deformation of the flexible display apparatus 100, as described above. The UI processor 170 may change UI elements in 2D/3D, adjust transparency, color, size, shape, and location, highlighting, and animation effects of displayed elements.

View (b) of FIG. 14 is a block diagram to explain a flexible display apparatus according to an exemplary embodiment.

Referring to view (b) of FIG. 14, a flexible display apparatus 300 includes a display 410, a sensor 420, a communication unit 430, and a controller 440. Functions of the display 410, sensor 420, and controller 440 may be similar to those in view (a) of FIG. 14 and will not be redundantly explained.

The display 410 may provide UIs of various types. The UI may include at least one control mode UI to control another apparatus, such as the electronic apparatus 200. The control mode may be implemented by using at least one of a keyboard mode, a remote control mode, and a touch mode.

The sensor 420 senses shape deformation of the display 410.

The communication unit 430 communicates with the electronic apparatus 200.

The communication unit 430 may transmit first information corresponding to shape deformation sensed by the sensor 420 under the control of the controller 440 to the electronic apparatus 200, and may receive second information from the electronic apparatus 200 in response to the first information.

The first information may be at least one of a signal that corresponds to sensed shape deformation, and a signal that corresponds to a control mode corresponding to sensed shape deformation.

If the first information is a signal that corresponds to sensed shape deformation, the first information may include size information of the display 410 corresponding to the sensed shape deformation.

Also, if the user sets an area when the shape of the display 410 is deformed, configuration information on the set area may be included in the first information. The configuration information on the set area may be a location of the area, a size of the area, and a number of areas. This will be explained in detail below with reference to FIG. 23.

The second information may be UI information that corresponds to sensed shape deformation.

The communication unit 430 may transmit apparatus information to the electronic apparatus 200 according to a situation.

The controller 440 may control to display a UI based on the second information received through the communication unit 430.

Specifically, the controller 440 may control to configure a UI according to UI information corresponding to sensed shape deformation and display the UI.

According to a situation, the controller 440 may configure a UI according to UI information received from the server 300 and display the UI.

Figure 15:
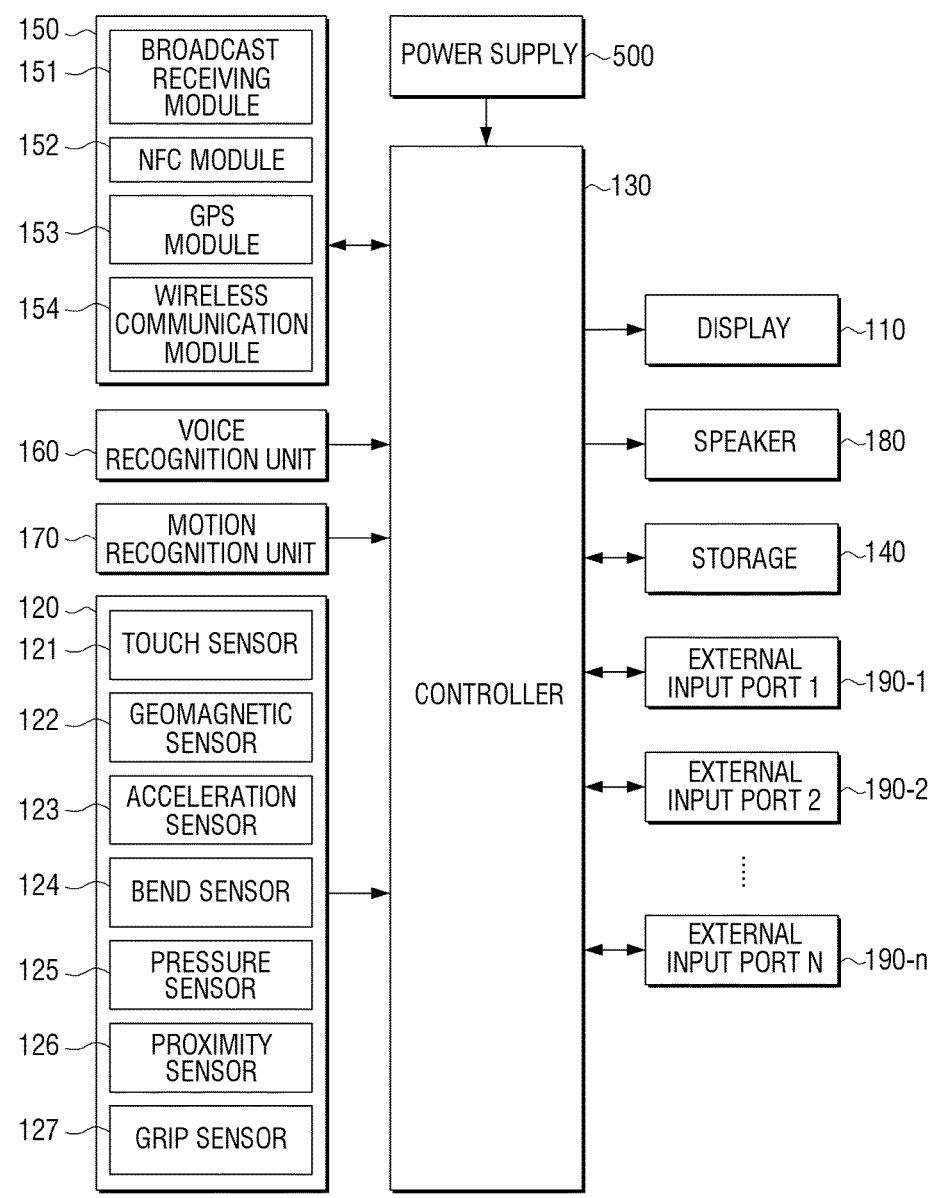
FIG. 15 is a block diagram illustrating the flexible display apparatus of view (a) of FIG. 14.

FIG. 15 is a block diagram illustrating the flexible display apparatus of view (a) of FIG. 14 in detail.

Referring to FIG. 15, the flexible display apparatus 100 includes a display 110, a sensor 120, a controller 130, a storage 140, a communication unit 150, a voice recognition unit 160, a motion recognition unit 170, a speaker 180, external input ports 190-1~190-*n*, and a power supply 500.

The display 110 has flexibility. The detailed configuration and operation of the display 110 has been described above and thus a redundant explanation is omitted.

The storage 140 may be a memory that stores various programs or data associated with the operation of the flexible display apparatus 100, setting information set by the user, operating system software, various applications, and information on operations corresponding to user manipulation.

The sensor 120 detects a bending state and touch state of the flexible display apparatus including the display 110. Referring to FIG. 15, the sensor 120 may include various kinds of sensors such as touch sensor 121, a geomagnetic sensor 122, an acceleration sensor 123, a bend sensor 124, a pressure sensor 125, a proximity sensor 126, and a grip sensor 127.

The touch sensor 121 may be implemented by using a capacitive type or a resistive type of sensor. The capacitive type calculates touch coordinates by sensing minute electricity generated when a part of the user's body touches the surface of the display 110, using a dielectric substance coated on the surface of the display 110. The resistive type includes two electrode plates, and, if a user touches a screen, calculates touch coordinates by sensing an electric current flowing due to contact between upper and lower plates at the touched point. As described above, the touch sensor 121 may be embodied in various forms.

The geomagnetic sensor 122 senses a rotation state and a moving direction of the flexible display apparatus 100. The acceleration sensor 123 senses a degree of tilt of the flexible display apparatus 100. The geomagnetic sensor 122 and the acceleration sensor 123 may be used to sense bending characteristics, such as a bending direction or a bending area, of the flexible display apparatus 100, as described above. However, the geomagnetic sensor 122 and the acceleration sensor 123 may be used to sense a rotation state or a tilt state of the flexible display apparatus 100.

The bend sensor 124 may be embodied in various shapes and numbers, as described above, and may sense a deformed state of the flexible display apparatus 100. The configuration and operation of the bend sensor 125 has been described above and thus a redundant explanation is omitted.

The pressure sensor 125 senses a magnitude of pressure exerted to the flexible display apparatus 100 when the user performs touch or shape deformation manipulation, and provides the magnitude of pressure to the controller 130. The pressure sensor 125 may include a piezo film embedded in the display 110 and outputs an electric signal corresponding to the magnitude of pressure. Although the pressure sensor 125 is a separate element from the touch sensor 121 in FIG. 15, if the touch sensor 121 is implemented by using a resistive touch sensor, the resistive touch sensor may also perform the function of the pressure sensor 125.

The proximity sensor 126 senses motion about the flexible display apparatus 100 as input that does not directly contact the display surface. The proximity sensor 126 may be implemented using various types of sensors, such as a high-frequency oscillation type proximity sensor that forms a high frequency magnetic field and detects an electric current induced by a magnetic characteristic that is changed when an object approaches, a magnetic type proximity sensor that uses a magnet, and a capacitive type proximity sensor that detects capacitance that changes when an object approaches.

The grip sensor 127 is disposed on a border or a handle of the flexible display apparatus 100 separately from the pressure sensor 125, and senses a user's grip. The grip sensor 127 may be implemented using a pressure sensor or a touch sensor.

The controller 130 analyzes various sensing signals sensed by the sensor 120, determines a user's intention, and performs an operation corresponding to the intention. For example, the controller 130 may process data obtained by communicating with an external apparatus, or data stored in the storage 140, and may output the processed data through the display 110 and the speaker 180. In this case, the controller 130 may communicate with the external apparatus using the communication unit 150.

The communication unit 150 may communicate with various types of external apparatuses according to various communication methods. The communication unit 150 may include various communication modules, such as a broadcast receiving module 151, a near field communication (NFC) module 152, a GPS module 153, and a wireless communication module 154. The broadcast receiving module 151 may include a terrestrial broadcast receiving module (not shown) including an antenna to receive a terrestrial broadcast signal, a demodulator, and an equalizer, and a digital multimedia broadcasting (DMB) module to receive and process a DMB broadcast signal. The NFC module 152 is a module that communicates with an external apparatus over short ranges according to an NFC method such as NFC, Bluetooth, or Zigbee. The global positioning system (GPS) module 153 is a module that receives a GPS signal from a GPS satellite and detects a current location of the flexible display apparatus 100. The wireless communication module 154 is a module that is connected to network according to a wireless communication protocol, such as WiFi or IEEE and communicates over the network. The communication unit 150 may further include a mobile communication module that accesses a mobile communication network and performs communication according to various mobile communication standards, such as $3^{rd}$ generation (3G), $3^{rd}$ generation partnership project (3GPP), and long term evolution (LTE).

The controller 130 selectively activates an element for performing an operation according to a user's intention from among the above-described elements of the communication unit 150, and performs the operation.

The controller 130 may recognize voice input or motion input in addition to the shape deformation input or touch input, and may perform an operation corresponding to the inputs. In this case, the controller 130 may activate the voice recognition unit 160 or the motion recognition unit 170.

The voice recognition unit 160 receives a user's voice or an external sound as input using a voice obtaining means, such as a microphone (not shown), and transmits the user's voice or the external sound to the controller 130. If the user's voice is consistent with a pre-set voice command in a voice control mode, the controller 130 may perform a task corresponding to the user's voice. The task, which is controllable using a voice, may include various tasks, such as adjusting a volume, selecting a channel, zapping a channel, adjusting a display property, reproducing, pausing, rewinding, fast forwarding, executing an application, selecting a menu, turning on an apparatus, and turning off an apparatus.

The motion recognition unit 170 obtains a user's image using an image capture up means (not shown), such as a camera, and provides the user's image to the controller 130. If the controller 130 analyzes the user's image and determines that the user makes a motion gesture corresponding to a pre-set motion command in a motion control mode, the controller 130 performs an operation corresponding to the motion gesture. For example, various tasks, such as zapping a channel, turning on an apparatus, turning off, pausing, reproducing, stopping, rewinding, fast forwarding, and mute may be controlled according to a motion. The above-described tasks controllable according to a voice and the tasks controllable according to a motion are merely examples and are not limited.

The external input ports 190-1~190-n may be connected to various types of external apparatuses and may receive various data or programs or control commands. Specifically, the external input ports may include USB ports, headset ports, mouse ports, and LAN ports. The power supply 500 supplies power to the elements of the flexible display apparatus 100. The power supply 500 may be implemented to include an anode collector, an anode electrode, an electrolyte, a cathode electrode, a cathode collector, and a sheath enclosing the aforementioned members. The power supply 500 may be implemented by using a secondary cell which is chargeable and dischargeable. The power supply 500 may be implemented in a flexible form so that it can be bent along with the flexible display apparatus 100. In this case, the collector, the electrode, the electrolyte, and the sheath may be made of a flexible material. Detailed configuration and material of the power supply 500 will be separately explained below.

Although FIG. 15 illustrates various elements that may be included in the flexible display apparatus 100, the flexible display apparatus 100 may not necessarily include all of the elements and may not include only the above elements. Therefore, some of the elements may be omitted or added according to a product type of the flexible display apparatus 100, or may be replaced with other elements.

The controller 130 may control the elements according to user manipulation recognized through the sensor 120, the voice recognition unit 160, and the motion recognition unit 170 described above, and may perform various operations.

Also, the controller 130 may include an actuator (not shown) to automatically deform the shape of the display 110 and provide a control mode UI corresponding to received UI information.

The controller 130 may control the elements according to user manipulation recognized through the sensor 120, the voice recognition unit 160, and the motion recognition unit 170, and may perform various operations.

Figure 16:
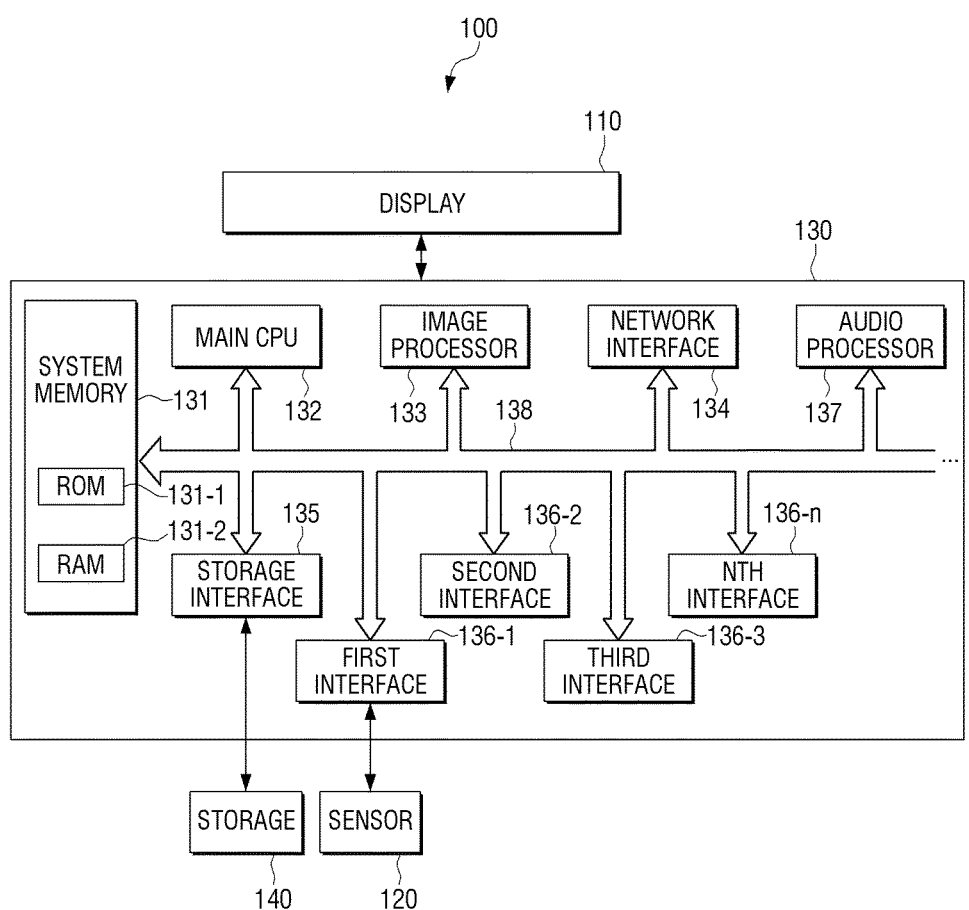
FIG. 16 is a view to explain a controller.

FIG. 16 is a view to explain the controller 130 in detail.

Referring to FIG. 16, the controller 130 may include a system memory 131, a main CPU 132, an image processor 133, a network interface 134, a storage interface 135, first to nth interfaces 136-1 to 136-n, an audio processor 137, and a system bus 138.

The system memory 131, the main CPU 132, the image processor 133, the network interface 134, the storage interface 135, the first to nth interfaces 136-1 to 136-n, and the audio processor 137 may be connected to one another through the system bus 138, and may exchange various data or signals with one another.

The first to nth interfaces 136-1 to 136-n support interfacing between the elements including the sensor 120 and the elements of the controller 130. In FIG. 16, the sensor 120 is connected to only the first interface 136-1. However, if the sensor 120 includes various types of sensors, as shown in FIG. 15, each of the sensors may be connected through each interface. Also, at least one of the first to nth interfaces 136-1 to 136-n may be implemented using a button provided on a body of the flexible display apparatus 100, or an input interface which receives various signals from an external apparatus connected through the external input ports 190-1 . . . 190-*n*.

The system memory 131 includes a read only memory (ROM) 131-1 and a random access memory (131-2). The ROM 131-1 stores a set of commands for system booting. If power is supplied, the main CPU 132 copies an operating system (OS) stored in the storage 140 into the RAM 131-2 according to a command stored in the ROM 131-1, executes the OS, and boots the system. If booting is completed, the main CPU 132 copies various applications stored in the storage 140 into the RAM 131-2, executes the applications copied into the RAM 131-2, and performs various operations.

As described above, the main CPU 132 may perform various operations according to the application stored in the storage 140.

The storage interface 135 is connected to the storage 140 and exchanges various programs, content, and data with the storage 140.

For example, if the user performs touch manipulation or shape deformation manipulation corresponding to a reproducing command to reproduce and display content stored in the storage 140, the main CPU 132 accesses the storage 140 through the storage interface 135, generates a list of stored contents, and displays the list on the display 110. In this state, if the user performs touch manipulation or bending manipulation to select one content, the main CPU 132 executes a content reproducing program stored in the storage 140. The main CPU 132 controls the image processor 133 to form a content reproducing screen according to a command included in the content reproducing program.

The image processor 133 may include a decoder, a renderer, and a scaler. Accordingly, the image processor 133 decodes a stored content, renders the decoded content data and forms a frame, and scales a size of the frame according to a screen size of the display 110. The image processor 133 provides the processed frame to the display 110 and displays the same.

The audio processor 137 refers to an element that processes audio data and provides the audio data to a sound outputting means, such as a speaker 180. The audio processor 137 performs audio signal processing by decoding audio data stored in the storage 140 or audio data received through the communication unit 150, filtering noise, and amplifying the audio data to an appropriate decibel. In the above example, if the content to be reproduced is a moving image content, the audio processor 137 may process the audio data de-multiplexed from the moving image content, and may provide the audio data to the speaker 180 so that the audio data is synchronized with the image processor 133 and is output.

The network interface 134 is connected to external apparatuses through a network. For example, if a web browser program is executed, the main CPU 132 accesses a web server through the network interface 134. If web page data is received from the web server, the main CPU 132 controls the image processor 133 to form a web page screen, and displays the web page screen on the display 110.

As described above, if deformation, touch, or other user manipulation is sensed from the flexible display apparatus 100, the controller 130 determines whether the user manipulation is intended as input. If it is determined that the user manipulation is intended, the controller 130 reads out information on an operation corresponding to the user manipulation from the storage 140, and performs the operation corresponding to the information. The above-described operation of the controller 130 may be implemented by executing various programs stored in the storage 140.

Figure 17:
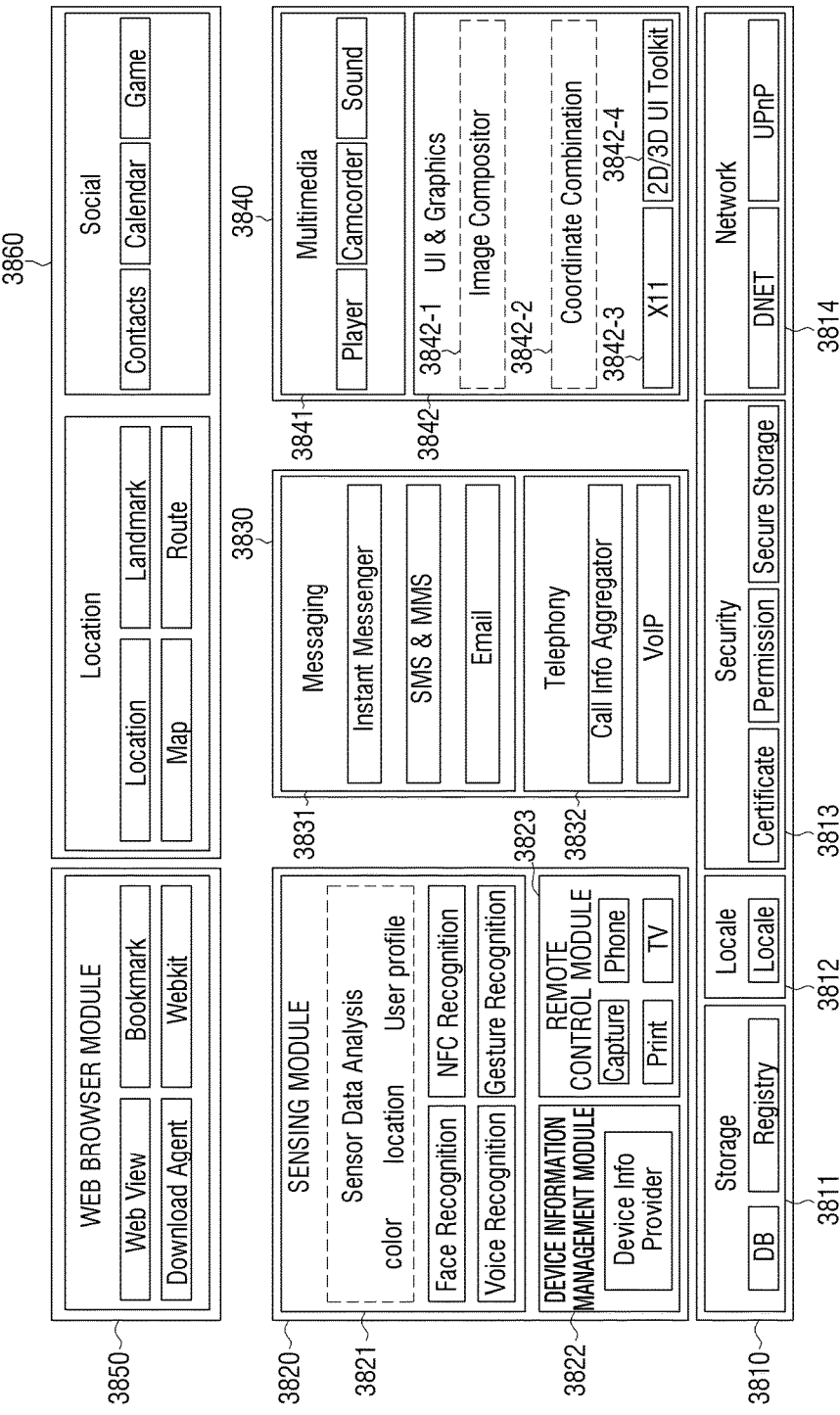
FIG. 17 is a view illustrating a software structure to support the operation of the controller according to an exemplary embodiment.

FIG. 17 is a view illustrating a software structure of the storage 140 to support the operations of the controller 130 according to the above-described exemplary embodiments. Referring to FIG. 17, the storage 140 includes a base module 3810, a device management module 3820, a communication module 3830, a presentation module 3840, a web browser module 3850, and a service module 3860.

The base module 3810 refers to a base module that processes signals transmitted from each hardware included in the flexible display apparatus 100, and transmits the signals to an upper layer module.

The base module 3810 includes a storage module 3811, a location-based module 3812, a security module 3813, and a network module 3814.

The storage module 3811 is a program module that manages a database (DB) or a registry. The location-based module 3812 is a program module that is connected with hardware, such as a GPS chip, and supports a location-based service. The security module 3813 is a program module that supports certification for hardware, permission of a request, and a secure storage, and the network module 3814 includes a Distributed.net (DNET) module and a Universal Plug and Play (UPnP) module as a module for supporting network connection.

The device management module 3820 is a module that manages external input and information on an external device, and uses the same. The device management module 3820 may include a sensing module 3821, a device information management module 3822, and a remote control module 3823. For example, the device management module 3820 may manage and use information on the electronic apparatus 200.

The sensing module 3821 is a module that analyzes sensor data provided from various sensors of the sensor 120. Specifically, the sensing module 2821 is a program module that detects a location of a user or an object, color, shape, size, and other profiles. The sensing module 3821 may include a face recognition module, a voice recognition module, a motion recognition module, and an NFC recognition module. The device information management module 3822 is a module that provides information on various types of devices, and the remote control module 3823 is a program module that remotely controls a peripheral device, such as a telephone, a television (TV), a printer, a camera, and an air conditioner. For example, the sensing module 3821 may be used to recognize a face to determine a display surface of the flexible display apparatus 100.

The communication module 3830 is a module that communicates with an external apparatus. The communication module 3830 includes a messaging module 3831, such as a messenger program, a short message service (SMS) and multimedia message service (MMS) program, and an email program, and a telephony module 3832 that includes a call information aggregator program module and a voice over internet protocol (VoIP) module.

The presentation module 3840 is a module that generates a display screen. The presentation module 3840 includes a multimedia module 3841 to reproduce multimedia content and output the multimedia content, and a user interface (UI) and graphic module 3842 to process a UI and graphics. The multimedia module 3841 may include a player module, a camcorder module, and a sound processing module. Accordingly, the multimedia module 2841 generates a screen and a sound by reproducing various multimedia contents, and reproduces the same. The UI and graphic module 3842 may include an image compositor module 3842-1 that combines images, a coordinate combination module 3842-2 that combines coordinates on a screen to display an image and generate coordinates, an X11 module 3842-3 that receives various events from hardware, and a 2D/3D UI toolkit 3842-4 that provides a tool for configuring a UI of a 2D or 3D format. For example, the UI and graphic module 3842 may be used to process various control modes UIs according to an exemplary embodiment.

The web browser module 3850 is a module that performs web-browsing and accesses a web server. The web browser module 3850 may include a web view module to render and view a web page, a download agent module to download, a bookmark module, and a web-kit module.

The service module 3860 is an application module that provides various services. Specifically, the service module 3860 may include various modules, such as a navigation service module to provide a map, a current location, a landmark, and route information, a game module, and an advertisement application module.

The main CPU 132 of the controller 130 accesses the storage 140 through the storage interface 135, copies various modules stored in the storage 140 into the RAM 131-2, ad performs operations according to operations of the copied modules.

Specifically, the main CPU 132 analyzes output values of the sensors of the sensor 120 using the sensing module 3821, checks a bending area, a bending line, a bending direction, a number of times that bending is performed, a bending angle, a bending speed, a touch area, a number of times that touch is performed, an intensity of touch, a magnitude of pressure, a degree of proximity, and an intensity of user grip, and, based on a result of the checking, determines whether the user manipulation is intended as input. If it is determined that the user manipulation is intended as input, the main CPU 132 detects information on an operation corresponding to the user manipulation from the database of the storage module 3810. The main CPU 132 drives a module corresponding to the detected information and performs an operation.

For example, if the operation is displaying a graphic user interface (GUI), the main CPU 132 configures a GUI screen using the image compositor module 3842-1 of the presentation module 3840. Also, the main CPU 132 determines a display location of the GUI screen using the coordinate combination module 3842-2 and controls the display 110 to display the GUI screen on the location.

If user manipulation corresponding to a message receiving operation is performed, the main CPU 132 executes the messaging module 3841, accesses a massage management server, and receives a message stored in a user account. Also, the main CPU 132 configures a screen corresponding to the received message using the presentation module 3840 and displays the screen on the display 140.

If a telephone call is performed, the main CPU 132 may drive the telephony module 3832.

As described above, programs of various structures may be stored in the storage 140 and the controller 130 may perform various operations using various programs stored in the storage 140.

Figure 18:
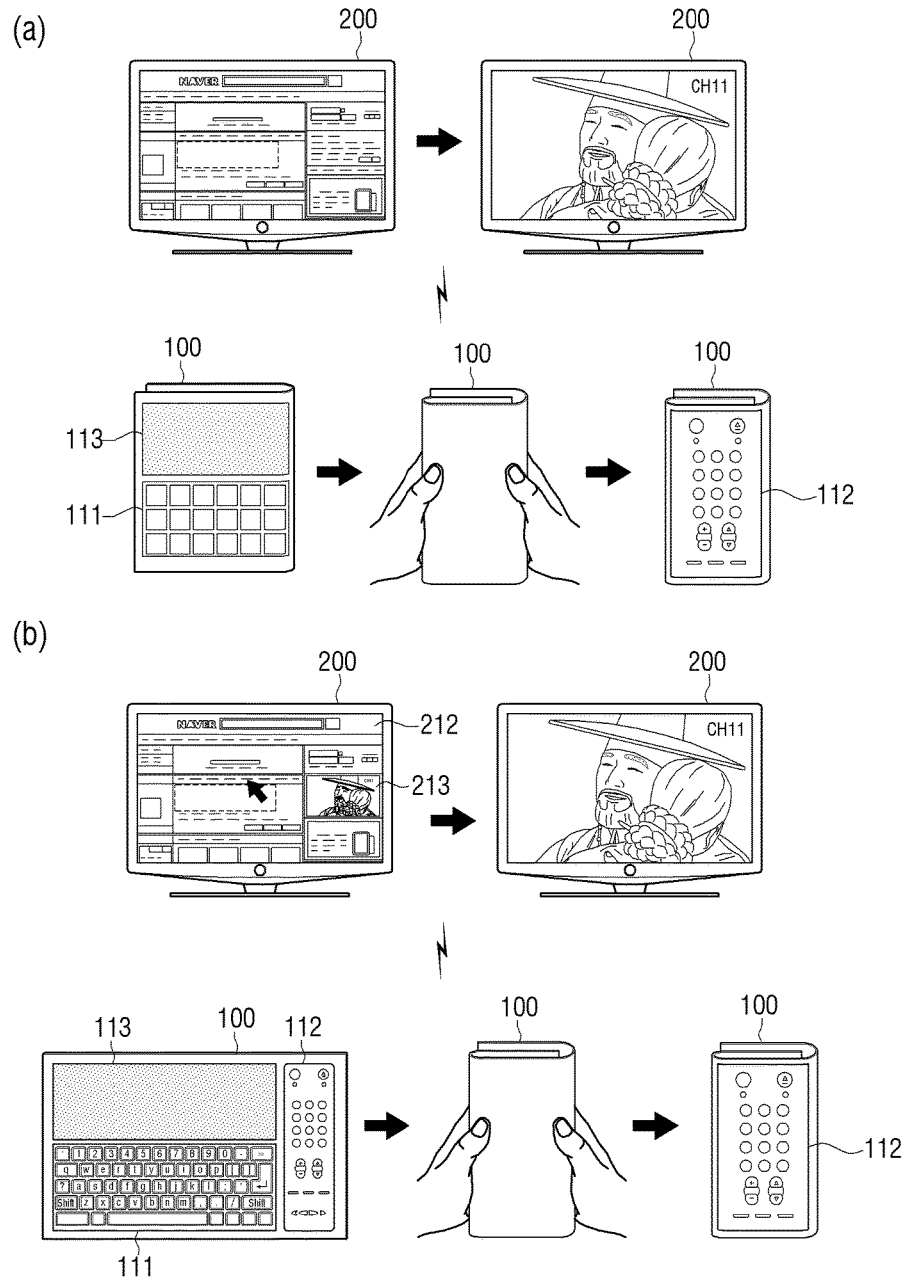
FIGS. 18 and 19 are views to explain a method for providing a UI according to an exemplary embodiment.
Figure 19:
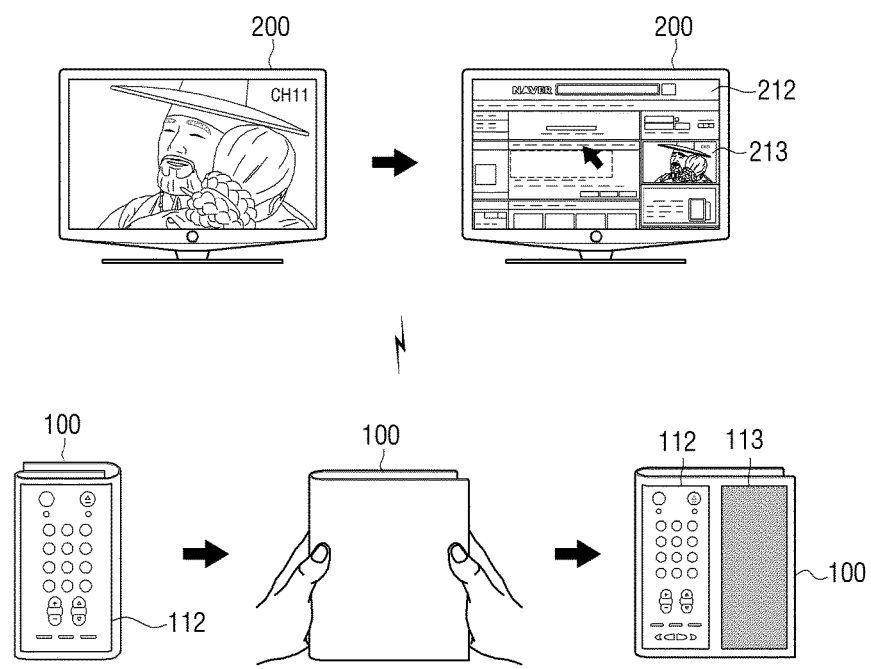

FIGS. 18 and 19 are views to explain a method for providing a UI according to an exemplary embodiment.

As shown in view (a) of FIG. 18, a web page is displayed on a screen of an electronic apparatus 200, for example, a digital TV, and a user terminal apparatus 100 that controls the electronic apparatus 200 provides a UI including a keyboard mode UI 111 and a touch mode UI 113 to control the web page.

Next, it is assumed that a broadcast content provided through a broadcast channel is displayed on the screen of the electronic apparatus 200 and the user folds the flexible display apparatus 100 in a vertical direction two times in order to control the broadcast screen.

In this case, the flexible display apparatus 100 transmits shape deformation information to the electronic apparatus 200.

In this case, the electronic apparatus 200 may determine a control mode that a content displayed on the screen requires. For example, if a broadcast content received through a broadcast channel is displayed on the screen as shown in view (a) of FIG. 18, the electronic apparatus 200 may determine that a remote control mode, which is a channel control mode, is required, and may transmit UI information on the remote control mode to the flexible display apparatus 100.

The flexible display apparatus 100 which receives the UI information on the remote control mode from the electronic apparatus 200 may display a remote control mode UI 112 on the deformed display surface.

On the other hand, as shown in view (b) of FIG. 18, a web page is displayed on a main screen of the electronic apparatus 200, for example, the digital TV, a broadcast content is displayed on a sub-screen, and the user terminal apparatus 100 that controls the electronic apparatus 200 provides a UI including a keyboard mode UI 111, a touch mode UI 113, and a remote control mode UI 112 to control the main screen on which the web page is displayed and control the sub screen on which the broadcast content is displayed.

Next, it is assumed that the broadcast content provided through the broadcast channel is displayed on an entire screen of the electronic apparatus 200 and the user folds the flexible display apparatus 100 in a vertical direction two times in order to control the broadcast screen.

In this case, the flexible display apparatus 100 transmits shape deformation information to the electronic apparatus 200.

In this case, the electronic apparatus 200 may determine a control mode required by the content displayed on the screen. For example, if the broadcast content received through the broadcast channel is displayed on the screen as shown in view (b) of FIG. 18, the electronic apparatus 200 may determine that a remote control mode, which is a channel control mode, is required, and may transmit UI information on the remote control mode to the flexible display apparatus 100.

The flexible display apparatus 100 that receives the UI information on the remote control mode from the electronic apparatus 200 may display a remote control mode UI 112 on the deformed display surface.

As shown in FIG. 19, a broadcast content is displayed on the screen of the electronic apparatus 200, and the user terminal apparatus 100 that controls the electronic apparatus 200 may provide a UI including a remote control mode UI 112 to control the broadcast content.

Next, if a cursor is operated in a pointing mode when an internet web page is displayed on a main screen 212 of the electronic apparatus 200, it may be determined that a touch mode to control the operation of the cursor is required. Also, if the broadcast content received through the broadcast channel is displayed on a sub screen 213, it may be determined that a remote control mode, which is a channel control mode, is required. Accordingly, the electronic apparatus 200 may transmit UI information on the touch mode and the remote control to the flexible display apparatus 100.

The flexible display apparatus 100 which receives the UI information on the touch mode and the remote control mode from the electronic apparatus 200 may display a touch mode UI 113 and a remote control mode UI 112 on the display surface.

In the above exemplary embodiment, the UI information of the control mode necessary for controlling the electronic apparatus 200 is transmitted by the electronic apparatus 200. However, this is merely an example, and the server 300 may determine a control mode and may provide UI information on the corresponding control mode to the flexible display apparatus 100.

Figure 20:
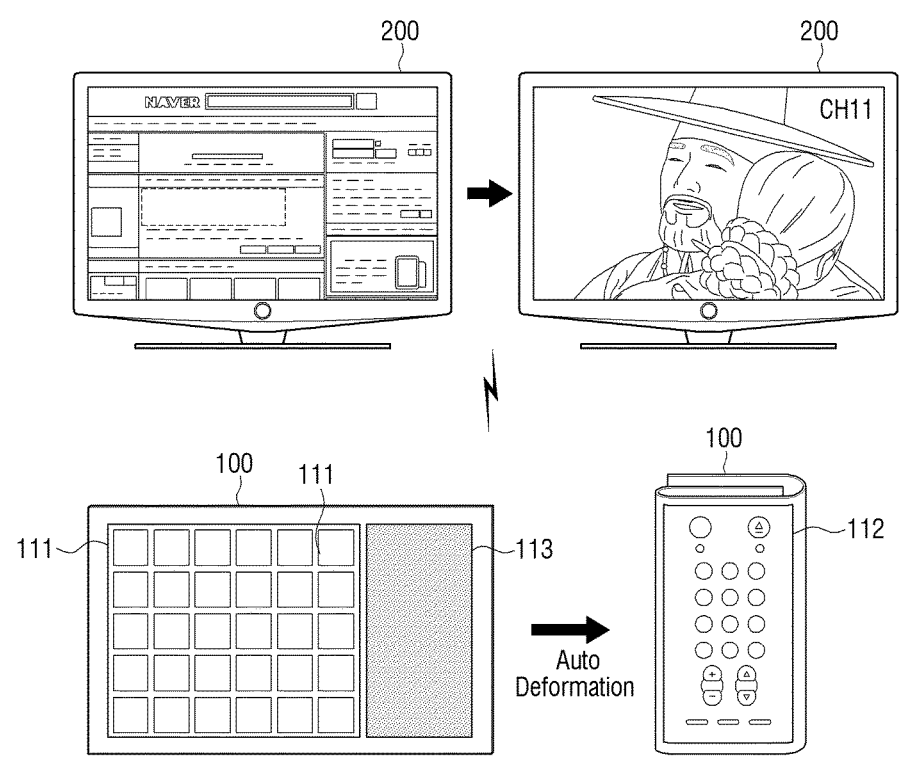
FIG. 20 is a view to explain automatically performing deformation according to an exemplary embodiment.

FIG. 20 is a view to explain automatic deformation of a flexible display apparatus.

As shown in FIG. 20, the electronic apparatus 200 displays a web page and the flexible display apparatus 100 operated in a control mode to control the electronic apparatus 200 provides a keyboard mode UI 111 and a touch mode UI 113.

After that, if a broadcast content provided through a broadcast channel is displayed on the electronic apparatus 200 according to a user command, the flexible display apparatus 100 is required to be operated in a remote control mode to select a channel or adjust a volume. Accordingly, the flexible display apparatus may be automatically deformed using an actuator to provide a remote control mode UI.

FIGS. 21 to 24 are views to explain a UI screen according to an exemplary embodiment.

As shown in FIGS. 21 to 24, a different UI may be provided according to a folding type of the flexible display apparatus 100.

As shown in view (a) of FIG. 21, if the flexible display apparatus 100 is in a flat state, the display screen may display a UI including all control mode UIs that can be provided on the display screen. For example, a UI including a keyboard mode UI 111, a remote control mode UI 112, and a touch mode UI 113 may be displayed on the screen as shown in view (a) of FIG. 21. The UI corresponding to each control mode may be displayed on a pre-defined area. However, the UI may be displayed on an area which is set by the user. Also, although the UI is provided in a 2-D plane form as shown in view (a) of FIG. 21, the UI may be provided in a 3D form, such as a concave or convex form according to flexibility of the flexible display apparatus 100.

If the flexible display apparatus 100 is folded as shown in view (b) of FIG. 21 and view (c) of FIG. 21, a UI of one or more of the control modes may be displayed on the display 110.

For example, if the flexible display apparatus 100 is folded once in a vertical direction as shown in view (b) of FIG. 21, a UI including a keyboard mode UI 111 and a touch mode UI 113 according to the folding type may be displayed.

Also, if the flexible display apparatus 100 is folded once in a horizontal direction as shown in view (c) of FIG. 21, a UI including the keyboard mode UI 111 and a remote control mode UI 112 according to the folding type may be displayed.

However, this is merely an example and the control modes may be combined in various ways according to a folding type and may be displayed.

If the flexible display apparatus 100 is folded two times in the vertical direction as shown in view (a) of FIG. 22, a UI 112 including the remote control mode UI according to the folding type may be displayed.

Also, if the flexible display apparatus 100 is folded two times in the horizontal direction as shown in view (b) of FIG. 22 and view (c) of FIG. 22, a UI 111 including the keyboard mode UI or a UI 113 including the touch mode UI according to the folding type may be displayed.

Also, if the flexible display apparatus 100 is folded once in the horizontal direction and is folded once in the vertical direction as shown in view (d) of FIG. 22, a UI 111 including the keyboard mode UI, a UI 112 including the remote control mode UI, or a UI 113 including the touch mode UI according to the folding type may be displayed.

That is, the number of control modes may vary according to an area of the display screen generated by folding as shown in FIGS. 21 and 22. Hereinafter, it is assumed that the UI for the control mode is provided by one folding for the convenience of explanation.

Figure 23:
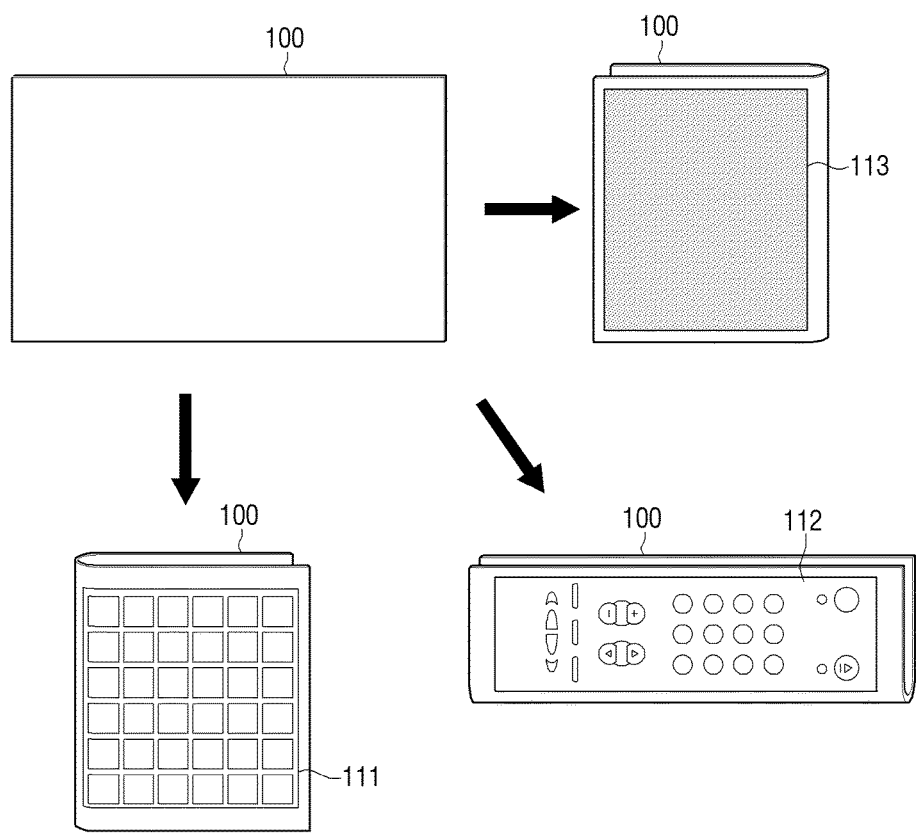

As shown in FIG. 23, a different UI may be provided according to a folding direction of the flexible display apparatus 100.

If the flexible display apparatus 100 is folded in a rightward direction as shown in FIG. 23, a UI including the keyboard mode UI 111 may be displayed (left lower portion of the drawing). If the flexible display apparatus 100 is folded in an upward direction, a UI including the remote control mode UI 112 may be displayed (right lower portion of the drawing). If the flexible display apparatus 100 is folded in a leftward direction, a UI including the touch mode UI 113 may be displayed (right upper portion of the drawing).

Figure 24:
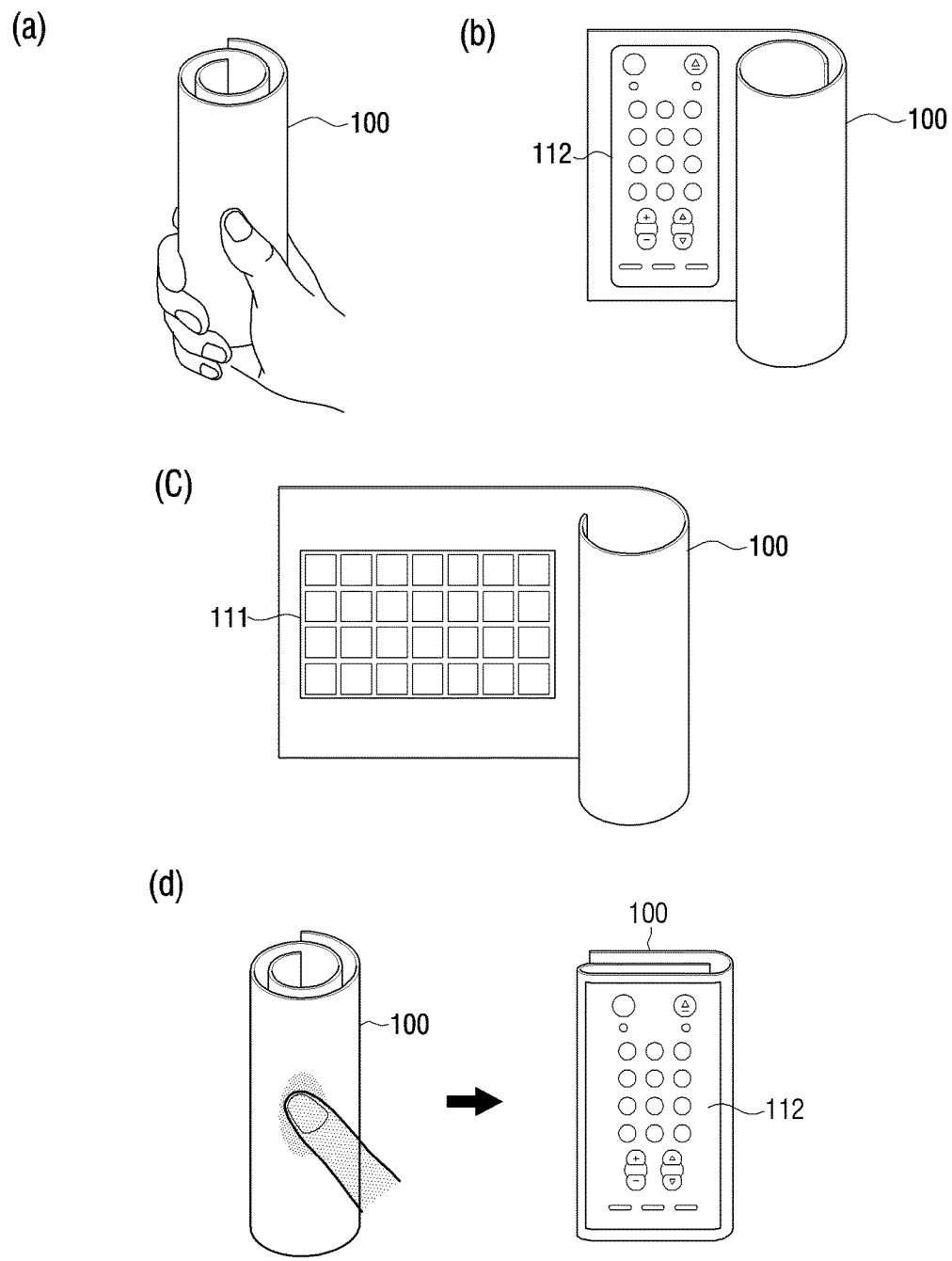

As shown in FIG. 24, a different UI may be provided according to a rolling type of the flexible display apparatus 100.

If an entire surface of the flexible display apparatus 100 is rolled as shown in view (a) of FIG. 24, the rolled flexible display apparatus 100 may provide a pointing function.

Also, if a part of the flexible display apparatus 100 is rolled as shown in view (b) of FIG. 24 and view (c) of FIG. 24, a UI may be displayed in an area that is not rolled.

For example, if the area that is not rolled is smaller than a predetermined area as shown in view (b) of FIG. 24, a UI including the remote control mode UI 112 may be displayed. Also, if the area that is not rolled is greater than the predetermined area as shown in view (c) of FIG. 24, a UI including the keyboard mode UI 111 may be displayed.

However, this is merely an example. If the area that is not rolled is greater than the predetermined area, a UI including two control mode UIs may be displayed.

In the above exemplary embodiment, the case in which folding and rolling are simultaneously performed is not illustrated. However, according to a situation, one area of the flexible display apparatus 100 may be folded and the other area may be rolled. In this case, a control mode UI according to the corresponding shape deformation may be provided.

Although not shown, the flexible display apparatus 100 may display the keyboard mode UI even when it is rolled. If the flexible display apparatus 100 is further rolled, the control mode UI displayed on the screen may be changed to the remote control mode UI. That is, the flexible display apparatus 100 may provide a different UI according to a degree of rolling.

As shown in view (d) of FIG. 24, the flexible display apparatus 100 may be rolled and then may have its shape changed to a flat shape by being pressed at a specific area by predetermined pressure. In this case, a control mode UI corresponding to the changed shape may be displayed on the changed screen. For example, the remote control mode UI 112 may be displayed as shown in view (d) of FIG. 24. In the example illustrated in FIG. 24, if the entire screen is rolled, the flexible display apparatus 100 may be operated in a pointing mode and thus may perform a pointing function. The pointing function may control a pointer displayed on the controlled apparatus.

FIG. 25 is a view to explain a method for providing a UI according to an exemplary embodiment.

As shown in FIG. 25, the flexible display apparatus 100 may provide the same control mode UI even if its folding state is different. However, a display form of the control mode UI may be changed to be suitable for the display screen.

For example, if the flexible display apparatus 100 is not folded as shown in view (a) of FIG. 25, an entire area of a keyboard may be displayed. If the flexible display apparatus 100 is folded once in half as shown in view (b) of FIG. 25, a part of the entire area of the keyboard may be displayed, and, if the flexible display apparatus 100 is folded two times as shown in view (c) of FIG. 25, a keyboard including only the basic keys may be displayed. Alternatively, instead of displaying fewer keys, the size of the keyboard may be changed, according to a configuration of an application or a user's preference.

Figure 26:
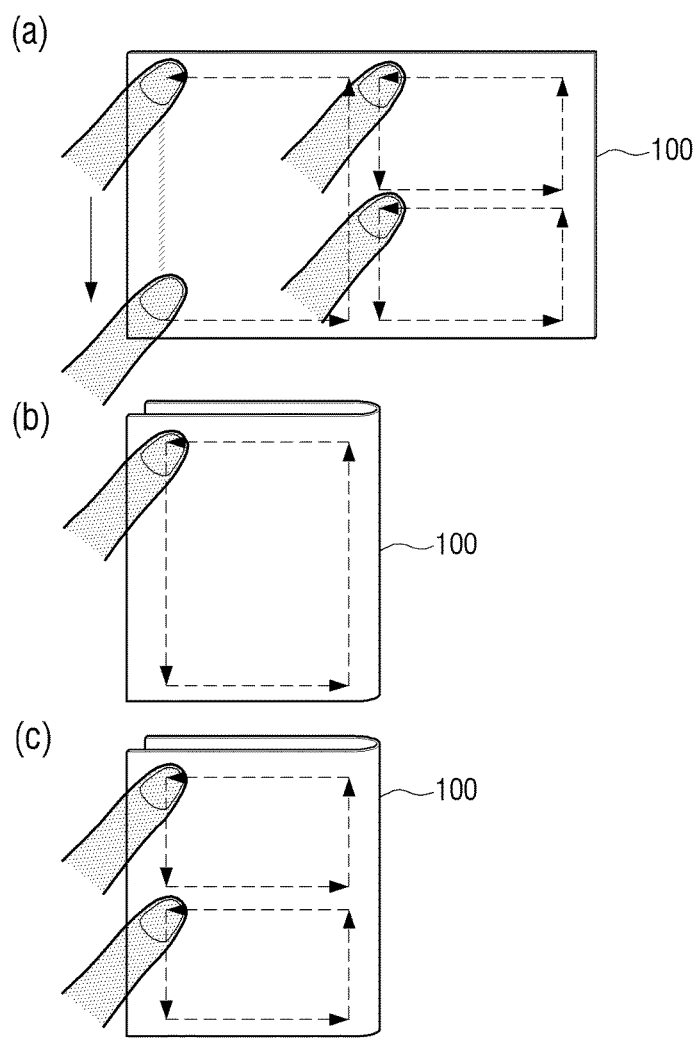
FIG. 26 is a view to explain a method for setting a UI display area according to an exemplary embodiment.

FIG. 26 is a view to explain a method for setting a UI display area according to an exemplary embodiment.

As shown in view (a) of FIG. 26, the user may set an area to provide each of a plurality of control mode UIs by touching and dragging.

Also, as shown in view (b) of FIG. 26 and view (c) of FIG. 26, the user may set the number of control mode UIs to be displayed on the screen by setting an area.

For example, if the user sets the entire folding surface as one area as shown in view (b) of FIG. 26, one control mode may be provided on the entire folding surface in a folded state of the flexible display apparatus 100. Also, if the user divides the folding surface into two areas as shown in view (c) of FIG. 26, two control modes may be provided on the entire folding surface in the folded state of the flexible display apparatus 100.

In this case, feedback as to the set area may be provided by highlighting a user's touch trajectory as shown in the drawing.

Figure 27:
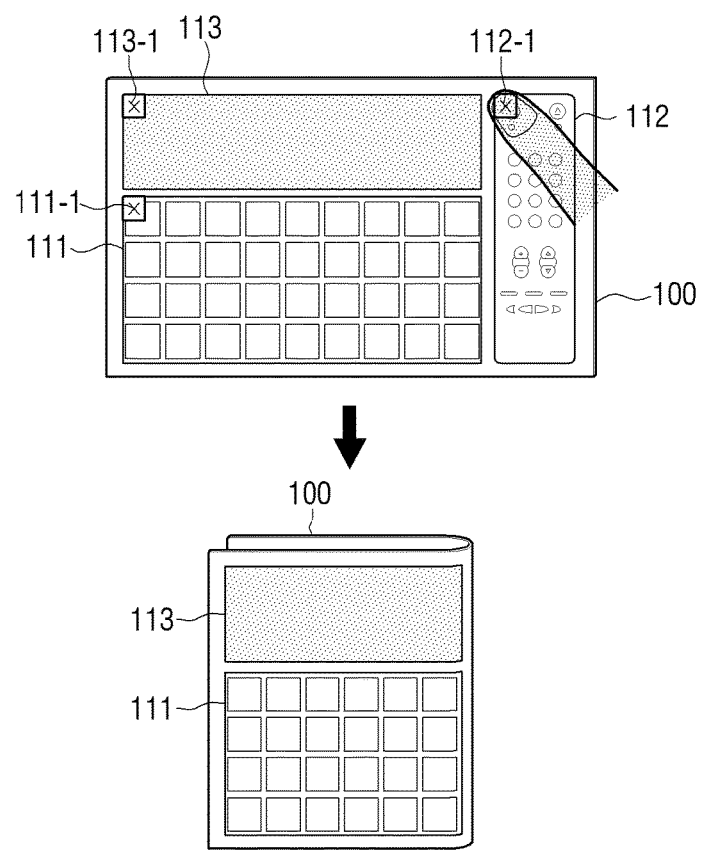
FIG. 27 is a view to explain a method for selecting a control mode UI according to an exemplary embodiment.

FIG. 27 is a view to explain a method for selecting a control mode UI according to an exemplary embodiment.

If the flexible display apparatus 100 is not folded as shown at the top of FIG. 27, a UI including all control mode UIs that can be provided may be displayed on the display 110. For example, as shown in FIG. 27, a UI including the keyboard mode UI 111, the remote control mode UI 112, and the touch mode UI 113 may be displayed on the screen.

Also, a selection menu 111-1, 112-1, or 113-1 may be provided to exclude a corresponding mode UI from the UI may be displayed on each mode area. Accordingly, the user may selectively enable or disable each of the UIs 111, 112, or 113 using the selection menu keys 111-1, 112-1, or 113-1.

After a user command to exclude the remote control mode UI 112 from the plurality of control mode UIs included in the UI is received, if the flexible display apparatus 100 is folded, the keyboard mode UI 111 and the touch mode UI 113 may be displayed on the folded screen.

FIG. 28 is a view to explain a method for changing a UI according to a user grip operation according to an exemplary embodiment.

As shown in FIG. 28, if the flexible display apparatus 100 is folded and the user grips the flexible display apparatus while a UI including the remote control mode UI 112 and the touch mode UI 113 is being displayed (upper drawing), the shapes of the remote control mode UI 112 and the touch mode UI 113 are changed according to a size of an area that does not overlap the area where the user's grip operation is performed (lower drawing). The shape of the UI may be a size of the UI or an aspect ratio of the UI.

Figure 29:
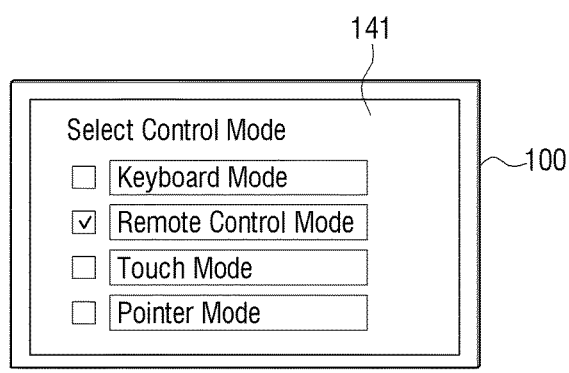
FIGS. 29 and 30 are views to explain a method for providing a menu UI according to exemplary embodiments.
Figure 30:
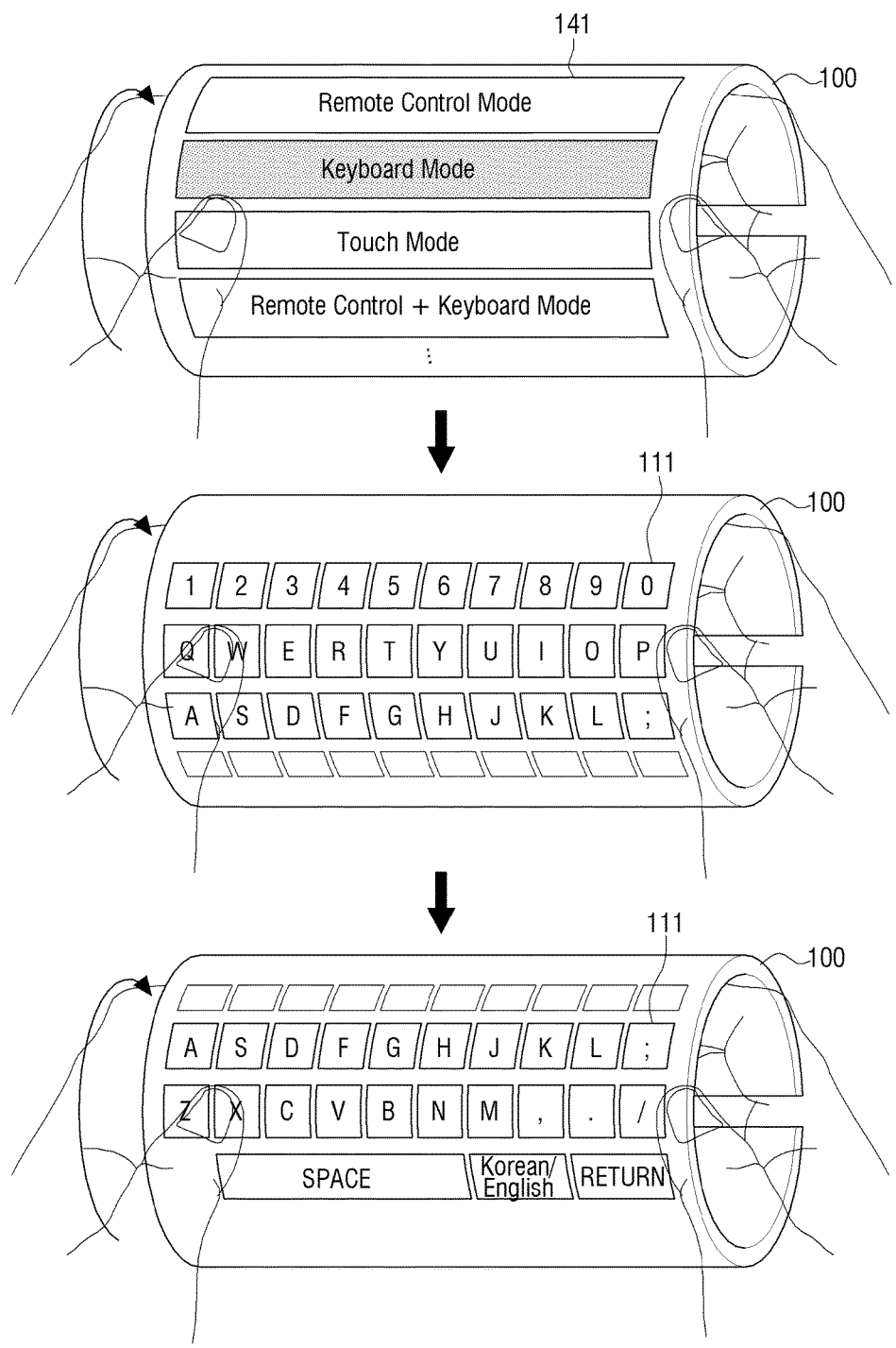

FIGS. 29 and 30 are views to explain a method for providing a menu UI according to exemplary embodiments.

As shown in FIG. 29, a menu UI 141 to select a control mode may be displayed when the flexible display apparatus 100 is in a flat state, and, if one of the control modes, the remote control mode UI may be provided. However, the embodiment in which the menu UI is provided when the flexible display apparatus 100 is in the flat state is merely an example. The menu UI may be provided when the flexible display apparatus 100 is folded, rolled, or otherwise deformed.

As shown in FIG. 30, a menu UI 141 to select a control mode may be provided when the flexible display apparatus 100 is rolled. For example, the control mode that can be controlled in the flexible display apparatus 100 may be displayed in a bar type menu (upper drawing).

If the user selects a keyboard mode on the bar type menu, the keyboard mode UI 111 corresponding to the selected keyboard mode may be displayed (middle drawing). In this case, the selecting may be, for example, a touch and hold input operation of the user, a touch and flick operation of the user, or a double touch operation of the user.

Also, if the user holds a specific area of the flexible display apparatus 100 and rotates the flexible display apparatus 100, objects included in the displayed keyboard mode UI 111 may also be rotated according to a degree of rotation and may be displayed (lower drawing). However, according to another exemplary embodiment, by dragging a keyboard area of the flexible display apparatus 100, objects included in the keyboard mode UI 111 may be scrolled. As such, objects in the keyboard mode UI 111 that are originally displayed may be removed from display, and objects not originally displayed may be displayed, and hence the scrolling effect may be achieved.

As described above, if the degree of rolling increases, a UI including a different control mode may be provided.

Figure 31:
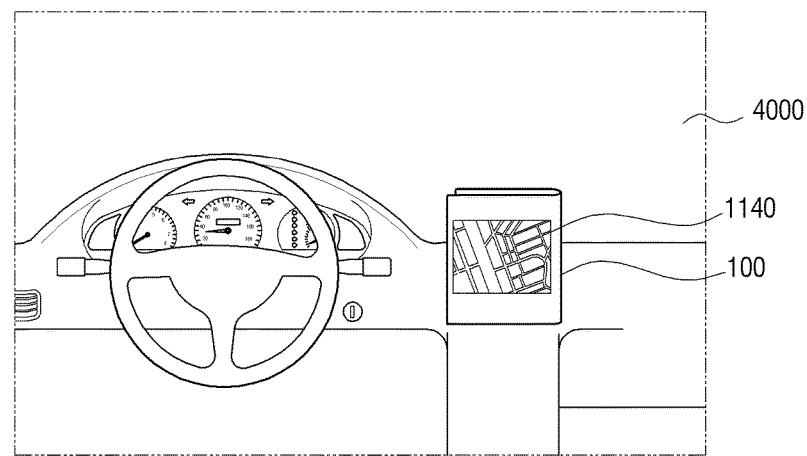
FIGS. 31 to 33 are views to explain a method for providing a UI according to an exemplary embodiment.
Figure 32:
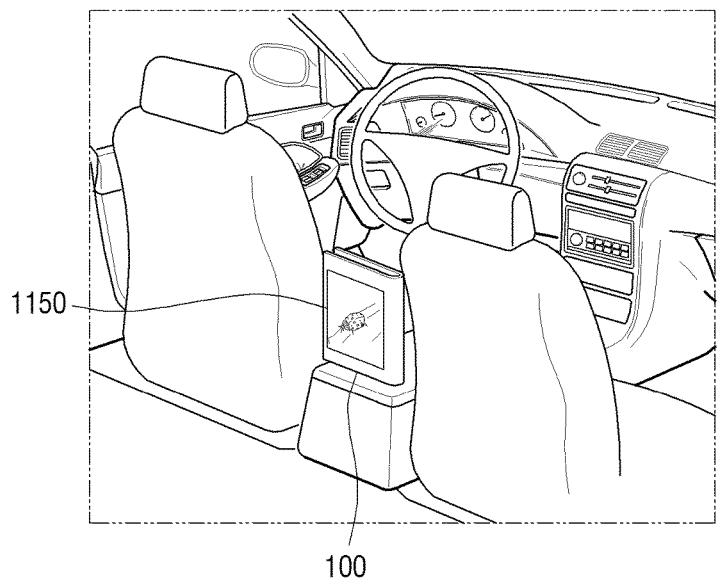
Figure 33:
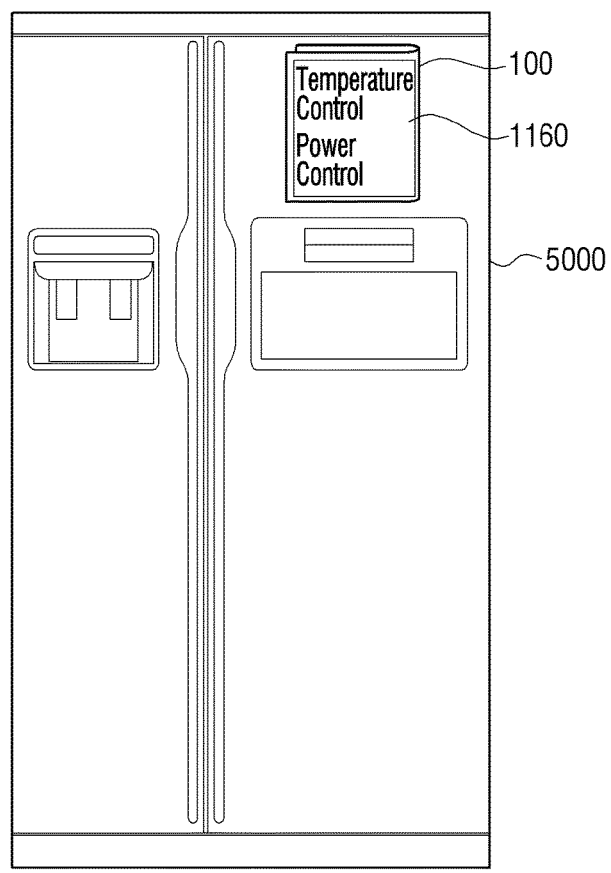

FIGS. 31 to 33 are views to explain a method for providing a UI according to an exemplary embodiment.

As shown in FIG. 31, if the flexible display apparatus 100 is attached to a center fascia of a car 4000, various UI screens related to car control may be provided according to shape deformation of the flexible display apparatus 100.

For example, if the flexible display apparatus 100 is folded once and then is attached to the center fascia of the car 4000, a UI to control various functions provided through the center fascia may be provided.

For example, a navigation mode UI 1140 may be provided. Also, if the flexible display apparatus 100 is folded two times and then is attached, other functions may be provided.

Also, although not shown, the flexible display apparatus 100 may receive screen control information from a corresponding manufacturer through a network and displays the corresponding information if the flexible display apparatus 100 is mounted on a specific area. For example, a control UI regarding items that are not displayed on the dashboard of the car, such as engine oil, coolant, engine state (engine sound or car vibration), tire state, timing belt state, wheel balance, abrasion state of a brake pedal, air conditioner gas, and antifreeze state may be provided.

Also, if the flexible display apparatus 100 is attached to a location facing a back seat of the car 4000 as shown in FIG. 32, various display functions and UIs 1150, such as watching a TV or movie, may be provided.

In the case of FIG. 32, if the shape of the flexible display apparatus 100 is deformed, the flexible display apparatus 100 may transmit shape deformation information to the server 300, for example, a car management server, and may receive display screen data corresponding to the deformed shape from the server 300.

Also, as shown in FIG. 33, the flexible display apparatus 100 may be attached to an electronic apparatus that is devoid of a display function, for example, a refrigerator 5000, and may provide a control UI 1160 to control the function of the refrigerator 5000. For example, the flexible display apparatus 100 may provide a UI including menu items such as 'temperature control' and 'power control'.

In the case of FIG. 33, if the shape of the flexible display apparatus 100 is deformed, the flexible display apparatus 100 may transmit shape deformation information to the server 300, for example, a home network server, and may receive display screen data corresponding to the deformed shape from the server 300.

In the exemplary embodiments shown in FIGS. 32 and 33, data exchange flow among the flexible display apparatus 100, the server 300, the car 4000, and the refrigerator 5000 is similar to that of the above-described exemplary embodiments and thus a redundant explanation is omitted.

FIG. 34 is a view to explain a method for providing a menu UI according to an exemplary embodiment.

As shown in view (a) of FIG. 34, various apparatuses may be controlled by the flexible display apparatus 100. For example, various apparatuses within a home network may be controlled by the flexible display apparatus 100.

Accordingly, as shown in view (b) of FIG. 34, the flexible display apparatus 100 may provide a menu UI to select a controlled apparatus.

Figure 35:
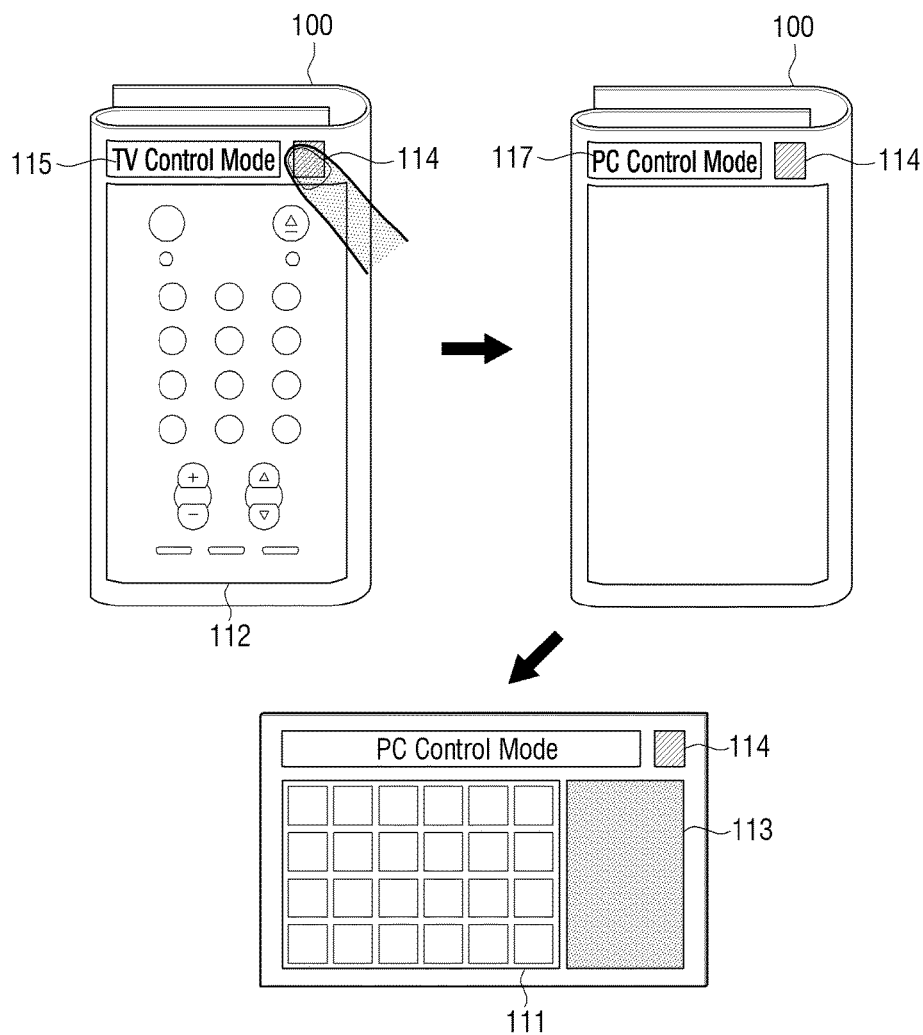
FIG. 35 is a view to explain a method for providing a UI according to an exemplary embodiment.

FIG. 35 is a view to explain a method for providing a UI according to an exemplary embodiment.

As shown in FIG. 35, in a state in which the flexible display apparatus 100 is folded two times, the remote control mode UI 112 is provided, and a controlled apparatus display menu 115 and a controlled apparatus change menu 114 are provided on one side of the remote control mode UI 112 (upper left drawing).

If the controlled apparatus change button 114 is selected, a controlled apparatus displayed on the controlled apparatus display menu 115 is changed, and the user may deform the flexible display apparatus to provide a UI corresponding to a control mode for controlling the changed controlled apparatus, that is, a PC, for example, a keyboard mode and a touch mode on the area where the remote control mode UI 112 has been provided may be displayed (upper right drawing).

If the user deforms the shape of the flexible display apparatus 100, the keyboard mode UI and the touch mode UI may be provided (lower drawing).

Figure 36:
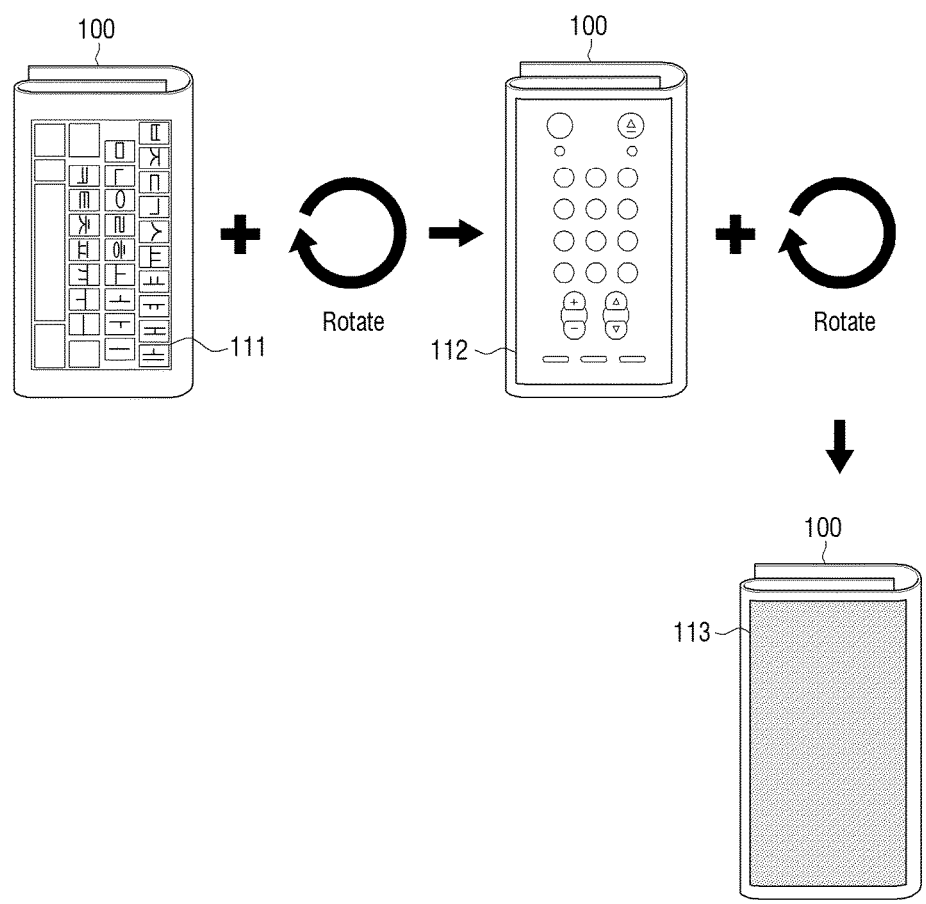
FIGS. 36 and 37 are views to explain a method for providing a UI according to an exemplary embodiment.
Figure 37:
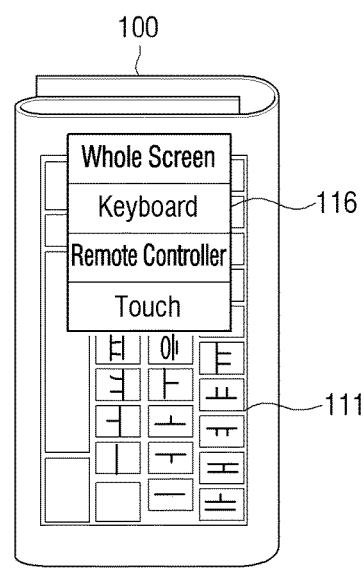

FIGS. 36 and 37 are views to explain a method for providing a UI according to an exemplary embodiment.

As shown in FIG. 36, a control mode UI display on the display surface may be changed by a user motion.

For example, if the flexible display apparatus 100 is folded two times, a plurality of control modes cannot be inserted into one screen simultaneously as shown in FIG. 36. Accordingly, the control mode UI may be changed by a user motion, for example, by touching the display surface and performing a rotating motion while still touching. As shown in FIG. 36, the keyboard mode 111 may be displayed, and when the flexible display apparatus is rotated, the remote control UI 112 may be displayed or the touch UI 113 may be displayed. In this case, the display order may be changed according to a rotation direction.

However, this is merely an example. The control mode UI may be changed by touching the display surface and performing a twisting motion, two touch, or triple touch.

As shown in FIG. 37, the displayed control mode UI may be changed by touching a designated area.

For example, a menu hidden in an upper end of the flexible display apparatus 100 may be displayed. The hidden menu may be revealed by dragging, deformation, or other input, and a control mode UI to be changed may be selected on the corresponding menu 116.

Figure 38:
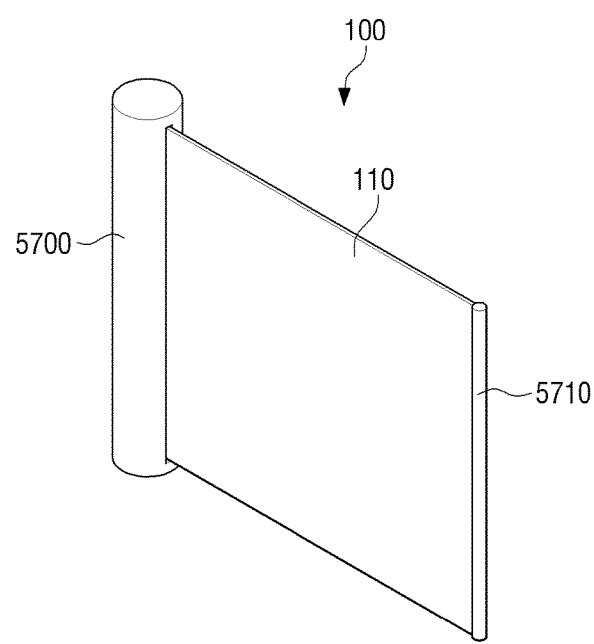
FIG. 38 is a view illustrating an example of a flexible display apparatus and a body.

FIG. 38 is a view illustrating an example of a flexible display apparatus and a body.

Referring to FIG. 38, the flexible display apparatus 100 includes a body 5700, a display 110, and a grip unit 5710.

The body 5700 may serve as a kind of a case containing the display 110. If the flexible display apparatus 100 includes various elements, as shown in FIG. 15, elements other than the display 110 and some sensors may be mounted in the body 5700. The body 5700 includes a rotary roller for rolling the display 110. Accordingly, when not in use, the display 110 is rolled about the rotary roller and retracted within the body 5700.

If the user holds the grip unit 5710 and pulls the display 110, the rotary roller is rotated in the opposite direction, so that the display 110 is extracted from the body 5700. A stopper may be provided on the rotary roller. Accordingly, if the user attempts to pull the grip unit 5710 by more than a predetermined distance, the rotation of the rotary roller is stopped by the stopper and the display 110 may be fixed. Accordingly, the user can execute various functions using the extracted display 110. If the user presses a button to release the stopper, the stopper is released and the rotary roller is rotated in a reverse direction. As a result, the display 110 retracted within the body 5100. The stopper may have a switch shape to stop an operation of a gear to rotate the rotary roller. Since the rotary roller and the stopper may employ a general rolling structure, detailed illustration and explanation thereof are omitted.

The body 5700 includes a power supply 500. The power supply 500 may be implemented by using a battery connector on which a disposable battery is mounted, a secondary cell which can be charged and used multiple times by the user, and a solar cell which generates electricity using solar heat. If the power supply is implemented by using the secondary cell, the user may connect the body 5700 to an external power source through a wire and may charge the power supply 500.

In FIG. 38, the body 5700 has a cylindrical shape. However, the shape of the body 5700 may be quadrangular or other polygonal shape. Also, the display 110 may be implemented in various forms such as enclosing the body 5700, rather than being retracted within the body 5700 and extracted from the body 5700.

Figure 39:
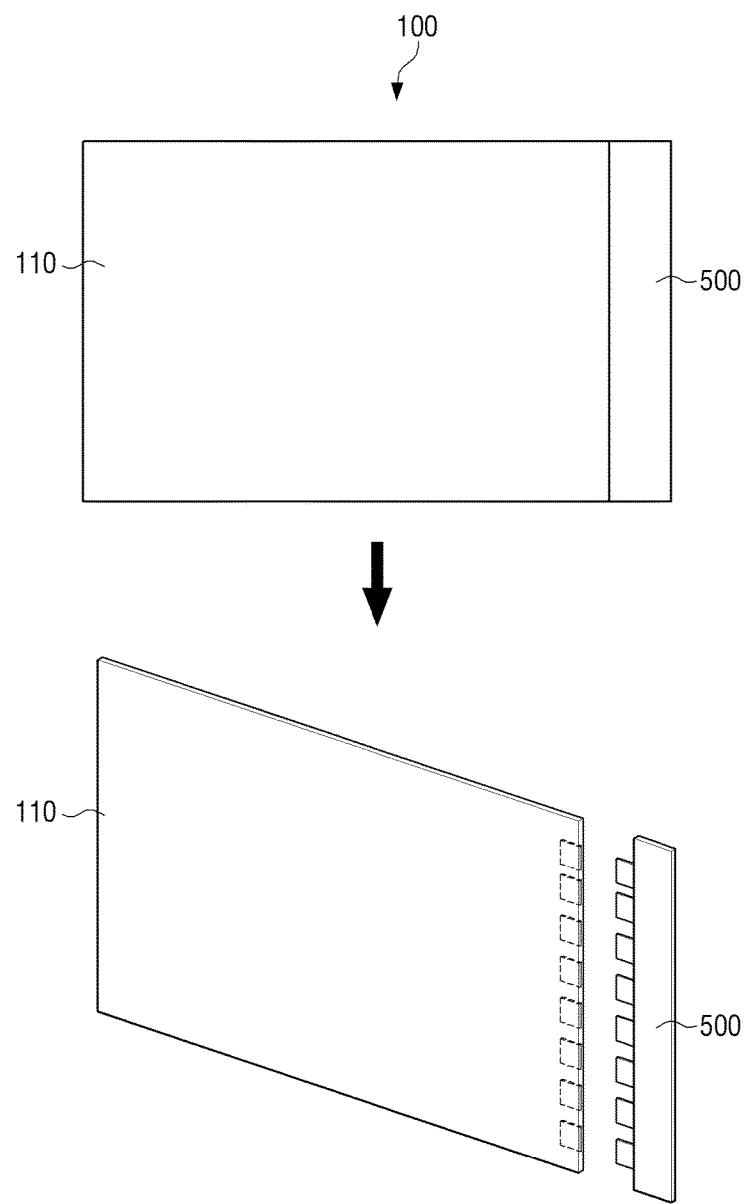
FIG. 39 is a view illustrating a flexible display apparatus including a power supply.

FIG. 39 is a view illustrating a flexible display apparatus having a detachable power supply 500. Referring to FIG. 39, the power supply 500 is provided on one edge of the flexible display apparatus.

The power supply 500 is made of a flexible material and can be deformed along with the display 110. Specifically, the power supply 500 includes a cathode collector, a cathode electrode, an electrolyte, an anode electrode, an anode collector, and a sheath covering the aforementioned members.

The collector may be implemented by using an alloy, such as TiNi, having good elasticity, metal, such as copper and aluminum, a conductive material, such as metal coated with carbon, carbon, and a carbon fiber, or a conducting polymer such as polypyrrole.

The cathode electrode may be manufactured by a negative electrode material, such as metal such as lithium, natrium, zinc, magnesium, cadmium, hydrogen storage alloy, and lead, nonmetal such as carbon, and a high molecular electrode material, such as organosulfur.

The anode electrode may be manufactured by a positive electrode material, such as sulfur and metal sulfide, lithium transition metal oxide such as $LiCoO_2$, and a high molecular electrode material, such as $SOCl_2$, $MnO_2$, $Ag_2O$, $Cl_2$, $NiCl_2$, and $NiOOH$. The electrolyte may be implemented in a gel form using PEO, PVdF, PMMA, and PVAC.

The sheath may use a general polymer resin. For example, PVC, HDPE, or epoxy may be used. Alternatively, any material that can prevent damage of a thread-type cell and is freely flexible or bendable may be used for the sheath.

Each of the anode electrode and the cathode electrode in the power supply 500 may include a connector to be electrically connected to an external source.

Referring to FIG. 39, the connector protrudes from the power supply 500 and a recess corresponding to a location, a size, and a shape of the connector is formed on the display 110. Accordingly, the power supply 500 is connected with the display 110 as the connector and the recess are connected to each other. The connector of the power supply 500 is connected to a power connection pad (not shown) of the flexible display apparatus 100 to supply power to the flexible display apparatus 100.

Although the power supply 500 is attached to or detached from one edge of the flexible display apparatus 100 in FIG. 39, this is merely an example. A location and a shape of the power supply 500 may be changed according to a product characteristic. For example, if the flexible display apparatus 100 has a predetermined thickness, the power supply 500 may be mounted on a rear surface of the flexible display apparatus 100.

In the above-described exemplary embodiments, after user, manipulation such as deformation or touch has been performed, a corresponding operation is performed according to whether that manipulation corresponds to a stored manipulation or input.

Figure 40:
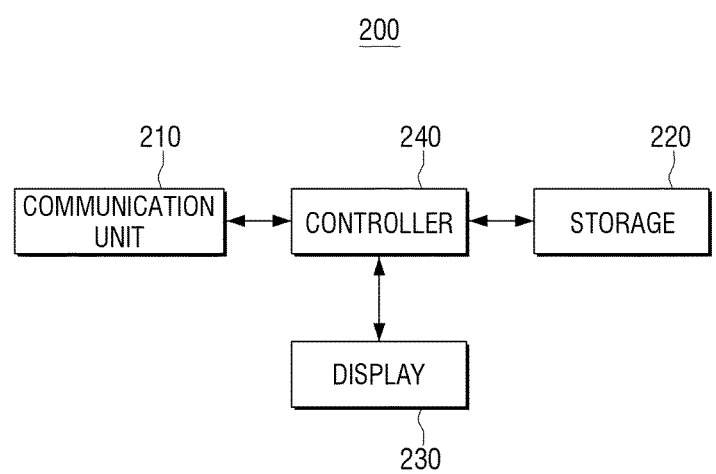
FIG. 40 is a block diagram to explain an electronic apparatus according to an exemplary embodiment.

FIG. 40 is a block diagram to explain electronic apparatus according to an exemplary embodiment.

Referring to FIG. 40, an electronic apparatus 200 includes a communication unit 210, a storage 220, a display 230, and a controller 240.

The electronic apparatus 200 may be implemented as any apparatus controlled by the flexible display apparatus 100, for example, a digital TV, a PC, a DVD player, an air conditioner, a refrigerator, and a navigation apparatus. Hereinafter, however, it is assumed that the electronic apparatus 200 is implemented by using a digital TV for the convenience of explanation.

The communication unit 210 communicates with at least one of the flexible display apparatus 100, 400 and the server 300. The communication unit 210 may use communication over the Internet or local area network (LAN) using Wireless Fidelity (WiFi), Ethernet, TCP/IP, IPX, FireWire, IEEE 1394, iLink, CDMA, TDMA, high definition multimedia interface (HDMI)-CEC, Wireless HDMI-CEC, or BlueTooth (B).

The communication unit 210 may receive shape deformation information from the flexible display apparatus 100. The shape deformation information may be information on a deformed display shape or information on a display surface selected for providing a UI. In this case, the information on the display shape may be screen information, such as width and height lengths in the case of a rectangle, vertex information in the case of a polygon, an index of a table indicating width and height lengths, and a display surface size. The communication unit 210 may further receive at least one of apparatus information of the flexible display apparatus 100 and control mode information to be used, besides the shape deformation information. If a control mode that the user desires is manually selected in the flexible display apparatus 100, the communication unit 210 may receive corresponding information.

The storage 220 is a storage medium that stores various programs for operating the electronic apparatus 200, and may be implemented by using a memory or a hard disk drive (HDD).

In particular, the storage 220 may store an apparatus driver that recognizes a control signal from the flexible display apparatus 100.

The storage 220 may store a variety of UI information on the flexible display apparatus 100. Specifically, the storage 220 may include UI information corresponding to each control mode. The UI information may be information on areas of various input tools included in a UI corresponding to each control mode, and arrangement thereof.

The display 230 may provide various display screens regarding functions of the electronic apparatus 200.

The display 230 may be implemented using at least one of a liquid crystal display (LCD), a thin film transistor-liquid crystal display, an organic light emitting diode (OLED), a flexible display, and a 3-dimensional (3D) display.

In particular, the display 230 may provide various display screens corresponding to a control command received from the flexible display apparatus 100 under the control of the controller 240.

The controller 240 may control an overall operation of the electronic apparatus 200.

The controller 240 may determine UI information to be provided to the flexible display apparatus 100 based on the shape deformation apparatus and the apparatus information received through the communication unit 210.

The controller 240 may determine UI information considering information about a screen currently reproduced by the electronic apparatus 200.

For example, the shape deformation information received from the flexible display apparatus 100 indicates "folding two times in the horizontal direction", and a control mode UI corresponding to the information is a keyboard mode UI or a remote control mode and is stored in the storage 220. In this case, if a broadcast content provided through a broadcast channel is displayed on the display 230 of the electronic apparatus 200, the controller 240 may provide the remote control mode UI necessary for controlling the corresponding screen. Accordingly, the UI reflecting a user's intention can be provided.

If a control mode UI to be provided is determined, the controller 240 determines a display surface that will display the UI from among surfaces divided by bending based on the shape deformation information.

The controller 240 may determine a display area, such as a size and a shape of the display surface, based on the shape deformation information.

The controller may determine a size and an arrangement pattern of each of input tools included in the control mode UI based on the determined display area.

In this case, the size and the arrangement pattern of the input tool included in the control mode UI may be determined based on table 3, which will be explained below, and a detailed description thereof will be provided.

If a control mode that the user desires is received through the communication unit 210, UI information corresponding to the control mode may be provided.

Figure 41:
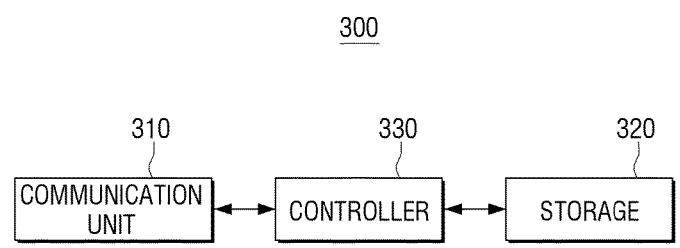
FIG. 41 is a block diagram to explain a server according to an exemplary embodiment.

FIG. 41 is a block diagram to explain a server according to an exemplary embodiment.

Referring to FIG. 41, a server 300 includes a communication unit 310, a storage 320, and a controller 330.

The communication unit 310 communicates with at least one of the flexible display apparatus 100 and the electronic apparatus 200, which is a controlled apparatus of the flexible display apparatus 100.

The communication unit 310 may communicate over the Internet or local area network (LAN) using Wireless Fidelity (WiFi), Ethernet, TCP/IP, IPX, FireWire, IEEE 1394, iLink, CDMA, TDMA, high definition multimedia interface (HDMI)-CEC, Wireless HDMI-CEC, or BlueTooth (B).

The communication unit 310 may receive shape deformation information of the flexible display apparatus 100 from the flexible display apparatus 100 and the electronic apparatus 200 that is controlled by the flexible display apparatus 100. The shape deformation information may be information on a deformed display shape or information on a display surface selected for providing a UI. In this case, the information on the display shape may be screen information, such as width and height lengths in the case of a rectangle, vertex information in the case of a polygon, an index of a table indicating width and height lengths, and a display surface size.

If the shape deformation information of the flexible display apparatus 100 is received from the electronic apparatus 200, the flexible display apparatus 100 transmits its shape deformation information to the electronic apparatus 200.

The communication unit 310 may further receive at least one of apparatus information of the flexible display apparatus 100, control mode information to be used, and apparatus information of the electronic apparatus 200, in addition to the shape deformation information.

If a control mode that the user desires is manually selected in the flexible display apparatus 100, the communication unit 310 may receive corresponding information.

The storage 320 may store a variety of UI information on the flexible display apparatus 100. Specifically, the storage 320 may include UI information corresponding to each control mode. The UI information may be information on areas of various input tools included in a UI corresponding to each control mode, and arrangement thereof.

The controller 330 may control an overall operation of the server 300.

The controller 330 may determine UI information to be provided to the flexible display apparatus 100 based on the shape deformation apparatus and the apparatus information received through the communication unit 310.

The controller 330 may determine UI information considering screen information currently provided by the electronic apparatus 200.

For example, the shape deformation information received from the flexible display apparatus 100 indicates "folding two times in the horizontal direction", and a control mode UI corresponding to the information is a keyboard mode UI or a remote control mode and is stored in the storage 320. In this case, if a broadcast content provided through a broadcast channel is displayed on the display 230 of the electronic apparatus 200, the controller 330 may receive the corresponding information from the electronic apparatus 200 and may provide the remote control mode UI information necessary for controlling the corresponding display screen to the flexible display apparatus 100. Accordingly, the UI reflecting a user's intention can be provided. According to a situation, the screen information provided through the display 230 of the electronic apparatus 200 may be received from the flexible display apparatus 100.

If a control mode UI to be provided is determined, the controller 330 determines a display surface that will display the UI from among surfaces divided by bending based on the shape deformation information.

The controller 330 may determine a display area, such as a size and a shape of the display surface, based on the shape deformation information.

The controller 330 may determine a size and an arrangement pattern of each of input tools included in the control mode UI based on the determined display area.

Hereinafter, a method for setting a display area according to shape deformation of the flexible display apparatus 100 will be explained with reference to following table:

TABLE 3

| | |
|---|---|
| Entire screen | Entire display screen of the flexible display apparatus |
| Folding once | 1) determining a display surface from among front and rear surfaces<br>2) determining a bending line based on output from a bending sensor<br>3) setting a rectangle that includes two of the three sides of display boundaries on a display surface of a terminal and maximizes an area of the rectangle, as a real display surface (one of the three sides is removed)<br>4) if a display area is divided into two or three input modes, dividing the rectangular area designated in above 3) into two or three rectangular areas according to a multi input modes<br>5) if a display area is divided into two or three inputs, placing a rectangle on each input area of the display surface obtained in above 1) and 2), and setting a display area so that a left area is minimized. |
| Folding two times (in the same direction | 1) determining a display surface from among front and rear surfaces<br>2) determining a bending line based on output from a bend sensor<br>3) if three display boundaries are included on a display surface of a terminal, setting a rectangle that includes two of the three sides and maximize an area of the rectangle as a real display surface (one of the three sides is removed)<br>4) if three display boundaries are included on a display surface of a terminal, and if a display area is divided into two or three input modes, dividing the rectangle area designated in above 3) into two or three rectangular areas according to multi input modes<br>5) if three display boundaries are included on a display surface of a terminal, and if a display area is divided by two or three inputs, placing a rectangle on each input area of the display surface obtained in above 1) and 2), and setting a display area so that a left area is minimized<br>6) if two display boundaries are included on a display surface of a terminal, setting a maximum area of a rectangle formed by the two boundaries as a real display surface<br>7) if two display boundaries are included on a display surface of a terminal, and if a display area is divided by two or three inputs, placing a rectangle on each input area of the display surface obtained in above 1) and 2), and setting a display area so that a left area is minimized |

TABLE 3-continued

| | |
|---|---|
| Folding two times (horizontal axis + vertical axis) | 1) determining a display surface from among front and rear surfaces<br>2) determining a bending line based on output from a bend sensor<br>3) setting a maximum area of a rectangle that includes the longest side from among sides of a polygon formed by display boundaries and a bending line on a display surface of a terminal, as a display area<br>4) setting a maximum one of rectangles formed by two sides neighboring two display boundaries on a display surface of a terminal as a display area<br>5) if a display area on a display surface of a terminal is divided by two or three inputs, placing a rectangle on each input area of the display surface obtained in above 1) and 2), and setting a display area so that a left area is minimized |

If a control mode that the user desires is received through the communication unit 310, UI information corresponding to the control mode may be generated or reconfigured according to the display surface, and may be provided.

Figure 42:
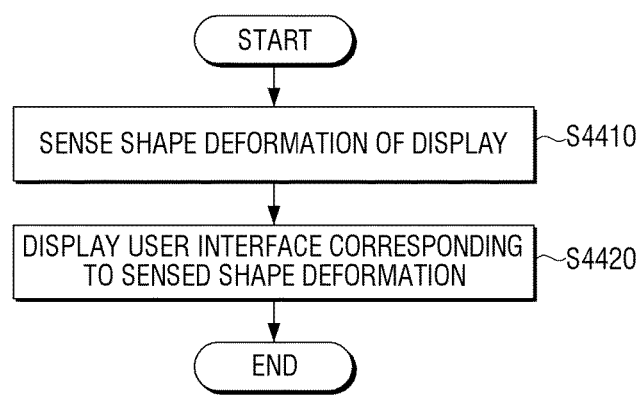
FIG. 42 is a flowchart to explain a method for providing a UI of a flexible display apparatus according to an exemplary embodiment.

FIG. 42 is a flowchart to explain a method for providing a UI of the flexible display apparatus according to an exemplary embodiment.

The method for providing the UI of the flexible display apparatus shown in FIG. 42 senses shape deformation of the display (S4410). The shape deformation may be at least one of rolling, folding, and bending.

A UI corresponding to the sensed shape deformation is displayed (S4420). The UI may be an interface to another apparatus and thus may control the another apparatus.

Specifically, the UI may include at least one control mode to control another apparatus. For example, the control mode may include at least one of a keyboard mode, a remote control mode, and a touch mode.

In the operation of displaying the UI, the UI corresponding to the sensed shape deformation may be displayed using UI information corresponding to each of the plurality of control modes.

Also, in the operation of displaying the UI, the UI may be displayed using UI information received from the controlled apparatus or a server.

A signal corresponding to the sensed shape deformation may be transmitted to the controlled apparatus and UI information corresponding to shape deformation based on an event generated in the controlled apparatus may be received from the controlled apparatus.

Also, the UI may be displayed using UI information corresponding the shape deformation that is received from the server.

A signal corresponding to the sensed shape deformation may be transmitted to the server, and UI information corresponding the shape deformation may be received from the server.

The signal corresponding to the sensed shape deformation may include information on a display area that is exposed by the shape deformation.

The UI may include an apparatus selection area to change selection of the controlled apparatus.

Figure 43:
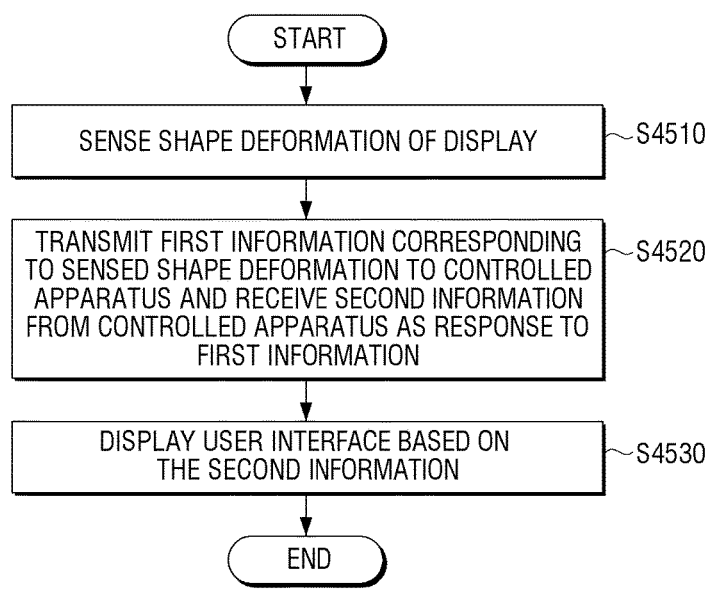
FIG. 43 is a flowchart to explain a method for providing a UI of a flexible display apparatus according to an exemplary embodiment.

FIG. 43 is a flowchart to explain a method for providing a UI of the flexible display apparatus according to an exemplary embodiment.

The method for providing the UI of the flexible display apparatus shown in FIG. 45 senses shape deformation of the display (S4510).

First information corresponding to the sensed shape deformation is transmitted to the controlled apparatus, and second information is received from the controlled apparatus as a response to the first information (S4520).

A UI is displayed based on the second information (S4530). The flexible apparatus is connected with the controlled apparatus and thus the UI may be an interface that controls the controlled apparatus. Specifically, the UI may include at least one control mode to control the controlled apparatus.

The first information may be a signal corresponding to the sensed shape deformation, and the second information may be UI information corresponding to the shape deformation.

The first information may include information on a size of the display corresponding to the sensed shape deformation.

A user's selection of a surface corresponding to the UI when the shape is deformed may be received.

According to the various exemplary embodiments described above, a UI for controlling the controlled apparatus that corresponds to shape deformation of the flexible display apparatus can be provided. Also, a UI of a type corresponding to a content characteristic provided by a controlled apparatus can be provided. The above method may be implemented by using an application.

Specifically, a non-transitory computer readable medium, which stores a program for performing sensing shape deformation of a display included in a flexible display apparatus, and displaying a UI corresponding to the sensed shape deformation, may be provided.

The non-transitory computer readable medium refers to a medium that stores data semi-permanently and is readable by an apparatus. Specifically, the above-described various applications or programs may be stored in a non-transitory computer readable medium, such as a compact disc (CD), a digital versatile disk (DVD), a hard disk, a Blu-ray disk, a universal serial bus (USB) memory stick, a memory card, and a read only memory (ROM), and may be provided.

The foregoing exemplary embodiments are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display apparatus comprising:
a flexible display;
a sensor that detects a deformed shape of the flexible display; and
a controller that, if the flexible display is deformed to a first deformed shape, controls the flexible display to display a first user interface (UI) corresponding to the first deformed shape for controlling a first controlled device, if a user input for changing a controlled device to a second controlled device is received and the flexible display is deformed from the first deformed shape to a second deformed shape, display a second UI corresponding to the second deformed shape for controlling the second controlled device,
wherein the controller is configured to display the first UI on a first screen of the flexible display determined according to the first deformed shape, and display the second UI on a second screen of the flexible display determined according to the second deformed shape, and
wherein a size of the first screen is different from a size of the second screen.

2. The flexible display apparatus as claimed in claim 1, further comprising:
a communication unit that is controlled by the controller to transmit a first control signal to the first controlled device that instructs the first controlled device to execute a first function in response to receiving a first input on the displayed first UI and a second control signal to the second controlled device that instructs the second controlled device to execute a second function in response to receiving a second input on the displayed second UI.

3. The flexible display apparatus as claimed in claim 2, wherein the communication unit transmits first information corresponding to the first deformed shape to the first controlled device or second information corresponding to the second deformed shape to the second controlled device and receives a response that indicates one of the first UI or the second UI to be displayed on the flexible display.

4. The flexible display apparatus as claimed in claim 3, wherein the response further indicates a configuration of the one of the first UI and the second UI to be displayed on the flexible display.

5. The flexible display apparatus as claimed in claim 2, wherein the communication unit transmits the one of the first deformed shape and the second deformed shape sensed by the sensor to the one of the first controlled device and the second controlled device and receives a response from the one of the first controlled device and the second controlled device that indicates one of the first UI and the second UI to be displayed on the flexible display and a type of content reproduced by the one of the first controlled device and the second controlled device, and
wherein the controller selects one of the first UI and the second UI based on the type of content reproduced by the controlled device and controls the flexible display to display the selected one of the first UI and the second UI.

6. The flexible display apparatus as claimed in claim 2, wherein the communication unit receives an event signal that indicates a change in content reproduced by the one of the first controlled device and the second controlled device, and
wherein the controller controls the display to display one of the first UI and the second UI based on the change in content.

7. The flexible display apparatus as claimed in claim 2, wherein the communication unit transmits the one of the first deformed shape and the second deformed shape sensed by the sensor to a server and receives a response from the server that indicates one of the first UI and the second UI to be displayed on the flexible display.

8. The flexible display apparatus as claimed in claim 1, wherein the sensor senses a change of shape of the flexible display from the one of the first deformed shape and the second deformed shape to a new shape, and
wherein the controller controls the flexible display to change a displayed UI based on the new shape.

9. The flexible display apparatus as claimed in claim 1, wherein the first UI comprises a touch interface controlling a cursor displayed on the first controlled device and the second UI comprises a keyboard interface controlling entry of keyboard data to the second controlled device.

10. The flexible display apparatus as claimed in claim 1, wherein the first deformed shape comprises one of a rolled shape, a bent shape, and a folded shape and the second deformed shape comprises one of the rolled shape, the bent shape, and the folded shape different from the first deformed shape.

11. The flexible display apparatus as claimed in claim 10, wherein the first deformed shape is the bent shape having a first degree of bending and the second deformed shape is the bent shape having a second degree of bending.

12. A flexible display apparatus comprising:
a flexible display;
a sensor that senses one of (i) a first deformed shape of the flexible display and (ii) a second deformed shape of the flexible display;
a controller that (i) controls the flexible display to display (a) a first user interface (UI) corresponding to the first deformed shape in response to sensing the first deformed shape and (b) a second UI corresponding to the second deformed shape in response to sensing the second deformed shape, (ii) receives an input on one of the first UI and the second UI that is displayed, and (iii) transmits a control signal to a controlled apparatus that instructs the controlled apparatus to execute a function of the controlled apparatus corresponding to the input; and
a communication unit that is controlled by the controller to transmit the control signal to the controlled apparatus,
wherein the communication unit receives a signal from the controlled apparatus to deform the flexible display to one of the first deformed shape and the second deformed shape,
wherein the controller controls the flexible display to deform the flexible display to be the one of the first deformed shape and the second deformed shape,
wherein the controller is configured to display the first UI on a first screen of the flexible display determined according to the first deformed shape, and display the second UI on a second screen of the flexible display determined according to the second deformed shape, and
wherein a size of the first screen is different from a size of the second screen.

13. A method of controlling a flexible display apparatus, the method comprising:
detecting a deformed shape of a flexible display of the flexible display apparatus;
displaying on a first screen of the flexible display a first user interface (UI) corresponding to a first deformed shape in response to detecting the first deformed shape for controlling a first controlled device, wherein the first screen is determined according to the first deformed shape; and
if a user input for changing a controlled device to a second controlled device is received and the flexible display is deformed from the first deformed shape to a second deformed shape, displaying on a second screen of the flexible display a second UI corresponding to the second deformed shape for controlling the second controlled device, wherein the second screen is determined according to the second deformed shape, and a size of the first screen is different from a size of the second screen.

14. The method as claimed in claim 13, further comprising:
transmitting first information corresponding to the first deformed shape to the first controlled device or second information corresponding to the second deformed shape to the second controlled device; and receiving a response that indicates one of the first UI and the second UI to be displayed on the flexible display.

15. The method as claimed in claim 14, wherein the response further indicates a configuration of one of the first UI and the second UI to be displayed on the flexible display.

16. The method as claimed in claim 13, further comprising:
transmitting the one of the first deformed shape and the second deformed shape to the one of the first controlled device and the second controlled device;
receiving a response from the one of the first controlled device and the second controlled device that indicates one of the first UI and the second UI to be displayed on the flexible display and a type of content reproduced by the one of the first controlled device and the second controlled device; and
selecting the one of the first UI and the second UI based on the type of content reproduced by the one of the first controlled device and the second controlled device, and
wherein the displaying comprises displaying the one of the first UI and the second UI based on a result of the selecting.

17. The method as claimed in claim 13, further comprising:
receiving an event signal that indicates a change in content reproduced by the one of the first controlled device and the second controlled device, and
wherein the displaying comprises displaying one of the first UI and the second UI based on the change in content.

18. The method as claimed in claim 13, further comprising:
transmitting information corresponding to one of the first deformed shape and the second deformed shape that is detected to a server; and
receiving a response from the server that indicates one of the first UI and the second UI to be displayed on the flexible display.

19. The method as claimed in claim 13, further comprising:
detecting a change of shape of the flexible display from the one of the first deformed shape and the second deformed shape to a new shape; and
controlling the flexible display to change the one of the first UI and the second UI that is displayed, based on the new shape.

20. The method as claimed in claim 13, wherein the first UI comprises a touch interface controlling a cursor displayed on the first controlled device and the second UI comprises a keyboard interface controlling entry of keyboard data to the second controlled device.

21. The method as claimed in claim 13, wherein the first deformed shape comprises one of a rolled shape, a bent shape, and a folded shape, and the second deformed shape comprises one of the rolled shape, the bent shape, and the folded shape different from the first deformed shape.

22. The method as claimed in claim 21, wherein the first deformed shape is the bent shape having a first degree of bending and the second deformed shape is the bent shape having a second degree of bending.

23. A flexible display apparatus comprising:
a flexible display;
a sensor that senses one of (i) a first deformed shape of the flexible display and (ii) a second deformed shape of the flexible display;
a controller that (i) controls the flexible display to display (a) a first user interface (UI) corresponding to the first deformed shape in response to sensing the first deformed shape and (b) a second UI corresponding to the second deformed shape in response to sensing the second deformed shape, (ii) receives an input on one of the first UI and the second UI that is displayed, and (iii) transmits a control signal to a controlled apparatus that instructs the controlled apparatus to execute a function of the controlled apparatus corresponding to the input; and
a communication unit that is controlled by the controller to transmit the control signal to the controlled apparatus,
wherein the communication unit transmits the one of the first deformed shape and the second deformed shape sensed by the sensor to the controlled apparatus and receives a response from the controlled apparatus that indicates one of the first UI and the second UI to be displayed on the flexible display,
wherein the controller determines a resolution of the one of the first UI and the second UI that is displayed, based on the one of the first deformed shape and the second deformed shape sensed by the sensor,
wherein the communication unit transmits the resolution and the one of the first deformed shape and the second deformed shape sensed by the sensor to the controlled apparatus,
wherein the controller is configured to display the first UI on a first screen of the flexible display determined according to the first deformed shape, and display the second UI on a second screen of the flexible display determined according to the second deformed shape, and
wherein a size of the first screen is different from a size of the second screen.

24. A method of controlling a flexible display apparatus, the method comprising:
sensing one of a first deformed shape of a flexible display of the flexible display apparatus and a second deformed shape of the flexible display of the flexible display apparatus;
displaying a first user interface (UI) corresponding to the first deformed shape on a first screen of the flexible display in response to sensing the first deformed shape and a second UI corresponding to the second deformed shape on a second screen of the flexible display in response to sensing the second deformed shape;
receiving an input on one of the first UI and the second UI that is displayed; and
transmitting a control signal to a controlled apparatus that instructs the controlled apparatus to execute a function of the controlled apparatus corresponding to the input;
transmitting the one of the first deformed shape and the second deformed shape to the controlled apparatus;
receiving a response from the controlled apparatus that indicates one of the first UI and the second UI to be displayed on the flexible display;
determining a resolution of the one of the first UI and the second UI that is displayed, based on the one of the first deformed shape and the second deformed shape that is sensed; and
transmitting the resolution and the one of the first deformed shape and the second deformed shape to the controlled apparatus,
wherein the first screen is determined according to the first deformed shape,
wherein the second screen is determined according to the second deformed shape, and wherein a size of the first screen is different from a size of the second screen.

25. A method of controlling a flexible display apparatus, the method comprising:
sensing one of a first deformed shape of a flexible display of the flexible display apparatus and a second deformed shape of the flexible display of the flexible display apparatus;
displaying a first user interface (UI) corresponding to the first deformed shape on a first screen of the flexible display in response to sensing the first deformed shape and a second UI corresponding to the second deformed shape on a second screen of the flexible display in response to sensing the second deformed shape;
receiving an input on one of the first UI and the second UI that is displayed; and
transmitting a control signal to a controlled apparatus that instructs the controlled apparatus to execute a function of the controlled apparatus corresponding to the input;
transmitting the one of the first deformed shape and the second deformed shape to the controlled apparatus;
receiving a response from the controlled apparatus that indicates one of the first UI and the second UI to be displayed on the flexible display;
receiving a signal from the controlled apparatus to deform the flexible display to one of the first deformed shape and the second deformed shape; and
controlling the flexible display to deform the flexible display into the one of the first deformed shape and the second deformed shape,
wherein the first screen is determined according to the first deformed shape,
wherein the second screen is determined according to the second deformed shape, and
wherein a size of the first screen is different from a size of the second screen.

26. A non-transitory computer-readable medium having recorded thereon a program that causes a flexible display apparatus to execute a method of controlling the flexible display apparatus, the method comprising:
detecting a deformed shape of a flexible display of the flexible display;
displaying a first user interface (UI) corresponding to a first deformed shape on a first screen of the flexible display in response to detecting the first deformed shape for controlling a first controlled device, wherein the first screen is determined according to the first deformed shape; and
if a user input for changing a controlled device to a second controlled device is received and the flexible display is deformed from the first deformed shape to a second deformed shape, displaying a second UI corresponding to the second deformed shape on a second screen of the flexible display for controlling the second controlled device, wherein the second screen is determined according to the second deformed shape,
wherein a size of the first screen is different from a size of the second screen.

* * * * *